(12) United States Patent
Kobayashi et al.

(10) Patent No.: US 7,831,651 B2
(45) Date of Patent: Nov. 9, 2010

(54) METHOD AND APPARATUS FOR MODULAR INVERSION FOR INFORMATION SECURITY AND RECORDING MEDIUM WITH A PROGRAM FOR IMPLEMENTING THE METHOD

(75) Inventors: Tetsutaro Kobayashi, Tokyo (JP); Hikaru Morita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1143 days.

(21) Appl. No.: 10/893,899

(22) Filed: Jul. 20, 2004

(65) Prior Publication Data

US 2005/0041811 A1 Feb. 24, 2005

Related U.S. Application Data

(63) Continuation of application No. 09/185,626, filed on Nov. 4, 1998, now Pat. No. 6,795,553.

(30) Foreign Application Priority Data

| Nov. 4, 1997 | (JP) | 9-301593 |
| Nov. 12, 1997 | (JP) | 9-310466 |
| Jan. 27, 1998 | (JP) | 10-013574 |

(51) Int. Cl.
*G06F 7/00* (2006.01)

(52) U.S. Cl. ........ 708/492

(58) Field of Classification Search ........ 708/491–492, 708/656; 380/28–30
See application file for complete search history.

(56) References Cited

U.S. PATENT DOCUMENTS

| 5,764,554 A | * | 6/1998 | Monier | 708/491 |
| 6,307,935 B1 | * | 10/2001 | Crandall et al. | 380/28 |
| 6,917,957 B2 | * | 7/2005 | Ebergen et al. | 708/492 |
| 2002/0174155 A1 | * | 11/2002 | Hars et al. | 708/491 |

FOREIGN PATENT DOCUMENTS

| EP | 0 712 072 | 5/1996 |
| WO | WO 96/04602 | 2/1996 |

OTHER PUBLICATIONS

Takagi, Naofumi, "Modular Inversion Hardware Algorithm with a Reundant Binary Representation," IEICE Transactions on Information and Systems, Vo. E76-D, No. 8, Aug. 1993, pp. 863-869.

Kaliski, Jr. Burton S., "The Montgomery Inverse and Its Applications," IEEE Transactions on Computers, vol. 44, No. 8, Aug. 1995, pp. 1064-1065.

(Continued)

*Primary Examiner*—Chat C Do
(74) *Attorney, Agent, or Firm*—Connolly Bove Lodge & Hutz LLP

(57) ABSTRACT

Values X and N of n bits and a parameter t are input, then $Y=X2^{-t}$ mod N is calculated, then an extended binary GCD algorithm is executed for Y to obtain $S=y^{-1}2^k$ mod N and k, and $R=S2^{-(k+t-2n)}$ is calculated for S, thereby obtaining a Montgomery inverse $R=X^{-1}2^{2n}$ mod N of X on a residue class ring Z/NZ.

21 Claims, 27 Drawing Sheets

OTHER PUBLICATIONS

Shimon Even, "Systolic Modular Multiplication," Advances in Cryptology-CRYPTO '90 Proceedings, A. J. Menezes and S.A. Vanstone, eds. Springer-Verlag, pp. 619-624.

Norton, G.H. "Extending the Binary GCD Algorithm," Lecture Notes in Computer Science, Goos, et al. eds, AAECC-3, Grenoble, Jul. 15-17, 1985, Proceedings, pp. 363-372.

*Modular Inverse Algorithm Optimization by Initial Operations*, IEICE Technical Report, Nov. 20, 1997, pp. 13-23, vol. 97, No. 381, *The Institute of Electronics, Information and Communication Engineers*, and translation.

*A Fast Modular Inversion Algorithm and Its Application to Elliptic Curve Cryptosystems*, Proceedings of the 1998 IEICE General Conference, Mar. 27-30, 1998, SA-7-2, issued by *The Institute of Electronics, Information and Communication Engineers*, and translation.

\* cited by examiner

METHOD AND APPARATUS FOR MODULAR INVERSION FOR INFORMATION SECURITY AND RECORDING MEDIUM WITH A PROGRAM FOR IMPLEMENTING THE METHOD

REFERENCE TO RELATED APPLICATION

This is a continuation of application Ser. No. 09/185,626 filed Nov. 4, 1998, now U.S. Pat. No. 6,795,553 and which claims priority to JP 9-301593 filed Nov. 4, 1997, JP 9-310466 filed Nov. 12, 1997 and JP 10-013574 filed Jan. 27, 1998. The subject matter of that application is incorporated herein by reference.

BACKGROUND OF THE INVENTION

The present invention relates to a method and apparatus for modular inversion which is carried out for information security, for example, in digital cryptosystems and digital authentication systems which use encryption key generation, digital signature, and blind signature schemes, and elliptic cryptosystem and so forth. The invention also pertains to a recording medium with the modular inversion method recorded thereon.

In the field of information security it is well-known that the calculation of modular inverse over a prime finite field GF(p) (where p is a prime) or residue class ring Z/NZ (Z is a group of integers and N is a positive integer) takes a wide variety of forms, some of which will be described below.

(a) Generation of sum $(x_3, y_3)$ of two points $(x_1, y_1)$ and $(x_2, y_3)$ on an elliptic curve E/GF(p):

$$\lambda = (y_2 - y_1)/(x_2 - x_1) \bmod p \quad \text{(a-1)}$$

$$x_3 = \lambda^2 - x_1 - x_2 \bmod p \quad \text{(a-2)}$$

$$y_3 \lambda (x_1 - x_3) - y_1 \bmod p \quad \text{(a-3)}$$

(b) Part of signature generation of digital signature system ESIGN:

$$y = w/(kx^{k-1}) \bmod p \quad \text{(b-1)}$$

where x is an integer $1 \leq x \leq pq-1$, w is an integer in the range of $0 \leq w \leq p-1$, k∈Z, and p and q are primes.

(c) Blind signature generation of digital signature system RSA:

$$s' = (r^e m)^d \bmod N \quad \text{(c-1)}$$

$$s = s'/r \bmod N \quad \text{(c-2)}$$

where r and m are integers $0 \leq r$ and $m \leq N-1$, and e and d are integers $1 \leq e$ and $d \leq \phi(N)-1$, respectively.

The above examples use modular multiplications and modular inversions. The Montgomery method has been proposed to efficiently calculate modular residues. Listed below are definitions of some types of modular inversion that suit the Montgomery method.

Normal inversion $i_1(X) = X^{-1} \bmod N$

Kaliski inversion $i_2(X) = X^{-1} B \bmod N$

Montgomery inversion $i_3(X) = X^{-1} B^2 \bmod N$ where $B = 2^n$, n is the number of bits of N, $N < B < 2N$ and $X \in Z/NZ$ The modular inversion mentioned herein includes any types of modular inversion as well as the above. Replacing the N with a prime p, the above-mentioned inverse will be an inverse over GF(p). The following description will be given only of Z/NZ Conventionally, for inputs X and N where X is equal to or greater than zero and smaller than N, a modular inverse of X over Z/NZ is calculated, for example, using an extended binary GCD method (extended binary Greatest Common Divisor method, an algorithm for producing $X^{-1} 2^k \bmod N$ and k, the former being expressed by bgcd(X, N)) The following example will be described in connection with the calculation of a Montgomery inverse.

Method 1:
Step 1: Calculate S and k by $$S = bgcd(X,N) = X^{-1} 2^k \bmod N \quad (1)$$

where $n \leq k \leq 2n$.

Step 2: Calculate a modular inverse R by $$R = S 2^{2n-k} \bmod N = N^{-1} 2^{2n} \bmod N \quad (2)$$

Step 1 is a process of executing the extended binary GCD algorithm for the inputs X and N. Since 2n−k>0, Step 2 is to calculate multiplication by power of 2.

Incidentally, when d<0,
(a) Multiplication by power of 2: $X^d \bmod N$
(b) Division by power of 2: $x2^{-d} \bmod N$ the calculation (b) can be done faster than (a).

The calculation (b) can also be used to obtain a Montgomery inverse by the method 2 shown below:
Method 2:

$$\text{Step 1:} Y = X 2^{-n} \bmod N \quad (3)$$

$$\text{Step 2:} S = bgcd(Y,N)(= X^{-1} 2^{n+k} \bmod N) \quad (4)$$

$$\text{Step 3:} R = S 2^{-(k-n)} \bmod N (= X^{-1} 2^{2n} \bmod N) \quad (5)$$

Since $k-n \geq 0$, Step 3 performs a division by power of 2.

If the multiplication (a) and the division (b) consumes the same amount of time, then Method 1 involving the smaller number of steps enables the calculation to be made in a shorter time than in the case of using Method 2. In practice, however, since the division (b) can be conducted in a shorter time, it is presumed that the modular inversion by Method 2 may sometimes be processed in a shorter time.

Assuming that N is too large a value to calculate or process by an ordinary computer or processor at a time, the amounts of time for the calculations (a) and (b) increase as d becomes larger.

For example, in the case of using a method in which elementary operations are
(a) Multiplication by 2: $X2 \bmod N$
(b) Division by 2: $X2^{-1} \bmod N$ and the calculation (a) is carried out d times as the calculation (a), the time for calculation (a) is d times longer than the time for calculation (a). Similarly, the time for calculation (b) is d times longer than that for calculation (b). The operations corresponding to calculations (a) and (b) will hereinafter be referred to as an elementary operation.

Method 2 conducts division by power of 2 instead of performing multiplication by power of 2 in Method 1, but needs to perform the elementary operation a larger number of times than does Method 1.

For example, when k=1.41n (It has been experimentally demonstrated that k and n bear this relation on average.) Method 1 performs the Bgcd algorithm, and besides, the elementary operation 0.59 times in Step 2. On the other hand, Method 2 performs the elementary operation n times in Step 1 and 0.41 n times in Step 3 in addition to the Bgcd algorithm, and hence it conducts the elementary calculation a total of 1.41 n times. Accordingly, there is no possibility of Method 2 becoming faster than Method 1 unless the division by power of 2 is considerably faster than the multiplication by power of 2 (more than 2.3 times faster in the above example). Conversely, even if means for speeding up the multiplication by power 2, though not feasible at present, is available, no speed-ups are possible if only the division by power of 2 occurs.

SUMMARY OF THE INVENTION

It is an object of the present invention to provide a calculating method which permits reduction of the time for modular inversion necessary for information security, a modular inversion apparatus using the method, and a recording medium with a program recorded thereon for implementing the method.

Another object of the present invention is to provide a modular inversion method which enables multiplication and division by power of 2 to be performed efficiently and hence in a short time, a modular inversion apparatus using the method, and a recording medium with a program recorded thereon for implementing the method.

Still another object of the present invention is to provide a modular inversion method which enables an extended binary GCD to be calculated efficiently and hence in a short time, a modular inversion apparatus using the method, and a recording medium with a program recorded thereon for implementing the method.

The modular inversion method, the apparatus using the method and the program recorded on a recording medium for implementing the method according to a first aspect of the present invention:

(a) calculate Y, for n-bit input values X and N, by the following equation using a predetermined value t $Y = X2^{-t} \mod N;$ (b) calculate an extended binary GCD for said Y and N by the following equation to obtain S and k $S = \text{bgcd}(Y,N) = Y^{-1}2^k \mod N;$ and (c) perform the following equation using said S, k and t $R = S2^{-(k+t-m)} \mod N, m=0, n, \text{ or } 2n$ and output said R as the modular inversion result.

According to a second aspect of the present invention, in the above modular inversion a division of input values S and N by power of 2 represented as $S2^{-w} \mod N$, w being a predetermined number of bits to be calculated or processed at a time, comprises the steps of:

(a) calculating $n' = -N^{-1} \mod 2^w$ for input values S and N;
(b) calculating $s' = Sn' \mod 2^w$ from said n and S;
(c) calculating $q = S + s'N$ from said s', S and N; and
(d) calculating $q2^w$ from said q and w as the result of said division by power of 2.

According to a third aspect of the present invention, in the above modular inversion, letting the number of bits that an apparatus for modular inversion processes at a time be represented by M, a multiplication of input values S and N by power of 2 represented as $S2^w \mod N$, w being a predetermined number of bits to be calculated or processed at a time, comprises the steps of:

(a) calculating $n' = 2^{n+M-1}/N$ for said input values S and N;
(b) calculating $t' = sn'/2^{2M-w-1}$ from said n and the value s of upper M bits of said S;
(c) calculating $S' = S2^w - t'N$ from said S, N, t' and w; and (d) comparing said S' and N, and if S'>N, repeating an update $S' \leftarrow S' - N$ to obtain S' satisfying $S' \leq N$, and if $S' \leq N$, obtaining said value S' as the result of said multiplication by power of 2.

According to a fourth aspect of the present invention, said extended binary GCD algorithm in said modular inversion comprising:

(b-1) a step of setting $U_0 = Y$ and $V_0 = N$ for said Y and, N, initializing $S_0 = 0$, $T_0 = 1$ and k=0, and storing said $U_0$, $V_0$, $S_0$, $T_0$ and k in storage means;

(b-2) a GCD simulation step of calculating, from said values $U_0$ and $V_0$ stored in said storage means, $u_u$, $u_v$, $v_v$ and $v_u$ which satisfies, for predetermined w', $\gcd(U_0, V_0) = \gcd(|u_u U_0 - u_v V_0|/2^{w'}, |v_v V_0 - v_u U_0|/2^{w'}),$ adding said w' to said k in said storage means to obtain an updated value k, and storing said updated value k in said storage means together with said values $u_u$, $u_v$, $v_v$ and $v_u$;

(b-3) a multi-precision calculation step of calculating $V_1 = (v_v V_0 - u_u U_0)/2^{w'},$ $U_1 = (u_u U_0 - u_v V_0)/2^{w'},$ $S_1 = u_u S_0 + u_u T_0,$ $T_1 = v_u S_0 + v_v T0$ for said values $U_0$, $V_0$, $T_0$, $u_u v_v$, and $v_u$ stored in said storage means, temporarily storing $V_1$, $N_1$, $S_1$ and $T_1$ in said storage means, determining whether said value $V_1$ is negative or not, and if negative, inverting the signs of said temporarily stored values $V_1$ and $T_1$, determining whether said value $U_1$ is negative or not, if negative, inverting the signs of said temporarily stored values $U_1$ and $S_1$, and updating said values $U_0$, $V_0$, $T_0$ and $S_0$ in said storage means with said temporarily stored values $U_1$, $V_1$, $S_1$ and $T_1$, said w' being an integer equal to or greater than 4;

(b-4) a final processing step of calculating $u_u$, $u_u$, $v_u v_v$, and c which satisfy $|u_u U_0 - u_v V_0|/2^c = \gcd(U_0, V_0)$ $|v_v V_0 - v_u U_0|/2^c = 0$ for said values $U_0$, $V_0$, $t_0$ and $S_0$ stored in said storage means, calculating $S' = u_u S_0 + u_v T_0$, and adding said value c to said value k to update it; and (b-5) an output step of outputting said value S' and k as the results S and k of said extended binary GCD calculation.

BRIEF DESCRIPTION OF THE DRAWINGS

FIG. 1I is a functional block diagram illustrating a GCD calculating apparatus according to a third embodiment of the present invention;

DETAILED DESCRIPTION OF THE PREFERRED EMBODIMENTS

Figure 1:
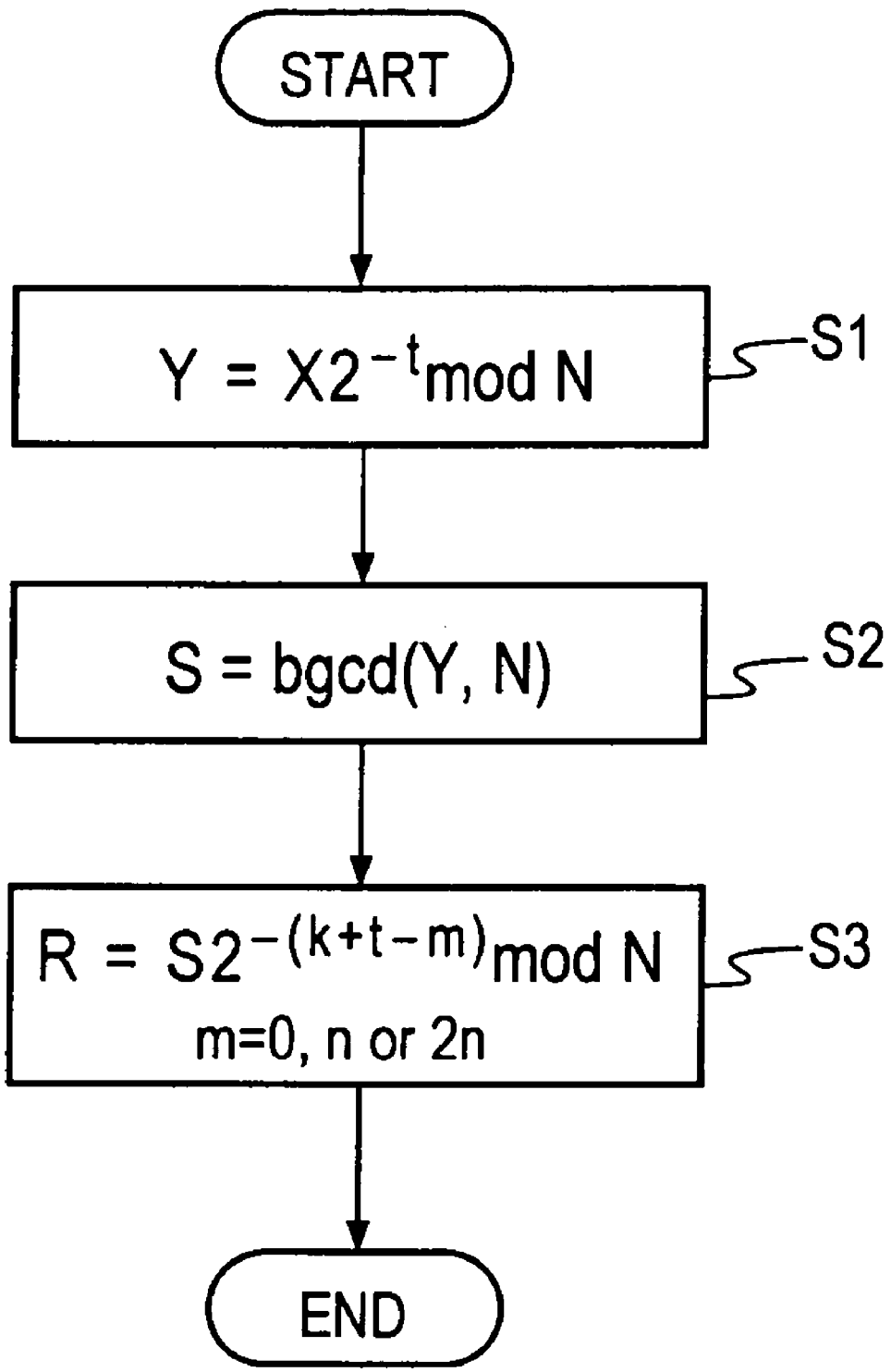
FIG. 1 is a flowchart showing a Montgomery modular inversion over Z/NZ according to the present invention.

A description will be given first of the principle of the present invention.

Of the conventional methods for Montgomery inversion, the aforementioned Method 1 involves multiplication by power of 2 which is small in the number of repetitions of the elementary operation to be performed but is time-consuming, and Method 2 needs only to perform division by power of 2 but is required to execute the elementary operation a larger number of times.

Incidentally, it is known in the art that the repeating number k of the loop in the Bgcd algorithm is $n \leq k \leq 2n$; experiments using concrete numerical values revealed that the size of each of the inputs X, N is any one of 256, 512 and 1024, the repeating number k of the loop falls within the following range in almost all cases:

$$1.41n - (0.05n+20) \leq k \leq 1.41n + (0.05n+20) \tag{6}$$

Through utilization of this finding, the Montgomery inverse can be calculated by the following Method 3 which has advantages of both of Methods 1 and 2 in combination.

This invention method:

$$\text{Step 1:} Y = X2^{-t} \bmod N \tag{7}$$

$$\text{Step 2:} S = \text{bgcd}(Y,N) = Y^{-1}2 \bmod N = X^{-1}2^{t+k} \bmod N \tag{8}$$

$$\text{Step 3:} R = S2^{-(k+t-2n)} \bmod N = X^{-1}2^{2n} \bmod N \tag{9}$$

To demonstrate the superiority of this invention method over the conventional Methods 1 and 2, assume that the value t is approximately equal to 64n+20, but in practice, the value t is not limited specifically thereto.

Step 3 of Method 2 always performs division, but Step 3 of this invention method may perform division or multiplication according to the predetermined value t and the value k calculated in Step 2.

It was ascertained experimentally that, as the result of Eq. (6), the value k in this invention method is in the range of $$1.36n - 20 \leq k \leq 1.46n + 20 \tag{10}$$

with a very high probability and that Eq. (6) holds true. Accordingly, in the cases of n=256, 512 and 1024, the maximum value k, 1.46n+20, and the value t, 0.64n+20, provide $$0 < k' \text{ where } k' = k + t - 2n \leq 0.1n + 40 \tag{11}$$

This means that Step 3 of this invention method needs only to perform division by power of 2. In this instance, this invention method is higher in computational efficiency than Method 2.

Method 2 performs division by $2^n$ in Step 1 and division by $2^{k-n}$ in Step 3. This invention method performs division by 2t in Step 1 and division by $2^{-k'} = 2^{k+t-2}n$ step S3.

That is, Steps 1 and 3 of Method 2 carry out calculation equivalent to a right shift operation corresponding to a total of k bits (on average 1.4 ln bits as mentioned previously). On the other hand, this invention method needs only to perform calculation equivalent to a right shift operation corresponding to k+2t+2n bits (on average 0.69n+40 bits with k=1.41n and t=0.64n+20). For example, setting n=256, this invention method is about 45% faster than Method 2 (except the Bgcd algorithm). In the above example, since t=0.64n+20, k'≧0 and only division is performed in Step 3, but if t<0.64n+20, k' may take a negative value as well, in which case multiplication by power of 2 is performed. In this case, too, the value t can be chosen such that the number of repetitions of the elementary operation to be performed (the absolute value of k+2t−2n) is small; hence, multiplication by power of 2 can also be carried out in a shorter time than in the cases of by Methods 1 and 2.

That is, the modular inversion method according to the present invention is based on the finding that the number of repetitions of the elementary operation by power of 2 can be reduced by additionally introducing a new parameter t as the power of 2 and selecting an optimum value for t.

First Embodiment

Flowchart for Montgomery Inversion over Z/NZ

FIG. 1 is a flowchart for Montgomery inversion over Z/NZ according to the present invention.

This procedure is to calculate an output value $X^{-1}2^{2n}$ mod N (where n is the size or bit length of N) from input values X, N (odd).

An appropriate value for t is determined according to the size of the input N and the processing rate ratio between multiplication by power 2 and inversion by power of 2. It is preferable that t be approximately in the range of 0.64n+20 to 0.54n−20. From the view point of faster calculation, it is particularly preferable that the value t be an integral multiple of, for example, 16 which is the number of bits to be processed on hardware of the processing unit at a time.

Step S1: First, calculate Y by the following equation.

$$Y = X2^{-t} \bmod N$$

Step S2: Next, perform an extended binary GCD algorithm for Y and N, and obtain S and k" as output values by the following equation.

$$S = \gcd(Y, N) = Y^{-1} 2^{k''} \bmod N \qquad (12)$$

Step S3: Finally, perform the following operation using these values S and k $$R = S2^{(k+t-2n)} \bmod N = S2^{-k'} \bmod N. \qquad (13)$$

Where k'=k+t−2n. The calculation result R is output as the result of Montgomery inversion. In this calculation, if k'>0, then division by power of 2 is performed to obtain the value R, and if k'<0, then multiplication by power of 2 is performed.

Apparatus for Montgomery Inversion over Z/NZ

Figure 2:
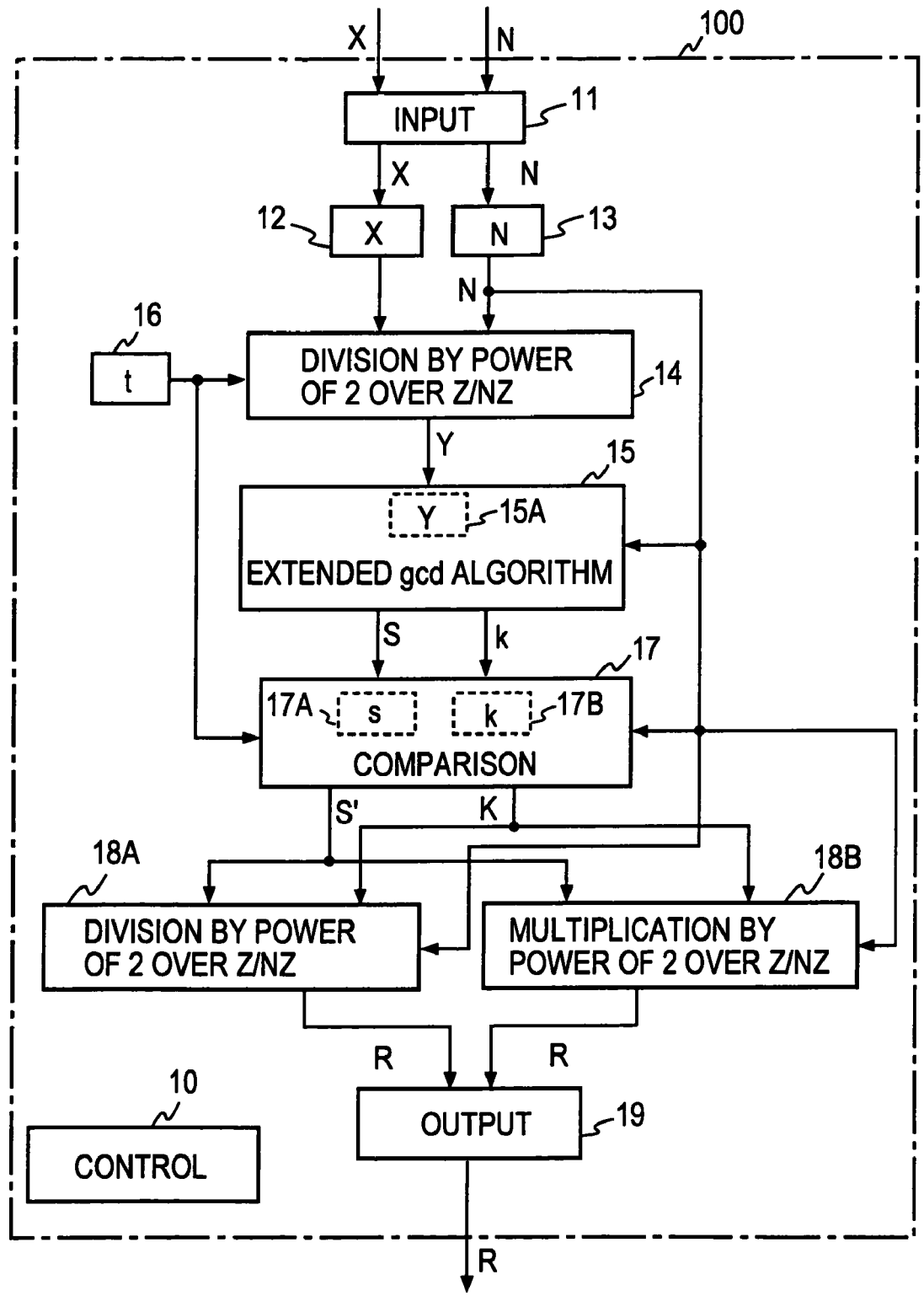
FIG. 2 is a functional block diagram illustrating an embodiment of an apparatus for Montgomery inversion over Z/NZ according to the present invention.

FIG. 2 illustrates an embodiment of an apparatus 100 for Montgomery inversion over Z/NZ. This apparatus 100 is to output $X^{-1}2^2$ mod N for inputs X and N. The inputs X and N are provided via an input part 11 and stored in storage parts 12 and 13, respectively, and at the same time, they are fed to a division part 14 by power of 2 over Z/NZ. The division part 14 performs the following calculation for the inputs X and N:

$$Y = X2^{-t} \bmod N \quad (14)$$

The calculation result is provided to an extended GCD calculating part 15 and stored in its storage part 15A. The value t is prestored in a storage part 15.

The extended GCD calculating part 15 uses the input values Y and N to perform an extended binary GCD calculation by the following equation to obtain S and k.

$$S = Y^{-1} 2^k \bmod N \qquad (15)$$

The values S and k are provided to a comparison part 17 and stored in its storage parts 17A and 17B, respectively.

The comparison part 17 uses the size (bit length) n of the input value N and the values k and t to determine whether −k=2n−k−t is positive or negative. If negative, |k"|=K=−2n+k+t and S are provided to a calculating part 18A for division by power 2 over the Z/NZ, and if positive, K=2n−k−t and S are provided to a calculating part 18B for multiplication by power of 2 over Z/NZ.

The division part 18A uses the input values S, K and N to calculate $$R = S2^{-K} \bmod N \qquad (16)$$

and provides the calculation result R to an output part 19. The multiplication part 18B uses the input values S, K and N to calculate $$R = S2^K \bmod N \qquad (17)$$

and provides the calculation result R to the output part 19. The output part 19 outputs the value R as the result of the modular inversion.

A control part 10 has control over the apparatus 100 from the input part 11 to the output part 19.

While in the above the present invention has been described as being applied to the Montgomery inversion, the invention is also applicable to other modular inverse calculating apparatuses. That is, letting Step 3 in this invention method be represented by $$R = S2^{(k+t-m)} \bmod N \qquad (18)$$

Montgomery inversion is m=2n but the above-mentioned application can be achieved by setting normal inversion ($X^{-1}$ mod N) as m=0 and Kaliski inversion ($X^{-1}2^n$ mod N) as m=n. The parameter t is so chosen as to minimize the calculating time, but an appropriate value is chosen for each inversion and it varies with the value n or the like.

One or all of the storage parts 12, 13, 15A, 16, 17A and 17B may also formed as individual storage areas of one storage device. Although in the above the present invention has been described as being applied to the inversion over Z/NZ, the invention is equally applicable to the inversion over GF(p) (where p is a prime) which is used for elliptic curve cryptosystem. It will be apparent that the apparatus for modular inversion according to the present invention can also be implemented by executing a program by an electronic computer.

The above-described embodiment of the modular inversion according to the present invention is used for modular inversion in the field of information security as referred to previously. Its application will be concretely described below.

An equation for calculating from two points $(x_1, y_1)$ and $(x_2, y_2)$ on the aforementioned elliptic curve E/GF(p) a point $(X_3, y_3)$ of the sum of the two points is expressed by Eqs. (a-1), (a-2) and (a-3) mentioned previously. That is, the calculation of the point $(X_3, y_3)$ involves the calculation of λ by Eq. (a-1). Setting $y = y_2 - y_1$ and $X = x_2 - x_1$, Eq. (a-1) is expressed as follows:

$$\lambda = (y_2 - y_1)(x_2 - x_1)^{-1} \bmod p = y X^{-1} \bmod p$$

In the first place, modular inverse is calculated by $X' = X^{-1}$ mod p and then $\lambda = yX'$ mod p is calculated using result of modular inverse. The modular inverse is calculated as described below by applying the method according to the above-described first embodiment to the calculation of the modular inverse $X' = X^{-1}$ mod p. To begin with, the predetermined value t is used to calculate $$Y = X2^{-t} \bmod p$$

Then, the values Y and p are used to calculate S and k by the following equation $$S = \text{bgcd}(Y, p) = T^{-1} 2^k \bmod p$$

Further, the values S and t are used to calculate the modular inverse X by the following equation $$X' = S2^{-(k+t-m)} \bmod p \text{ where } m = 0, \text{ n or } 2n$$

The modular inverse X' thus calculated is used to obtain λ by the following equation $$\lambda = yX' \bmod p$$

In the signature generation by the digital signature scheme ESIGN, $X = kx^{k-1}$ is calculated expressing Eq. (b-1) as follows:

$$y = w/(kx^{k-1}) \bmod p = wX^{-1} \bmod p$$

Next, y is calculated as described below by applying the method of the first embodiment to this modular inversion with $X' = X^{-1} \bmod p$. That is, the predetermined value t is used to calculate $$Y = X2^{-t} \bmod p$$

Next, the values Y and p are used to calculate S and k by the following equation $$S = \mathrm{bgcd}(Y, p) = Y^{-1} 2^k \bmod p$$

Further, the values S and t are used to calculate the modular inverse X' by the following equation $$X' = S2^{-(k+t-m)} \bmod p \text{ where } m = 0, n \text{ or } 2n$$

The value y of Eq. (b-1) can be obtained by the following equation using the thus calculated modular inverse X.

$$y = wX^{-1} \bmod p = wX' \bmod p$$

In the blind signature of the digital signature scheme RSA, the method of the first embodiment is applied to the modular inversion in Eq. (c-2). That is, the value R is set as $R = r^{-1} \bmod N$ and the predetermined value t is used to calculate $$Y = r2^{-t} \bmod N$$

Next, the values Y and N are used to calculate S and k by the following equation $$S = \mathrm{bgcd}(Y, N) = Y^{-1} 2^k \bmod N$$

Further, the values S and t are used to calculate modular inverse R by the following equation $$R = S2^{-(k+t-m)} \bmod p \text{ where } m = 0, n \text{ or } 2n$$

The value s in Eq. (c-2) can be obtained by the following equation using the thus calculated modular inverse R.

$$s = s'/r \bmod N = s'R \bmod N$$

Second Embodiment

Steps 1 and 3 of the modular inversion according to the first embodiment of the present invention have been described to calculate division or multiplication by power of 2. A mere division by $2^k$ can be calculated by a k-bit-shift operation. For example, in the case of dividing by $2^3$ a number 40 (in decimal representation), which is 101000 in binary representation, a three-bit right shift operation is performed. This provides 101 in binary representation, allowing ease in finding 5. However, a mere k-bit-shift operation is not enough to calculate division by $2^k$ on the Z/NZ like the calculation in the division part 14 or 18 in FIG. 2. A conventional solution to this problem is to execute the following process, for example, in the case of calculating an output $S2^{-k} \bmod N$ from inputs S, k and N (odd).

(a) If the input value S is divisible by 2, then a calculation S/2 is performed and the calculation result is newly set as S'.

(b) If the input value S is not divisible by 2, then a calculation (S+N)/2 is performed and the calculation result is newly set as S'. The above step (a) or (b) is repeated k times.

The division by 2 in step (a) or (b) can be done by the bit-shift operation.

On the other hand, the multiplication by $2^k$ can be achieved by a k-bit-shift operation. For example, in the case of multiplying by 23 a number 40 (in decimal representation), which is 101000 in binary representation, a three-bit left shift operation is carried out. This provides 101000000 in binary representation, allowing ease in calculating 320. However, as is the case with the above-mentioned division, a mere k-bit shift operation is not enough to calculate multiplication by $2^k$ on the Z/NZ like the calculation in the multiplication part 18B in FIG. 2. For example, in the case of calculating an output $S2^k \bmod N$ from inputs S, k and N (odd), it is conventional to execute the following process.

(a) The input value S is doubled (S×2), and the multiplication result is newly set as S; and (b) If the new S is larger than N, then S−N is calculated, and the calculation result is newly set as S, followed by return to step (a). If S is not larger than N, then the procedure returns directly to step (a).

The steps (a) and (b) are carried out k times. The multiplication by 2 represented by S×2 is implemented using a bit shift device.

The above-mentioned division by $2^k$ on the Z/NZ repeats the division by 2 (one-bit right shift) just k times and an addition +N a maximum of k times (on average k/2 times). The conventional multiplication by $2^k$ on the Z/NZ repeats the multiplication by 2 (one-bit left shift) just k times and a subtraction −N a maximum of k times (on average k/2 times). The computing time for such multiplication and division by 2 and addition and subtraction as mentioned above is in proportion to the number of bits of the value handled (the input value), and the processing time increases in proportion to k times the number of bits. It is desirable, therefore, to reduce the processing time by handling a plurality w of bits (where w is an integer equal to or greater than 2) at a time.

By the way, a present-day computer has its hardware formed by memories capable of reading therefrom and writing thereto in units of M bits (where M is 8, 16, 32, . . . ) (Condition 1). In view of this, it is efficient to perform calculations in units of M bits by setting the number w of bits, which are simultaneously processed in the multiplication and division by $2^k$, at a desired value in the range of $2 \leq w \leq M$, preferably w=M.

For example, in a conventional processing unit for calculating division or multiplication by $2^k$, when the input value is large, a one-bit shift operation of a large integer is repeated. Under Condition 1, however, the computing time by the one-bit-shift operation is equal to or longer than the computing time needed by the M-bit-shift operation.

As a solution to this problem, the second embodiment of the present invention do away with the one-bit-shift operation, but instead performs the shift operation in units of a plurality w of bits, for example, M bits which the processing unit can handle at a time. By this, the number of repetitions of the shift operation is reduced down to 1/M the number of times the one-bit-shift operation takes place. In the division by power of 2, the shift operation is carried out, for example, in steps of w=M bits and possible additions, which are likely to be done while the w-bit-shift operation is repeated w times, are carried out at a time. Whether the addition S+N is performed in bit-by-bit processing is dependent upon whether the least significant bit of S is 0 or 1, but the value of the least significant bit is determined as the result of the preceding multiple additions. On this account, a new calculation is needed to process the least significant bits of S and N at a time so as to perform simultaneous execution of processes of w iterations.

By precalculating n'=−N$^{-t}$ mod 2$^w$ and setting s'=Sn' mod 2$^w$, −s'N≡S mod 2$^w$; hence, −s'N and N match in the range of at least w lower bits. Then, by dividing S+s'N by 2$^w$, that is, by newly setting upper bits of S+s'N except the w lower bits (00 . . . 0) as S, S2$^{-w}$ mod N can be obtained equivalently.

This principle is such as described below. Based on the property known as the Chinese remainder theorem, the following equation holds true:

$$S=\{(SN^{-1} \bmod r)N+(Sr^{-1} \bmod N)r\} \bmod Nr \quad (18)$$

where r and N are relatively prime. Eq. (18) can be modified as follows:

$$Sr^{-1} \bmod N=\{S-SN^{-} \bmod r)N \bmod Nr\}/r \quad (19)$$

Hence, setting r=2$^w$ and n'=−N$^-$ mod 2$^w$, $$S2^{-w} \bmod N = \{S + (S \bmod r)(N^{-1} \bmod r)N \bmod Nr\}/r \quad (20)$$
$$= \{(S+s'N \bmod 2^wN)/2^w\} \bmod N$$

where s'=Sn' mod 2$^w$.

By repeatedly performing this operation, the k iterations of the loop involved in the conventional division method could also be reduced down to k/w iterations.

While in the above the means for division has been described, multiplication can also be performed in a similar manner. Letting M represent the number of bits to be processed at a time by the computer for implementing this invention method, the number w of bits that are processed at a time for multiplication is equal to or smaller than M (2≦w≦M).

In the multiplication by power of 2, it is necessary to simultaneously perform possible subtractions −N that are likely to take place during w iterations of the loop. Assume that the number n of bits of N is equal to that of S. w is a preset number of bits to be processed at a time in the division. Whether the subtraction is carried out or not is determined depending upon whether the most significant bit of S is 0 or 1. The value of this bit reflects the results of preceding subtractions. For this reason, the prediction of possible addition involves a calculation which uses the most significant bits of both S and N.

In the first place, n''=[2$^{n+M-1}$/N] is precalculated (where n is the number of bits of N and [a] is assumed to be a maximum integer not exceeding a given real number a, that is, a value with the fractional portion of the number a dropped).

Step 1: Calculate S'=S2$^w$.
Step 2: Calculate s'=[S/(2$^{n+w-M}$)] (That is, the value of upper w bits of S' is made s').
Step 3: Calculate t=s' n'' (value of 2M bits).
Step 4: Calculate t'=[t/2$^{M-w-1}$].

Since t' and S'/N match in the range of at least 2M-w-2 upper bits, S2$^w$ mod N can be obtained equivalently (under the condition M≧w+2) by calculating S'-t'N.

This principle is based on the following fact.

Since n'' and s' are calculated which satisfy $$(2^{n+M-1}/N)-1<n''<2^{n+M-1}/N \quad (21)$$

$$S/2^{n-M+w}-1<s'<S/2^{n-M+w} \quad (22)$$

the following equation holds true:

$$2^{2M-w-1}S/N>t=s'n''>(2^{2M-w-1}S/N)-s'-n''+1 \quad (23)$$

that is, $$S/N>t'>S/N-(s'+n''-1)/2^{2M-w-1}$$
$$>S/N-2M+1/2^{2M-w-1}$$
$$>S/N-2^{w-M+2} \quad (24)$$

By this, the k iterations of the loop in the conventional multiplication method can be reduced down to k/w iterations.

Apparatus for Division by Power of 2 over Z/NZ

Figure 3:
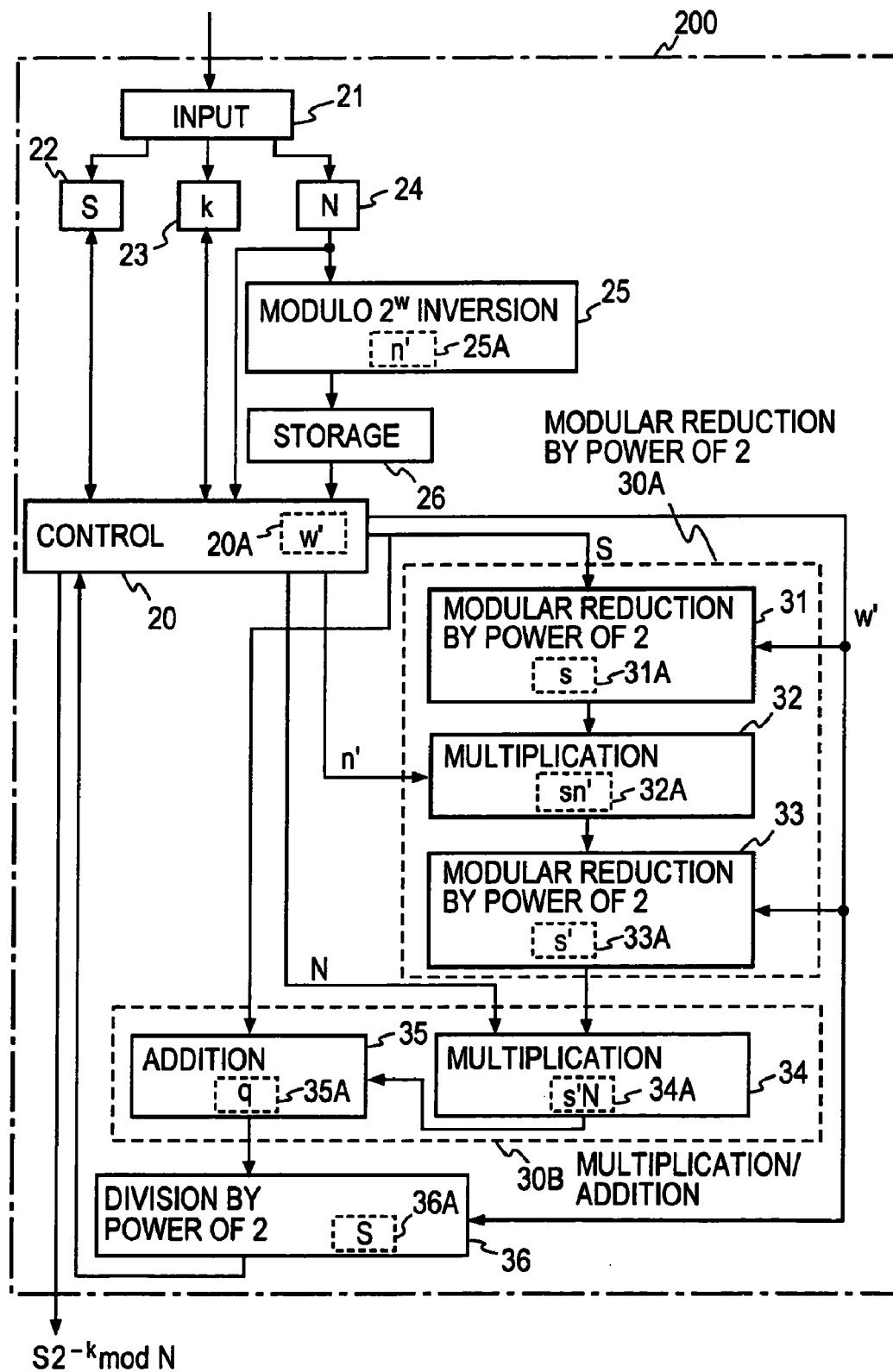
FIG. 3 is a functional block diagram illustrating an embodiment of an apparatus for calculating division by power of 2 over Z/NZ in modular inversion.

FIG. 3 illustrates an apparatus 200 for division by power 2 over the Z/NZ which is used for the modular inversion in the first embodiment. The apparatus 200 calculates and outputs S2-k mod N for inputs S, N and k. Assume that the number w of bits, which are processed by this apparatus 200 at a time, is equal to the number M of bits which are processed at a time by the computer that implements the apparatus 200. In this case, however, k is smaller than 2$^w$ are called multi-precision and those smaller than 2$^w$ single-precision. Values greater than 2

Figure 4A:
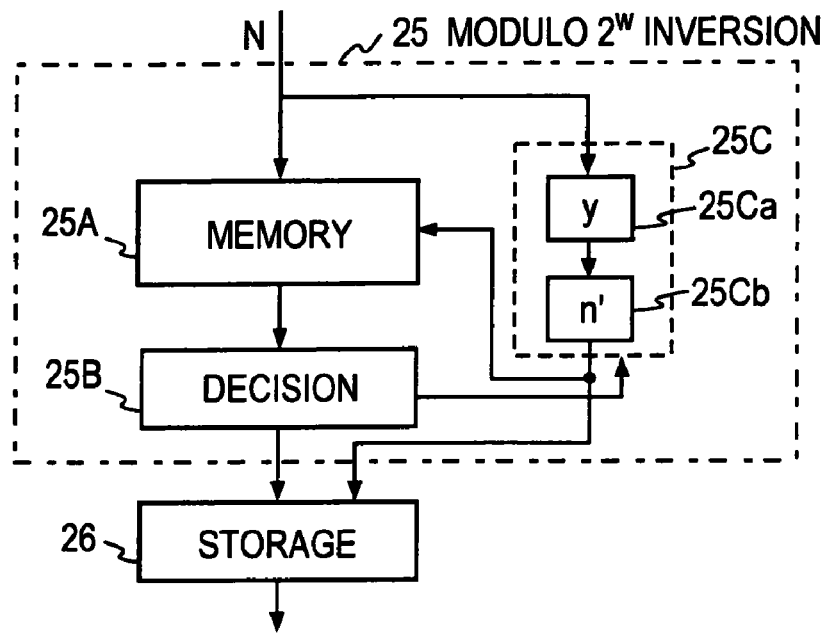
FIG. 4A is a functional block diagram depicting a specific operative example of an inversion part 25 in FIG. 3.

The values S, k and N are input via an input part 21 and stored in storage parts 22, 23 and 24, respectively. The value N stored in the storage part 24 is input into a modulo 2$^w$ inversion part 25, which calculates n'="N$^{-1}$ mod 2$^w$ for the input N and stores it in its memory 25A. In the case where the same value N is input into the inversion part 25 twice or more, however, it is possible to employ such a configuration as shown in FIG. 4A, in which n'=−N$^{-1}$ mod 2$^w$ is stored in the memory 25A for the input N and read out therefrom by the input N for storage in a storage part 26. When a decision part 25B determines from the value read out of the memory 25A that n' is not present, n'=−N$^{-1}$ mod 2$^w$ is calculated in a calculating part 25C and stored in the storage part 26 and in the memory 25A. When the value N is large, it is preferable that the calculating part 25C calculate first y=N mod 2$^w$ in a calculating part 25Ca and then n'=−y$^{-1}$ mode 2$^w$ in a calculating part 25Cb.

Figure 4B:
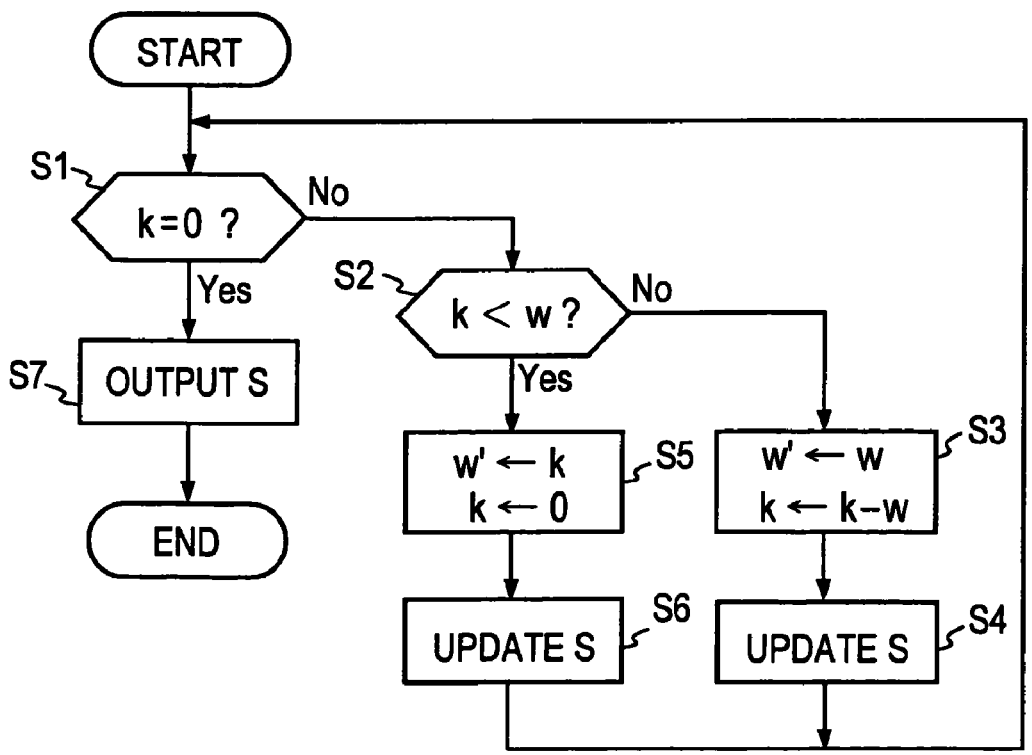
FIG. 4B is a flowchart showing an example of part of the procedure of control by a control part 20 in FIG. 3.

The storage parts 22, 23, 24 and 26 are connected to a control part 20. The control part 20 controls respective parts of the apparatus 200 and executes their processes. As depicted in FIG. 4B, it is checked in step S1 whether the value k stored in the storage part 23 is 0 or not, and if not, then it is checked in step S2 whether the value k is smaller than w=M (where M is a preset number of bits to be processed by the computer for each operation, for example, 8, 16, 32, . . . ); if k is not smaller than w, then w is stored as w in a storage part 20A in step S3, after which k in the storage part 23 is updated with k-w.

Thereafter, the value S is updated in step S4 as described below. That is, the control part 20 supplies the value S stored in the storage part 22 to a power-of-2 modular reduction part 31 and an addition part 35, the value n in the storage part 26 to a multiplication part 32, the value N in the storage part 24 to a multiplication part 34, and the value w in the storage part 20A to the power-of-2 modular reduction parts 3 and 33 and a power-of-2 division part 36.

And the control part 20 controls the respective parts to execute their processes. To begin with, the modular reduction part 31 calculates s=S mod 2$^{w'}$ from the inputs S and w' thereinto, and stores the calculation result in a storage part 31A. The multiplication part 32 calculates sn'=(S mod 2$^{w'}$)n' from the input n' and the value s=S mod 2$^{w'}$ stored in the storage part 31A, and stores the calculation result in a storage part 32A. The modular reduction part 33 calculates $$s'=(S \bmod 2^{w'})n' \bmod 2^{w'} \quad (25)$$

from the input w' and the value sn'=(s mod $2^{w'}$)n' stored in the storage part 32A, and stores the calculation result in a storage part 33A. The multiplication part 34 calculates s'N from the inputs s' from the storage part 33A and N from the storage part 24, and stores the calculation result in a storage part 34A. The addition part 35 calculates an addition, q=S+s'N, of the values S and s'N stored in the storage parts 2 and 34A, respectively, and stores the calculation result in a storage part 35A. The division part 36 calculates (S+s'N)/$2^w$ from the value q=S+s'N from the storage part 35A and the input w', and stores the calculation result as a new value of S in a storage part 36A. That is, the division part 36 divides S+s'N by $2^w$ through utilization of the fact that the least significant bit w' of (S+s'N) becomes 0.

Finally, upon completion of the operation by the division part 36, the control part 20 updates the content of the storage part 22 with the value S newly stored in the storage part 36A.

Steps S1 through S4 are repeatedly executed as long as k≧w. If k is not zero in step S1 and if k is smaller than w, k is stored as w in the storage 20A in step S5, and then k in the storage part 23 is made 0, followed by updating S in step S6 as in step S4. Since k=0 after execution of steps S5 and S6, k in the storage part 23 is decided to be zero in step S1, and in step S7 the content S of the storage part 22 is output as the calculation result $S^{-k}$ mod N, with which the updating process ends.

Incidentally, the modular reduction parts 31 and 33 and the multiplication part 32 constitute a power-of-2 modular reduction means 30A, and the addition part 35 and the multiplication part 34 constitute multiplication/addition means 30B.

Division Power of 2 on Z/NZ

Figure 5:
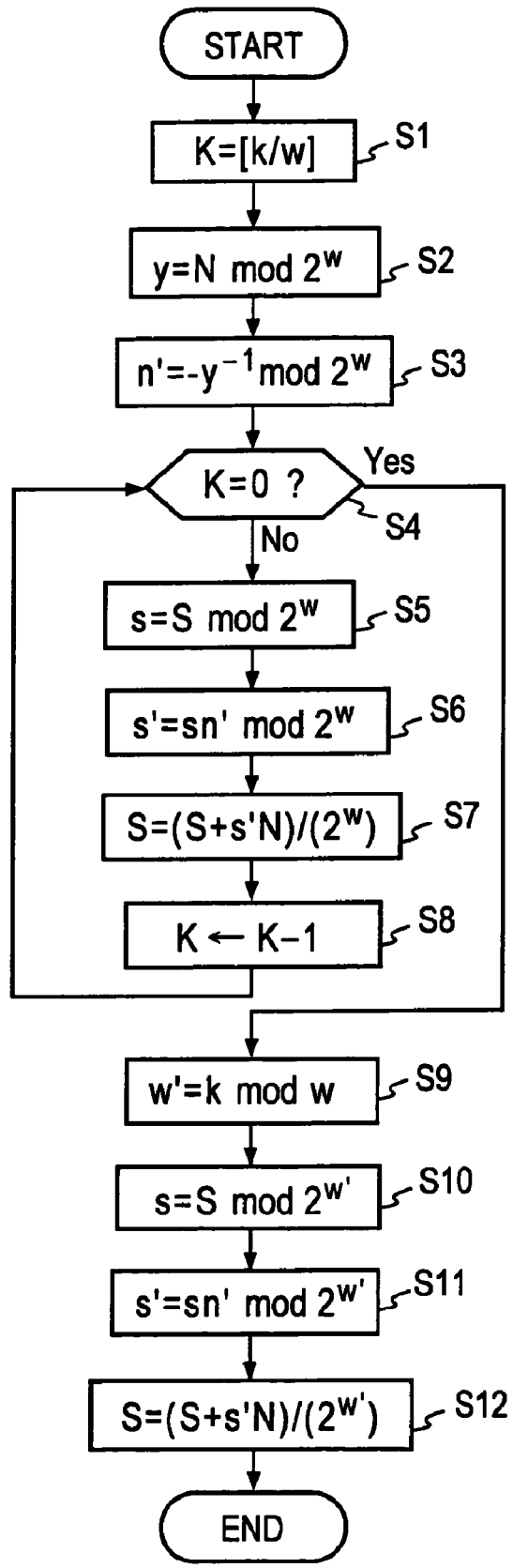
FIG. 5 is a flowchart showing an example of the procedure of division by power of 2 over Z/NZ.

FIG. 5 shows the procedure of division by power of 2 on the Z/NZ. The calculation itself needed for the modular division is the same as the calculation which is performed by the apparatus depicted in FIG. 3. Now, assume that the number w of bits, which are processed at a time in the division method of the present invention, is equal to the number M of bits that the calculating apparatus processes at a time.

Step S1: Calculate K=[k/w];
Step S2: Calculate y=N mod $2^w$; and
Step S3: Calculate n'=−y mod $2^w$ to obtain n'=−N−1 mod $2^w$.

Step S4: Then, execute the following steps S4 through S8 K=[k/w] times. That is, a check is made to see if K=0, and if not:

Step S5: Calculate s=S mod $2^w$;
Step S6: Calculate s'=sn' mod $2^w$;
Step S7: Update S with (S+s'N); and
Step S8: Decrement K by one and return to step S4.

The processes of steps S4 to S8 correspond to steps S9 to S4 in FIG. 4B.

If K=0 in step S4, the following steps S9 to S12 are executed.

Step S9: Calculate w'=k mod w;
Step S10: Calculate s=s mod $2^{w'}$;
Step S11: Calculate s'=sn' mod $2^{w'}$; and
Step S12: Update S with (S+s'N)/$2^{w'}$ and output the updated S.

The processes of steps S9 through S12 correspond to the processes of steps S5, S6, S1 and S7 in FIG. 4B.

Though not referred to above in respect of FIG. 5, each calculation result is used after being temporarily stored in storage means as depicted in FIG. 3. As will be understood from the description taken in conjunction with FIG. 5, the process for k depicted in FIG. 4B indicates that the process with w=w' is executed K=[k/w] (where k≧w) times and that the process with k mod w=w' (where k<w) is executed once; this is exactly the same process as that depicted in FIG. 5. It is also possible, however, to adopt a method which calculates K=[k/w] as in FIG. 5 and decrements K by 1 upon each calculation. The same holds true with regard to the procedure of operation by the apparatus described later on with respect to FIG. 6.

As will be seen from the above, the basic operation of the modular division apparatus according to the second embodiment of the present invention is the calculation of $S2^{-w}$ mod N. This calculation can be done in FIG. 3 by calculating n' in the modular inversion part 25, s' in the modular reduction means 30A, and $S=q/2^w$ in the modular division part 36 and outputting therefrom the calculation result. That is, in FIG. 5 the processes of steps S2, S3, S5, S6 and S7 are executed and the calculation result in step S7 is output.

Apparatus for Multiplication by Power of Z/NZ

Figure 6:
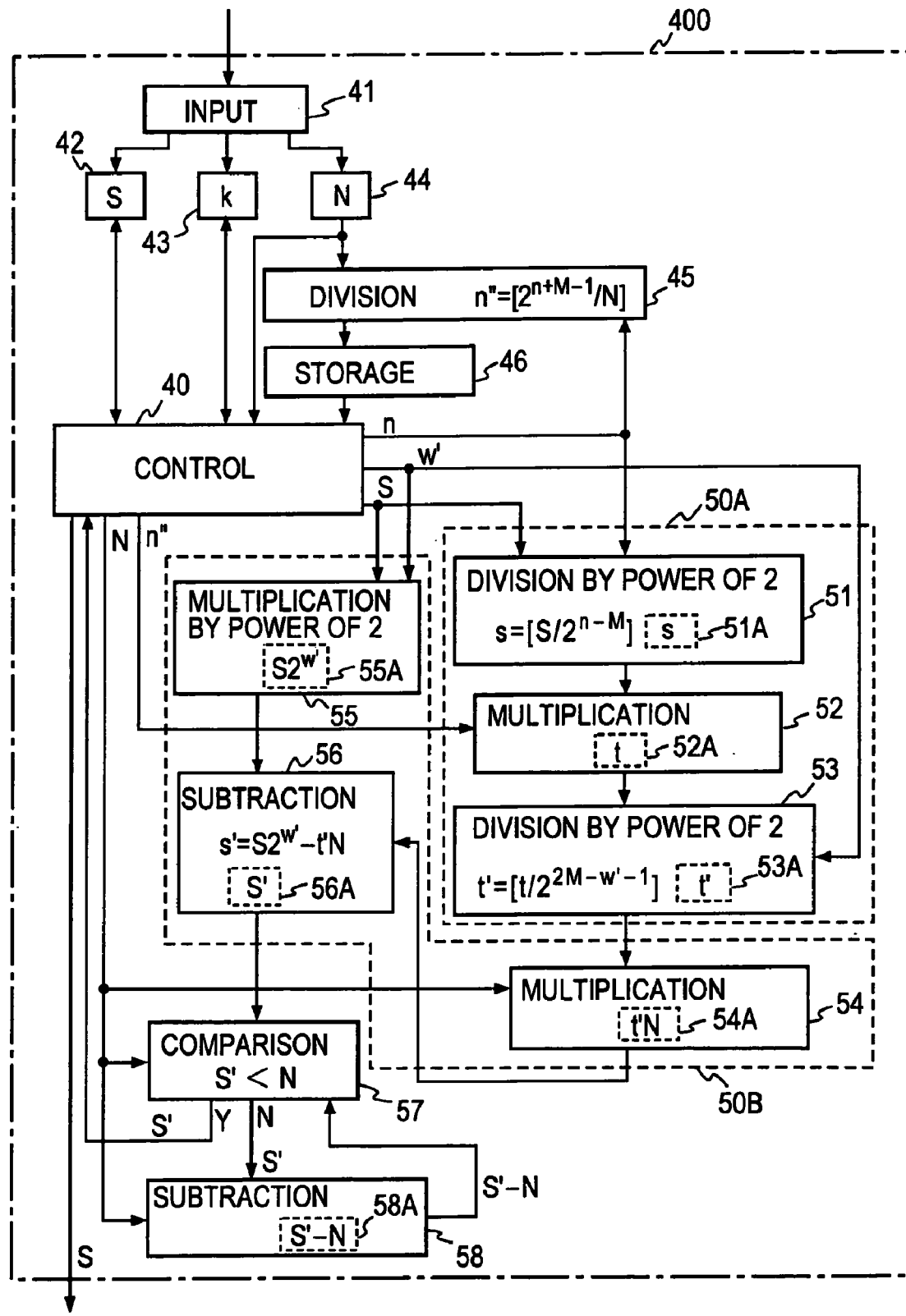
FIG. 6 is a block diagram depicting the functional configuration of an apparatus for multiplication by power of 2 over Z/NZ.

FIG. 6 illustrates an example of an apparatus 400 for multiplication by power of 2 over the Z/NZ according to the second embodiment of the present invention. The apparatus 400 outputs $S2^k$ mod N for inputs S, N and k. Letting M represent the number of bits for unit operation of a computer that implements this apparatus, the number w of bits to be processed at a time in this example is preset such that w≦M. The values S, k and N are input via an input part 41 and stored in storage parts 42, 43 and 44, respectively. For the value N in the storage part 44, n"=[$2^{n+M-1}$/N] is calculated in a division part 45 and the calculation result is stored in a storage part 46. The n in the above is the number of bits of each of the values N and S, and it is provided from a control part 40 to the division part 45. When the same N is input into the apparatus 400 twice or more, the above-mentioned calculation result n"=[$2^{n+M-1}$/N] may be prestored in a memory of the division part 45. This can be done by performing the same process as described above in connection with FIG. 4A.

The control part 40 controls performs the control process for each part and, for the storage part 43, carries out the same processes as depicted in FIG. 4B. Thereafter, the control part 40 inputs the value S from the storage part 42 and a value w', determined in the same manner as is the case with w' in FIG. 4B, into a power-of-2 multiplication part 55, then calculates therein $S2^{w'}$, and stores it in a storage part 55A. Further, the control part 40 inputs the number n of bits and the value S from the storage part 42 into a power-of-2 division part 51, then calculates therein s=[$S/2^{n-M}$], and stores it in a storage part 51A.

The control part 40 inputs the values n" and s from the storage parts 46 and 51A into a multiplication part 52, then calculates t=n"s, and stores the value t in a storage part 52A.

Next, a power-of-2 division part 53 uses the value t from the storage part 52A and the value w' to calculate t'=[t/$2^{2m-w'-1}$] and stores it in a storage part 53A. A multiplication part 54 calculates t'N for the values t' and N provided thereto from the storage parts 53A and 44, respectively, and stores it in a storage part 54A. A subtraction part 56 calculates S'=$S2^{w'}$−t'N for the values t'N and S2w' input thereinto from the storage parts 54A and 55A, respectively, and stores the calculation result S' in a storage part 56A. The calculation of the value S' utilizes the fact that upper M−2 bits of the value −t'N become zeroes. A comparison part 57 compares the value S' and N stored in the storage parts 56A and 44, respectively, and if S'<N, then provides the value S' to the control part 40, which updates the value s in the storage part 42 with the input S'. If S'≧N, the value S' is provided to a division part 58. The division part 58 subtracts from the input S' thereinto the value N in the storage part 44, and returns the subtraction results S'−N as S' to the comparison part 57, which makes a check again to see if S'<N. If so, the comparison part 57 provides the value S' to the control part 40, which updates the value S in the storage part 42 with the input S'.

As is the case with FIG. 4B, the control part 40 updates the value S in the storage part 42 with the input S' provided from the comparison part 57 when S'<N and with the input S'-N from the division part 58 when S'≧N, thereafter returning to Step S1. Then, if k=0, the control part 40 outputs the value S in the storage part 42 as the final result of calculation of $S^{2^k}$ mod N.

Multiplication by Power of 2 over Z/NZ

Figure 7:
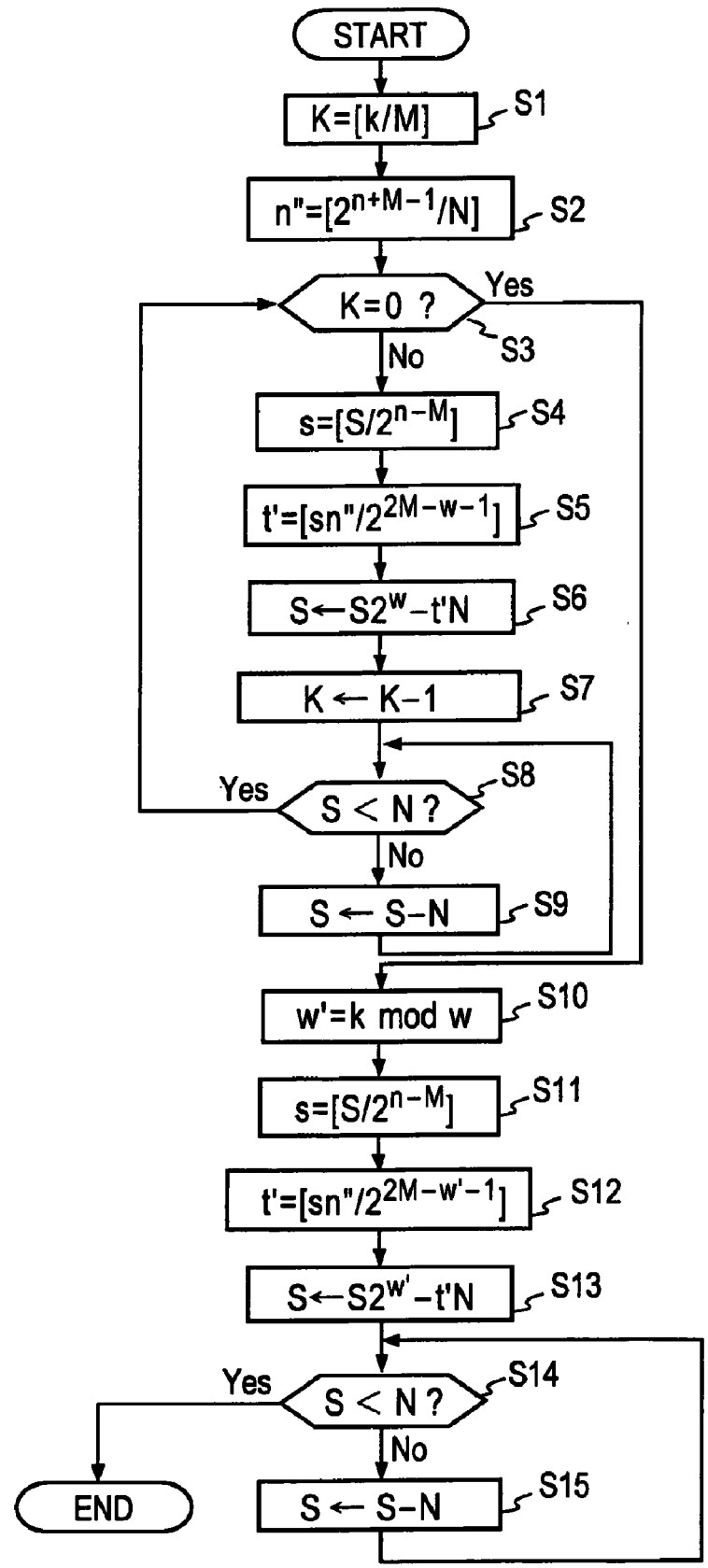
FIG. 7 is a flowchart showing an example of the procedure of multiplication by power of 2 over Z/NZ.

FIG. 7 is a flowchart showing the procedure for multiplication by power of 2 over Z/NZ according to the second embodiment of the present invention. This example also calculates $S^{2^k}$ mod N as is the case with the apparatus depicted in FIG. 6.

Step S1: Calculate K=[k/w]; and
Step S2: Calculate n"=$[2^{n+M-1}/N]$.
Step S3: Repeat the following steps S4 through S8 K=[k/w] times. First, a check is made to see if K=0, and if not, perform the following steps S4 through S9.
Step S4: Calculate s=$[S/2^{n-M}]$;
Step S5: Calculate t'=$[sn"/2^{2M-w-1}]$;
Step S6: Update S with $S2^w$−t'N;
Step S7: Decrement K by 1;
Step S8: Make a check to see if S<N;
Step S9: If not, perform updating S←S−N and return to step S8. If S<N in step S8, return to step S3, and if K=0 in step S3, then perform the following steps S10 through S15.
Step S10: Calculate w'=k mod w;
Step S11: Update n" with $[n"/2^{w-w'}]$;
Step S12: Calculate s=$[S/2^{n-M}]$;
Step S13: Calculate t'=$[sn"/2^{2M-w'-1}]$;
Step S14: Update S with $S2^{w'}$−t'N;
Step S15: Make a check to see if S<N;
Step S16: If not, then update S with S−N and returns to step S15, and if S<N, then outputs S in step S14.

Though not shown in FIG. 7, either, each calculation result is used after being temporarily stored in storage means as depicted in FIG. 6. In the multiplication by power of 2, the basic operation of the present invention is the calculation of $s2^w$ mod N as referred to previously. In FIG. 6, this calculation can be done by calculating n" in the division part 45, t' in the first calculating means 50A composed of the division part 51, the multiplication part 52 and the division part 53, and S' in the second calculating means 50B composed of the multiplication parts 54 and 55 and the subtraction part 56, executing the processes in the comparison part 57 and the subtraction part 58 until S<N is obtained, and outputting the value S' as the result of calculation $S2^w$ mod N.

In FIG. 5, steps S9 through S12 may be performed prior to steps 4 through 8. Similarly, in FIG. 7 steps S3 through S9 may be carried out after steps S10 through S16. All or some of the storage parts 22, 23, 24, 26, 20A and 31A to 36A in FIG. 3 may be formed by individual storage areas of one storage device. Likewise, all or some of the storage parts 42, 43, 44, 46, 51A to 56A and 58A in FIG. 6 may be formed by individual storage areas of one storage device.

Figure 8:
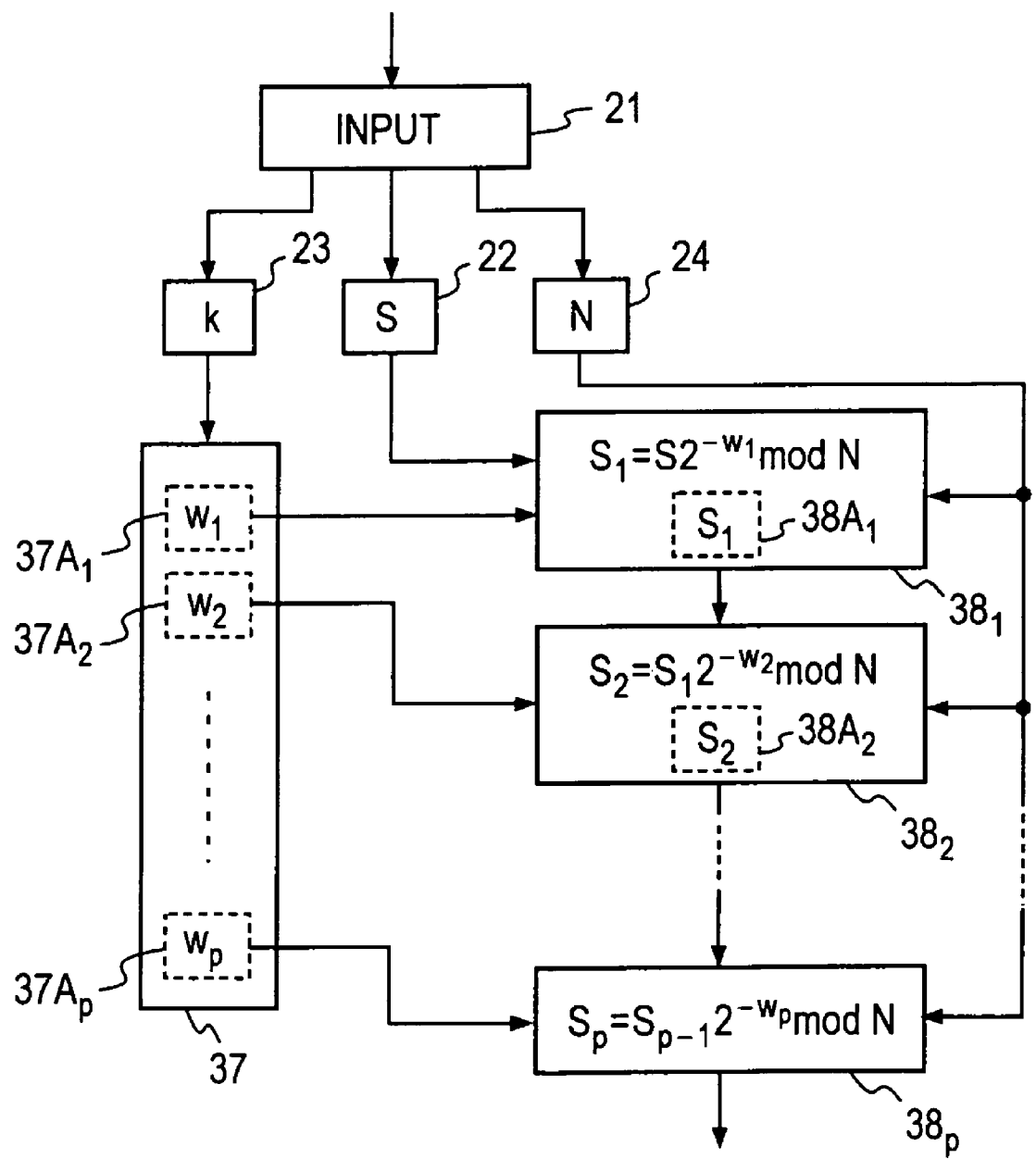
FIG. 8 is an functional block diagram depicting an another example of the division apparatus.

FIG. 8 illustrates an embodiment which calculates division $S2^{-k}$ mod N by power of 2 through the use of a plurality of calculating devices which differ in the number M of bits that are processed at a time. This embodiment employs p calculating devices which perform operations in units of different numbers $w_1, w_2, \ldots, w_p$ of bits. The inputs S, k and N provided via the input part 21 are stored in the storage parts 22, 23 and 24, respectively. The input k is split by splitting part 37 into p pieces of values which satisfy k=$w_1$+$w_2$+,…,+$w_p$(where $w_i$>0, i=1, 2, …, p), and they are stored in storage parts $37A_1, 37A_2, \ldots, 37A_p$. Reference numerals $38_1, 38_2, \ldots, 38_p$ denote power-of-2 dividing devices, each of which is composed of the modular inversion part 25, the modular reduction means 30A, the multiplication/addition means 30B and the division part 36 depicted in FIG. 3. These dividing devices are given $w_1, w_2, \ldots, w_p$, respectively. The dividing device 38, inputs thereinto S, $w_1$, and N, and calculates, through the above-described process with w set as $w_1$, $$S_1 = S2^{-w_1} \bmod N \tag{26}$$

and stores the calculation result in a storage part $38A_1$. The dividing device $38_2$ inputs thereinto $S_1$, $w_1$, and N, and calculates $$S_2 = S2^{-w_2} \bmod N = S2^{-w_1^{-w_2}} \bmod N \tag{27}$$

and stores the calculation result in a storage part $38A_2$. This is followed by similar processing. Finally, the dividing device $38p$ calculates $$S_p = S_{p-1} 2^{-w_p} \bmod N = S2^{-} \bmod N \tag{28}$$

and outputs it as the division result.

Incidentally, all of the p values $w_1, w_2, \ldots, w_p$ need not necessarily to differ but some of them may be equal. That is, for example, in the case of using two calculating devices which perform operation in units of $w_1$ and $w_2$ bits, respectively, the input k is split into k=$aw_1$+$bw_2$+c; the dividing device $38_1$, formed by the calculating device of type carrying out operation in units of $w_1$ bits, performs division a times as described previously with reference to FIG. 3, and the division device $38_2$, formed by the calculating device of the type carrying out operation in units of $w_2$ bits, performs division b times. As for a fraction c smaller than $w_1$ or $w_2$, the division by the dividing device $38_1$ or $38_2$ needs only to be made with $w_1$ or $w_2$ as $w_1$' or $w_2$'. That is, at least two of the p values $w_1$ to $w_p$ differ from the others, and divisions common in the number $w_i$ of bits to be processed at a time are carried out by one of the, dividing devices $38_1$ to $38_p$.

Figure 9:
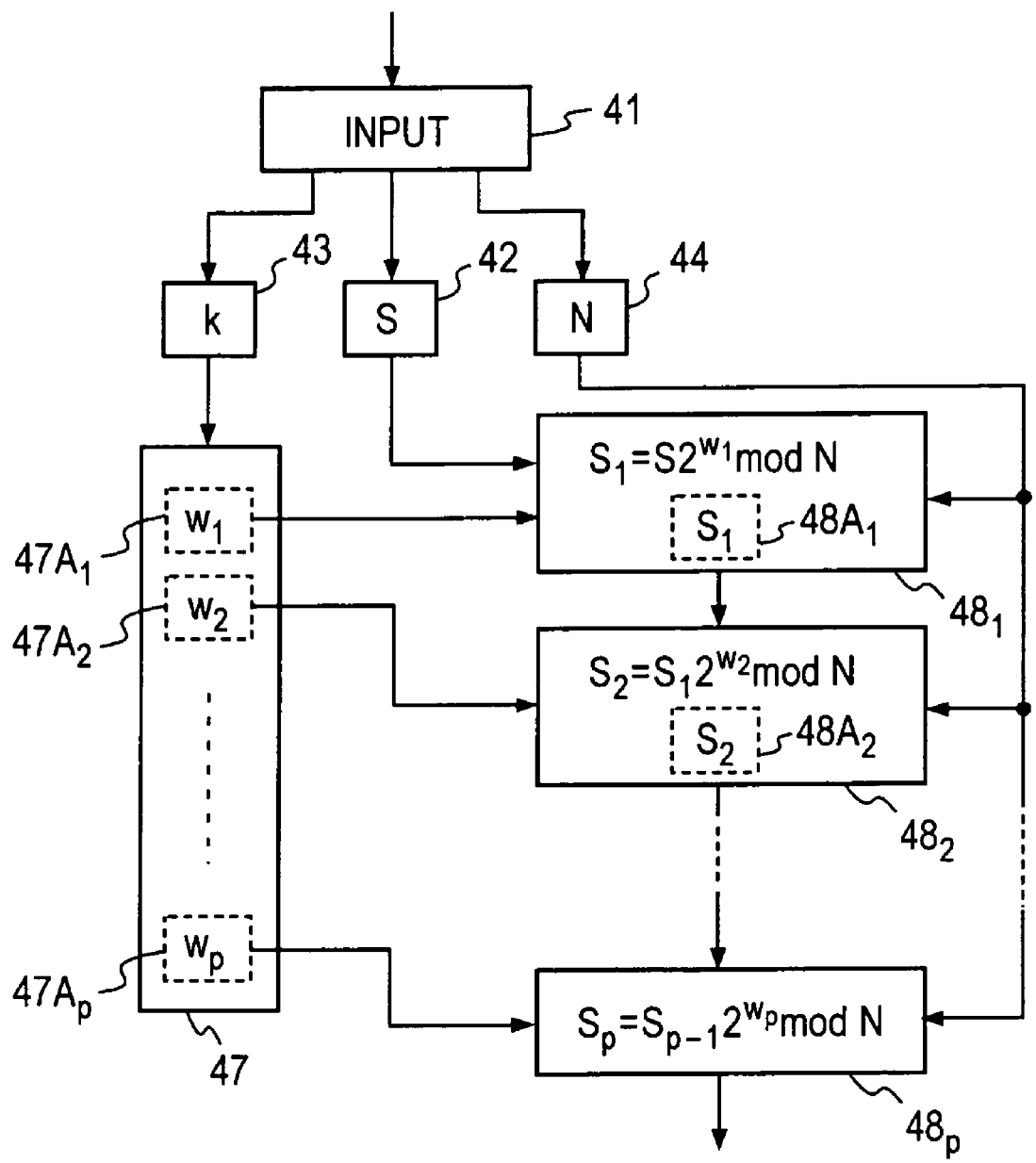
FIG. 9 is an functional block diagram depicting an another example of the multiplication apparatus.

The same holds true with regard to the multiplication by power of 2. An example is shown in FIG. 9. The inputs S, k and N provided via an input part 41 are stored in storage parts 42, 43 and 44, respectively. The input k is split by splitting part 47 into p values which satisfy k=$w_1$+$w_2$+,…,+$w_p$ (where $w_i$>0, i=1, 2, …, p), and they are stored in storage parts $47A_1, 47A_2, \ldots, 47A_p$. The values $w_1 \ldots, w_p$ are predetermined. Reference numerals $48_1, 48_2, \ldots, 48_p$ denote power-of-2 multiplying devices which perform operations in units of $M_1, M_2, \ldots, M_p$ bits, respectively, and each of which is composed of the division part 45, the first calculating means 50A, the second calculating means 50B, the comparison part 57 and the subtraction part 58 in FIG. 6. These multiplying devices are given $w_1, w_2, \ldots, w_p$, respectively. The multiplying device $48_1$ inputs thereinto S, $w_1$ and N, and calculates $S_1 = S2^{w_1}$ mod N through the above-described process with $w_1$ set as w', and stores the calculation result in a storage part $48A_1$. The multiplying device $48_2$ inputs thereinto $S_1$, $w_1$ and N, and calculates, through the above-described process with $S_1$ set as S and $w_2$ as w', $$S_2 = S_1 2^{w_2} \bmod N = S2^{w_1+w_2} \bmod N \tag{29}$$

and stores the calculation result in a storage part $48A_2$. This is followed by similar processing. Finally, the multiplying device $48_p$ calculates, with the input $S_{p-1}$ as S and $w_p$ as w', $$S_p = S_{p-1} 2^w \bmod N = S 2^k \bmod N$$

and outputs it as the multiplication result.

In this example, $w_1 \leq M_1$, $w_3 \leq M_2$, ..., $w_p M_p$, but as is the case with the division, the input k may be split into values which satisfy, for example, $k = aw_1 + bw_2 + c$, and the multiplication is carried out accordingly. In this case, too, the number of multiplying devices $48_1$, $48_2$, ... used is equal to or smaller than p.

The division and multiplication by power of 2, above described in respect of the second embodiment of the invention, are applicable to step 1 and step 3 of the modular inversion in the first embodiment, that is, the division by $2^{-t}$ (when t is positive) or multiplication (when t is negative) in Eq. (7), and the division by $2^{-(k'-2n)} (=2^{2n-k'-t})$ (when k'−2n is positive) or multiplication (when k'−2n is negative) in Eq. (9). More specifically, the division method of the second embodiment can be applied to the division part 14 in FIG. 2 by using the input X, N and t in the first embodiment as the inputs S, N and k in the division method of the second embodiment. The value S' obtainable with the division is provided as the output Y from the division part 14 in FIG. 2. The division method of the second embodiment can be applied to the division part 18A in FIG. 2 by using the inputs S, N and k in the first embodiment as the input S, N and k in the division method of the second embodiment. The value S' obtainable with the division is provided as the output R from the division part 18A in FIG. 2. The multiplication method of the second embodiment can be applied to the multiplication part 18B in FIG. 2 by using the inputs S, N and k in the first embodiment as the inputs S, N and k in the multiplication method of the second embodiment. The value S' resulting from this multiplication is provided as the output R from the multiplication part 18B in FIG. 2.

In these divisions, $n' = -N^{-1} \bmod 2^w$ is a value that is determined only by N and w. In the information security scheme used, N is usually fixed and the number w of bits for simultaneous processing is also fixed. Hence, provision may be made to precalculate n and store it as a constant, for example, in a ROM from which it is read out as required. For example, in the case of applying the division method of the second embodiment to both of the division parts 14 and 18A in FIG. 2, n' is calculated by the calculation in the modular inversion part 25 in FIG. 3 in either case; hence, n' can be used in common to the division parts 15 and 18A in FIG. 2 by precalculating and prestoring it in the storage part 25A in FIG. 3. Further, even if the input X is changed in such a modular inversion as $X^{-1} B^m \bmod N$ (where $B = 2^n$ and m=0, 1, or 2) by the modular inversion apparatus of FIG. 2, the value n' need not be changed. On the other hand, when N takes several predetermined values, n is calculated for each value of N and stored in the storage part 25A in correspondence with each value of N as described previously with reference to FIG. 4A. By this, the value of n' corresponding to a particular value of the input N can be read out of the storage part 25A for use.

Third Embodiment

The process of Step 2 in the Montgomery inversion in the first embodiment of the invention is an extended binary GCD calculation process as mentioned previously. The third embodiment is directed to a method and apparatus for efficient extended binary GCD calculation in the modular inversion by the present invention.

Conventional methods for obtaining the greatest common divider (GCD) are (1) Euclidean algorithm, (2) binary GCD algorithm and (3) algorithm L. The algorithm L is a method intended to improve the efficiency of the Euclidean algorithm for large numbers.

(1) Euclidean Algorithm

The Euclidean algorithm utilizes the fact that when setting $$X_i = Q_i Y_i + R_i \tag{30}$$

the following equation holds true:

$$\gcd(X_i, Y_i) = \gcd(Y_i, R_i) \tag{31}$$

$X_i$ and $Y_i$ are obtained from $X_0$ and $Y_0$ by repeated application of Eq. (30) with $$X_{i+1} = Y_i, Y_{i+1} = R_i \tag{32}$$

Since $$\gcd(X_0, Y_0) = \gcd(X_1, Y_1) = \ldots \gcd(X_j, 0) = X_j \tag{33}$$

$\gcd(X_0, Y_0)$ can be obtained using Eq. (31). (See D. E. Knuth, "The Art OF Computer Programming" Vol. 2, pp. 336, Seminumerical Algorithms.

A concrete example will be described below. For integers $$X_0 = 24, Y_0 = 9$$

the Euclidean algorithm performs such operations as follows:

$$X_1 \leftarrow Y_0 = 9, Y_1 \leftarrow X_0 \bmod Y_0 = 6$$

$$X_2 \leftarrow Y_1 = 6, Y_2 \leftarrow X_1 \bmod Y_1 = 3$$

$$X_3 \leftarrow Y_2 = 3, Y_3 \leftarrow X_2 \bmod Y_2 = 0$$

As a result, $\gcd(X_0, Y_0) = \gcd(X_3, Y_3) = \gcd(3, 0) = 3$ is obtained.

An apparatus for implementing the Euclidean algorithm can be formed by a combination of dividing and multiplying devices.

(2) Binary GCD Algorithm

The binary GCD algorithm is a method that calculates the GCD through utilization of the following fact:

When X is odd and Y even: $\gcd(X, Y) = \gcd(X, Y/2)$
When X is even and Y odd: $\gcd(X, Y) = \gcd(X/2, Y)$
When X is odd and Y odd: $\gcd(X, Y) = \gcd(X, Y-X)$
When X is even and Y even: $\gcd(X, Y) = 2\gcd(X/2, Y/2)$ That is, this method is based on the fact that the following equation holds true $$\gcd(X_{i+1}, Y_{i+1}) = \gcd(X_i, Y_i) \tag{34}$$

for Xi+1 and Yi+1 which is available by performing the following processes when either $X_i$ or $Y_i$ is odd.

(A) When $X_i$ is odd and $Y_i$ even: $X_{i+1} \leftarrow X_i$; $Y_{i+1} \leftarrow Y_i/2$
(B) When $X_i$ is even and $Y_i$ odd: $X_{i+1}, X_i/2$; $Y_{i+1} \leftarrow Y_i$
(C) When $X_i$ is odd and $Y_i$ odd: $X_{i+1}, \leftarrow X_i$; $Y_{i+1} \leftarrow X_i - Y_i/2$ Xi and Yi are obtained from $X_0$ and $Y_0$ by repeated application of the above processes (A), (B) and (C).

Since $$\gcd(X_0, Y_0) = \gcd(X_1, Y_1) = \ldots = \gcd(X_j, 0) = X_j$$

$gcd(X_0, Y_0)$ can be obtained using Eq. (34). (See D. E. Knuth "The Art OF Computer Programming" Vol. 2,) pp. 339, Algorithms A concrete example will be described below. For integers $$X_0=24, Y_0=9$$

the binary GCD calculating method performs such operations as follows:

$$X_1 \leftarrow X_0/2^3 = 3, Y_1 \leftarrow Y_0 = 9$$

$$X_2 \leftarrow X_1 = 3, Y_2 \leftarrow (Y_1 - X_1)/2 = 3$$

$$X_3 \leftarrow X_2 = 3, Y_3 \leftarrow (Y_2 - X_2)/2 = 0$$

Figure 10:
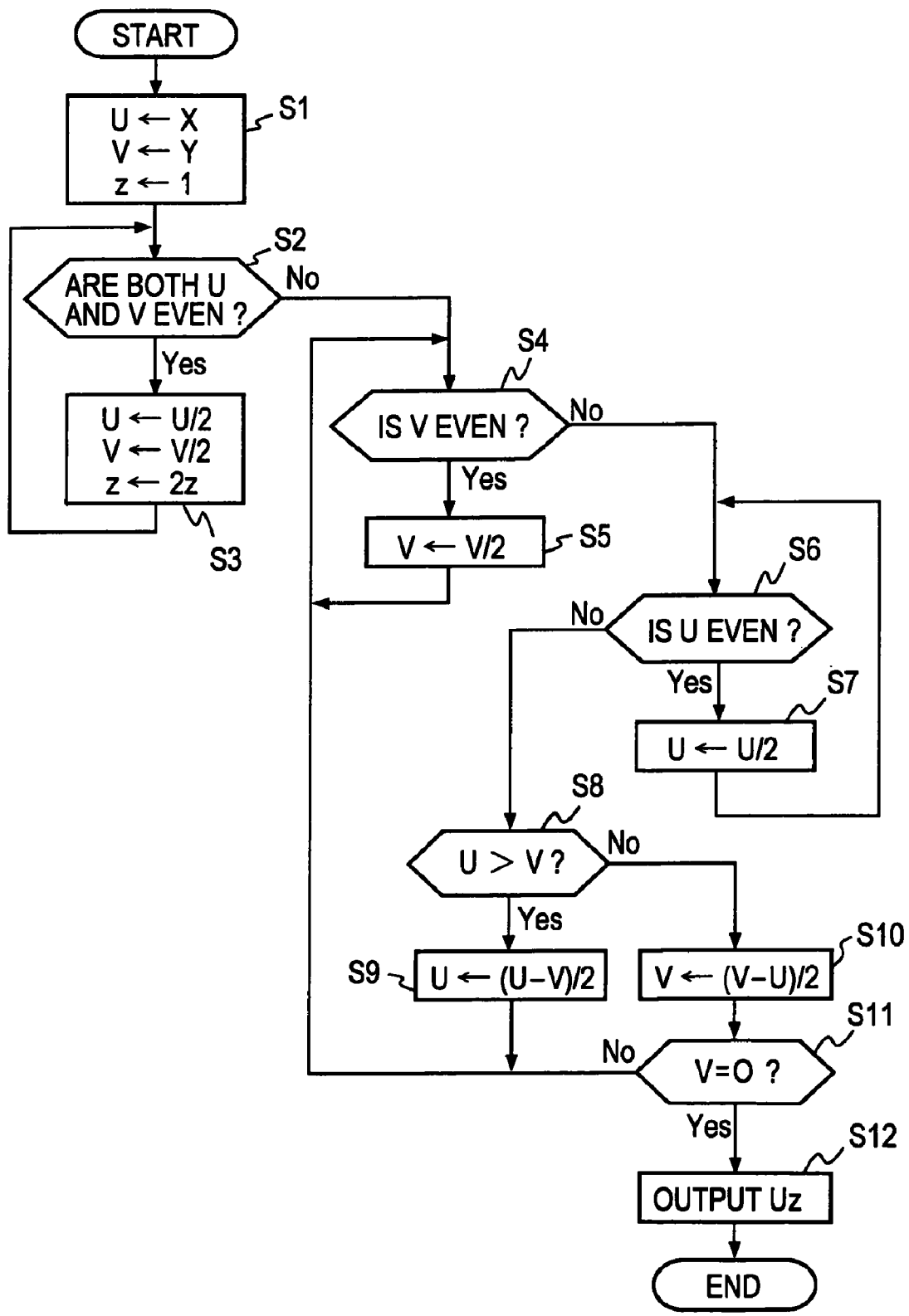
FIG. 10 is a flowchart showing the calculation procedure of a conventional binary GCD algorithm.

As a result, $gcd(X_0, Y_0) = gcd(X_3, Y_3) = gcd(3, 0) = 3$ is obtained;

The binary GCD calculating method can be implemented by such a procedure as depicted in FIG. 10. This example uses variables U and V in correspondence with inputs X and Y, and executes the following processes.

Step S1: Set X and Y as initial values U and V, and set an initial value 1 in a shift count z.

Step S2: Make a check to see if U and V are both even, that is, if the least significant bit is "0."

Step S3: If U and V are both even, then set U/2 and V/2 as U and V, respectively, to double the shift count (one-bit shift operation), and return to step S2.

Step S4: Make a check to see if V is even.

Step S5: If V is even, then set V/2 as V and return to step S4.

Step S6: If U odd, then make a check to see if U is even.

Step S7: If U is even, then set U/2 as U and return to step S6.

Step S8: If U and V are both odd, then make a check to see if U>V.

Step S9: If U>V, then set (U−V)/2 as V and return to step S4.

Step S10: If U≦V, then set (V−U)/2 as V.

Step S11: Make a check to see if V=0, if not, return to step S4.

Step S12: If V=0, then output U×z as the result of calculation of gcd(X, Y).

An apparatus for the binary GCD calculation can be configured only by division and multiplication by power of 2. The multiplication/division by power of 2 is equivalent to the one-bit shift operation, and hence it has the advantage of easy implementation by an electronic circuit or electronic computer. In the Euclidean algorithm and the binary GCD algorithm, when the input values X and Y are large integers, a bit shift operation, division and multiplication for the large integers are carried out a plurality of times. Now, consider the case of performing the binary GCD calculation for integers X and Y that can be expressed, for example, by 512 bits. The repeating number k of the loop in the binary GCD calculation is in the range of the size of the input value to twice the input size (in the range of 512 to 1024 times in this instance), and the binary GCD calculation method performs the bit shift operation k times and a subtraction a maximum of k times (k/2 times on average) (corresponding to step S9 or S10 in FIG. 10). The times for one bit shift operation and one addition/subtraction also increase in proportion to the bit size of the value which is calculated (U, V in this case). Accordingly, the reduction of the number of repetitions of large integer operation leads to speedup of the GCD calculation.

One possible method that has been proposed to reduce the number of repetitions of the large integer operation is to utilize a simulation algorithm described below. This conventional method does not involve the large integer operation, but instead simulates the GCD algorithm by a calculation using small integers in the loop and then carrying out large integer operations through the use of the value obtained by the simulation.

(3) Algorithm L

There has been proposed a method which applies the simulation algorithm to the Euclidean algorithm (see, for example, D. E. Knuth (Translated by Keisuke Nakagawa), "Quasi-Numerical Algorithm/Arithmetic Operation (THE ART OF COMPUTER PROGRAMMING, Vol. 4) pp. 166, Algorithm L, Science-sha, 1986.)

A concrete example will be described below. In the algorithm L, for large integers $$X_0 = 91234567890123456789$$
$$Y_0 = 20000000000000000001$$

values of their upper, for example, 4 digits and values with 1 s added to the values of the 4 digits are determined as such small integers as follows:

$x0_0 = 9123$
$x1_0 = 9124$
$y0_0 = 2000$
$y1_0 = 2001$

Setting $$X_{i+1} = Y_i; Y_{i+1} = X_i \bmod Y_i$$

$$x0_{i+1} = y1_i; y1_{i+1} = x0_i \bmod y1_i$$

$$x1_{i+1} = y0_i; y0_{i+1} = x1_i \bmod y0_i$$

the following equation holds true:

$$x0_i/y1_i < X_i/Y_i < x1_i/y0_i \qquad (35)$$

The algorithm L performs the Euclidean algorithm using $x0_i$, $y1_i$, $x1_i$ and $y0_i$, not $X_i$ and $Y_i$. That is, small integers $x0_i$, $y1_i$, $x1_i$ and $y0_i$ are calculated as long as the integral parts on the right and left sides of Eq. (35) have the same value. This is called a simulation. The values obtained by the simulation are used to calculate the large integers $X_i$ and $Y_i$.

This method produces the same effect as is obtainable by simultaneous execution of large integer operations. (For example, when the small integers $x0_i$, $x1_i$, $y0_i$ and $y1_i$ are 10-digit, operations of about 12 iterations can be performed at a time.) This method is applicable to the binary GCD calculation as well.

The problem of the algorithm L lies in that the simulation requires both of the Euclidean algorithm using $x0_i$, $y1_i$ and the Euclidean algorithm using $x1_i$ and $y0_i$ and that the number of operations which can be performed at a time varies for each input value.

An ordinary computer has storages capable of reading therefrom and writing thereto in units of M bits (where M is 8, 16, 32, . . . ) (Condition 1). Therefore, it would be efficient to perform operations in steps of M bits. For example, the binary GCD algorithm involves one-bit shift operations of large numbers. Under the condition 1, however, the cost of the one-bit-shift operation is equal to or higher than that of the M-bit-shift operation. Further, the present-day computer is provided with M-bit (where M is 8, 16, 32, . . . ) shifters, adders, subtractors and multipliers (Condition 2). In this instance, an under-M-bit operation takes the same amount of time as does the M-bit operation. Accordingly, it is preferable from the viewpoint of efficiency to perform operations in units of M bits.

On the other hand, in the algorithm L the number of bits that can be processed simultaneously varies each time, impairing the merit of the combined operation. To avoid this, the extended binary GCD calculation according to the third embodiment applies the simulation method to the binary GCD algorithm—this can be realized without calculating an error range as described below.

The algorithm L performs the simulation using the small integers $x0_i$, $x1_i$, $y0_i$ and $y1_i$ instead of using $X_i$ and $Y_i$. The integers $x0_i$ and $x1_i$ represent the lower and upper limits of the value that $X_i$ may take, and $y0_i$ and $y1_i$ the lower and upper limits of the value that $Y_i$ may take. The simulation is continues until the difference between the upper and lower limits (the error range) grows to some extent.

In contrast thereto, in the extended binary GCD calculation method of this third embodiment the small integer representing the value $X_i$ is limited specifically to the intermediate value $x_a$ between the upper and lower limits. Further, the simulation is carried out a predetermined number of times w without calculating the error range.

This provides the two advantages mentioned below.

(1) Since a larger number of simulations can be carried out at a time than in the case of using the error range, the number of repetitions of the multi-precision calculation decreases accordingly.

(2) A bit-shift operation can be performed in units of a fixed number w' of bits.

With these advantages, the binary GCD calculation becomes faster.

The algorithm L performs the same operation as those of the Euclidean algorithm and the binary GCD calculation method, but the extended binary GCD calculation method according to the third embodiment may sometimes perform different operations. For example, the binary GCD calculation method compares U and V in the loop to determine which value is larger. If the values U and V are far apart from each other, the comparison can be made by checking their several upper digits alone. With the values U and V close to each other, however, the comparison cannot be made sometimes based only on small integers $u_a$ and $v_a$ (corresponding to several upper digits of U and V) which are used to simulate the calculations of U and V. In such a situation, it is customary in the algorithm L to once end the simulation and recalculate the values U and V for a second comparison.

In the extended binary GCD calculation method of this embodiment, however, the simulation is continued even in such an instance. Accordingly, this method may sometimes make an error in determining which value is larger than the other. Such an error makes the values U and V negative. (This never happens in the algorithm L.) By setting gcd(U, V)=gcd (|U|. |V|), however, the extended binary GCD calculation method is prevented from outputting a wrong answer. With this scheme, as compared with the algorithm L, the extended binary GCD calculation method of this embodiment is large in the number of operations for simultaneous execution but small in the number of repetitions of the multi-precision calculation. Moreover, the calculation method of this embodiment permits calculations in blocks of a predetermined number of bits (w' bits).

Algorithm for GCD Calculation

To facilitate a better understanding of the extended binary GCD calculation method of the third embodiment, a description will be given first of a calculation method which is used when the principle of the third embodiment is applied to an ordinary binary GCD calculation. Step S1 (Multi-Precision Value Initialization):

$U \leftarrow Y; V \leftarrow X; S \leftarrow 0; T \leftarrow 1$

Step S2 (Single-Precision Value Initialization):
 $i \leftarrow \max(\text{size of V; size of U})$
 $V_a \leftarrow$ upper w bits of V; $u_a \leftarrow$ upper w bits of U
 $V_x \leftarrow$ lower w bits of V; $u_x \leftarrow$ lower w bits of U $$G \leftarrow \begin{bmatrix} 1 & 0 \\ 0 & 1 \end{bmatrix}$$

If $i \leqq w$, then go to step S5.

Step S3 (Single-Precision Calculation Loop): Repeat the Following Process w Times.
 (1) If $u_x$ is even, $$u_a \leftarrow [u_a/2]; u_x \leftarrow u_x/2; G \leftarrow \begin{bmatrix} 1 & 0 \\ 0 & 2 \end{bmatrix} G$$

(2) If $v_x$ is even, $$v_a \leftarrow [v_a/2]; v_x \leftarrow v_x/2; G \leftarrow \begin{bmatrix} 2 & 0 \\ 0 & 1 \end{bmatrix} G$$

(3) If $v_x$ and $u_x$ are odd and if $u_a > V_a$, $$u_a \leftarrow [(u_a - v_a)/2]; u_x \leftarrow (u_x - v_x)/2; G \leftarrow \begin{bmatrix} 1 & 1 \\ 0 & 2 \end{bmatrix} G$$

(4) If $v_x$ and $u_x$ are odd and if $u_a \leqq v_a$, $$v_a \leftarrow [(v_a - u_a)/2]; v_x \leftarrow (v_x - u_x)/2; G \leftarrow \begin{bmatrix} 2 & 0 \\ 1 & 1 \end{bmatrix} G$$

Step S4 (Multi-Precision Value Recalculation):

$$\begin{bmatrix} U' \\ V' \end{bmatrix} \leftarrow G \begin{bmatrix} U \\ -V \end{bmatrix}$$

$U \leftarrow |U'|/2^w; V \leftarrow |V'|/2^w$

If V=0, then go to step S5, otherwise, go to step S2.

Step S5 (Final Processing):
 If V=0, then output U.
 If V≠0, calculate and output gcd(U, V) (single-precision calculation with w or fewer bits)

Validity of the Algorithm

Lemma 1: When the above algorithm halts, it outputs gcd(X, Y).

Proof: The above algorithm always satisfies gcd(U, V)=gcd(X, Y).

This will be proved below by induction.
 1. In step S1, since U=X and V=Y, gcd(U, V)=gcd(X, Y) holds true.
 2. In steps S3 and S4, a calculation corresponding to any one of the following operations is carried out.

When U is even: U←U/2
When V is even: V←V/2
When U and V are both odd and U>V: U←(U−V)/2
When U and V are both odd and U<V:V←(V−U)/2

That is, if gcd(U, V)=gcd(X, Y) at the beginning of step S3, then gcd(U<V)=gcd(X, Y) holds at the end of step S4, too. Here, gcd(U, V)=gcd(|U|, |V|).

Therefore, the above algorithm outputs gcd(X, Y) when it halts. Grounds for Halt of the Above Algorithm Lemma2: If $w \geqq 4$, the above algorithm halts in finite time.

Proof: The values of U and V in step S2 are set as $U_0$ and $V_0$, respectively, and U and V are recalculated as $U_1$ and $V_1$ in step S4. At this time, the following equation needs only to be shown.

$$U_0 + V_0 > U_1 + V_1$$

In the above algorithm U+V decreases monotonically, and when $U+V<2^w$ is obtained, step S5 is carried out, and the algorithm halts. The inventors can prove that the above equation holds, but no description will be given of the proof.

GCD Calculating Apparatus

Figure 11:
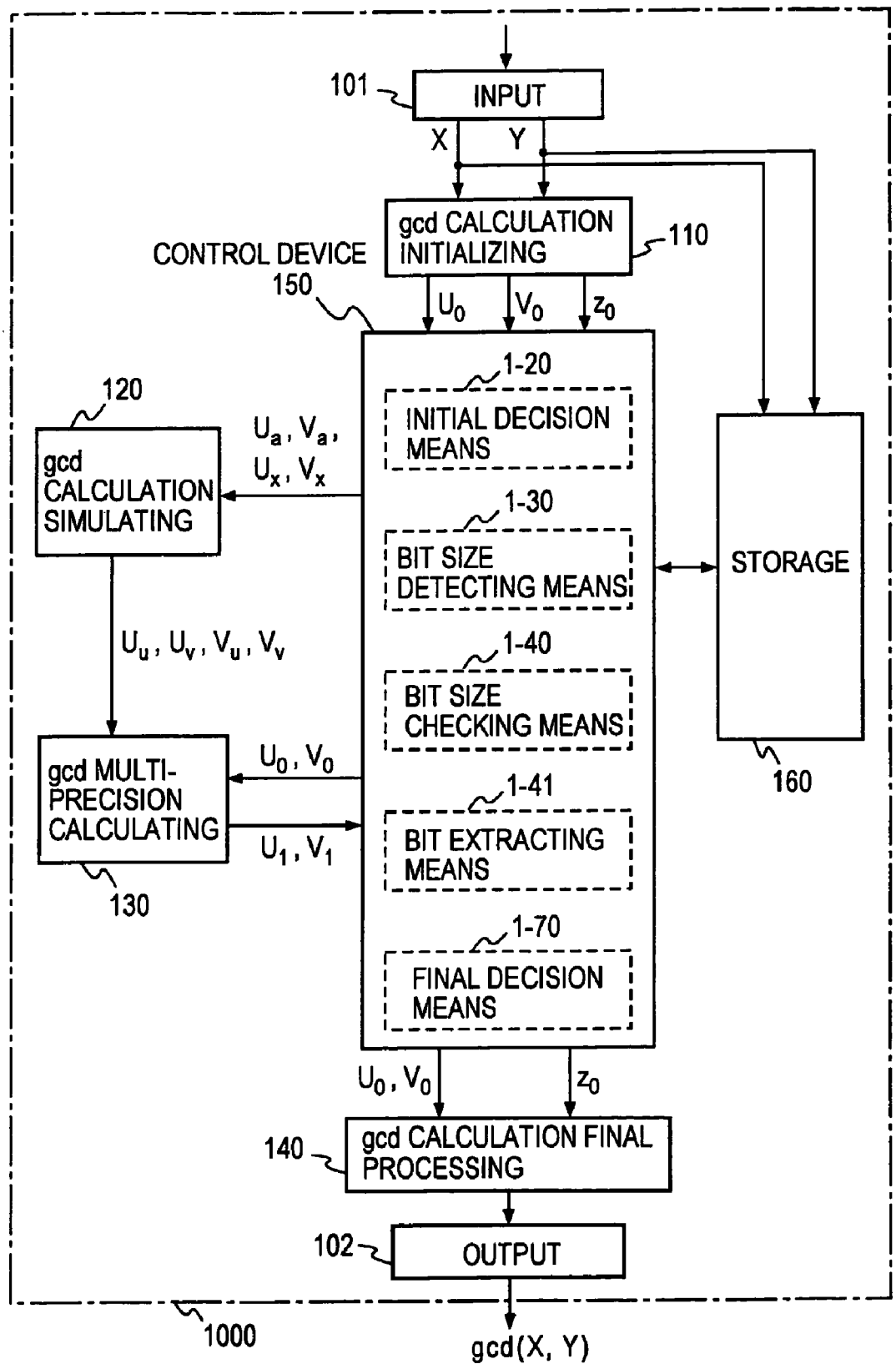
Figure 12:
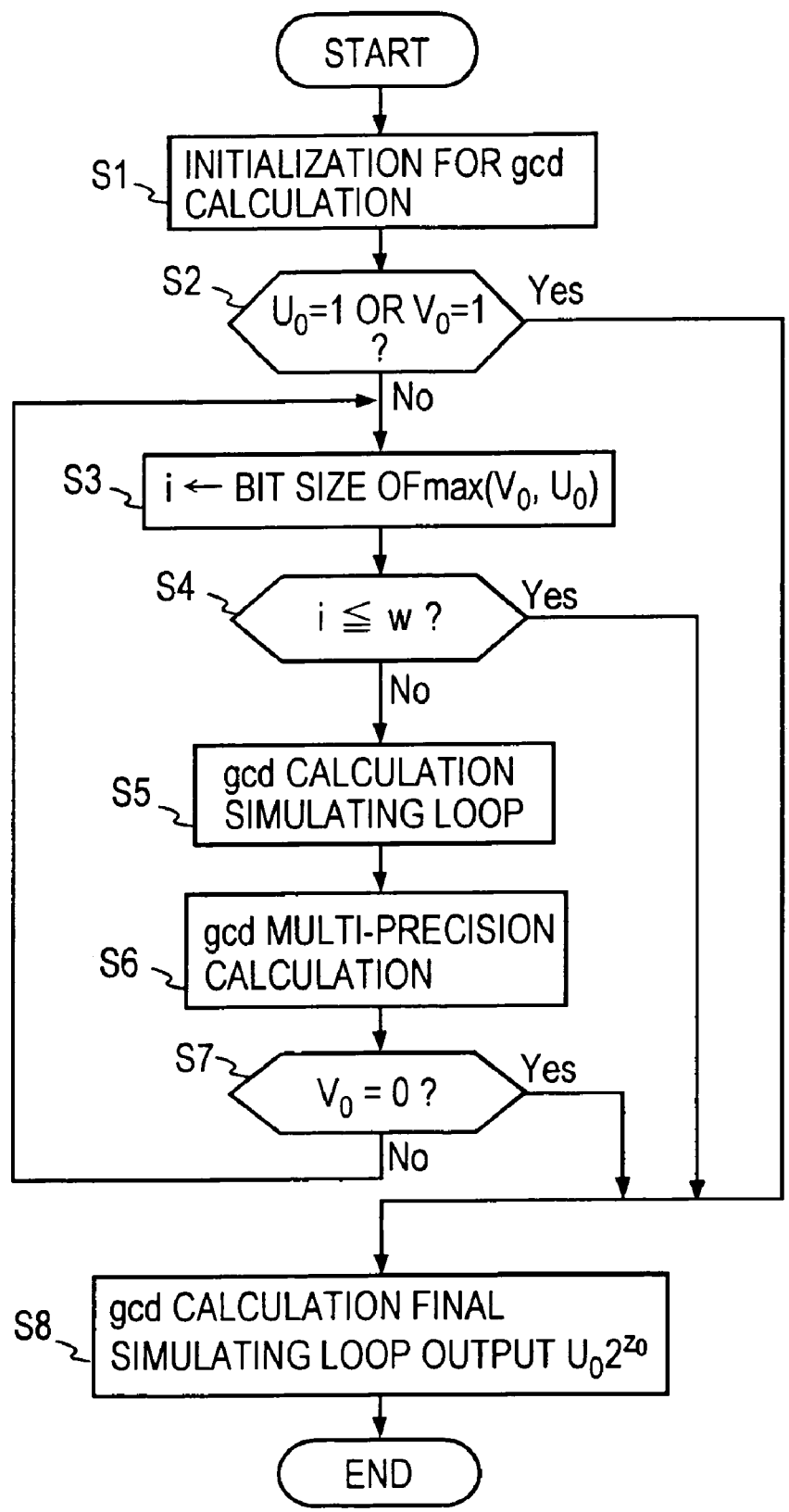
FIG. 12 is a flowchart showing the flow of operation of the apparatus depicted in FIG. 11.

Turning next to FIGS. 11 and 12, a GCD calculation apparatus 1000 will be described. The apparatus 1000 inputs thereinto X and Y via an input part 102 and outputs gcd(X, Y) via an output part 102. The apparatus 1000 comprises a GCD calculation initializing part 110, a GCD calculation simulating part 120, a GCD multi-precision calculating part 130, a GCD calculation final processing part 140, a control device 150 and a storage part 160, and performs such calculations as described below.

Step S1: The GCD calculation initializing part 110 performs, for inputs X and Y, the following operation $$\gcd(X, Y) = 2^{z_0} \gcd(U, V) \qquad (36)$$

to find U and V which maximize z0, then provides U and V as $U_0$ and $V_0$, to the control device 150, and provides $z_0$ to the GCD calculation final processing part 140 through the control device 150.

Step S2: The control device 150 checks the inputs $U_0$ and $V_0$ to see if $U_0=1$ or $V_0=1$. If $U_0=1$ or $V_0=1$, then the control device 150 provides $U_0$ and $V_0$ to the GCD calculation final processing part 140.

Step S3: If not so, then the control device 150 calculates the bit size value i of that one of the inputs $U_0$ and $V_0$ which has a larger bit size.

Step S4: The control device 150 makes a check to see if the bit size i is smaller than the w-bit size. If so, the control device 150 provides $U_0$ and $V_0$ to the GCD calculation final processing part 140. If the bit size i is not smaller than the w-bit size, the following values are provided to the GCD calculation simulating part 120:

$v_a$=Upper w bits (i-th to (i−w+1)th bit) of $V_0$ $u_a$=Upper w bits (i-th to (i−w+1)th bit) of $U_0$ $v_x$=Lower w bits of $V_0$ $u_x$=Lower w bits of $U_0$ And $U_0$ and $V_0$ are provided to the GCD multi-precision calculating part 130.

Step S5: The GCD calculation simulating part 120 simulates the GCD calculation as described later on with reference to FIGS. 15 and 16, using the values $v_a$, $u_a$, $v_x$ and $u_x$ which correspond to the upper and lower w bits of $U_0$ and $V_0$. The resulting values $U_u$, $u_v$, $v_u$ and $v_v$ are provided to the GCD multi-precision calculating part 130.

Step S6: The GCD multi-precision calculating part 130 calculates $$U_0 \leftarrow |u_u U_0 - u_v V_0|/2^w; V_0 \leftarrow |v_v V_0 - v_u U_0|/2^w$$

and provides the calculation results as updated $U_0$ and $V_0$ to the control device 150.

Step S7: The control device 150 makes a check to see if $V_0=0$ and, if not, returns to step S3; if $V_0=0$, the control device 150 provides $U_0$ and $V_0$ to the GCD calculation final processing part 140.

Step S8: The GCD calculation final processing part 140 calculates $2^{z_0} \gcd(U_0, V_0)$ from the inputs $U_0$, $V_0$ and $z_0$ and outputs it. If $V_0=0$, $2^{z_0}\gcd(U_0, 0)=U_0 2^{z_0}$ is output.

Accordingly, the control device 150 comprises: initial decision means 1-20 for making a check to see if $U_0=1$ or $V_0=1$; a bit size detecting means 1-30 for detecting the bit size value i of that one of the inputs $V_0$ and $U_0$ which has a larger bit size; a bit size checking means 1-40 for making a check to see if the bit size is smaller than w; final decision means 1-70 for making a check to see if $V_0=0$; and bit extracting means 1-41 for extracting the upper and lower w bits from the input $V_0$ and $U_0$ in step S4. Further, the GCD calculating apparatus 1000 is provided with a storage part 160 for storing various pieces of data and data necessary for calculations, control and so forth.

GCD Calculation Initializing Part 110

Figure 13:
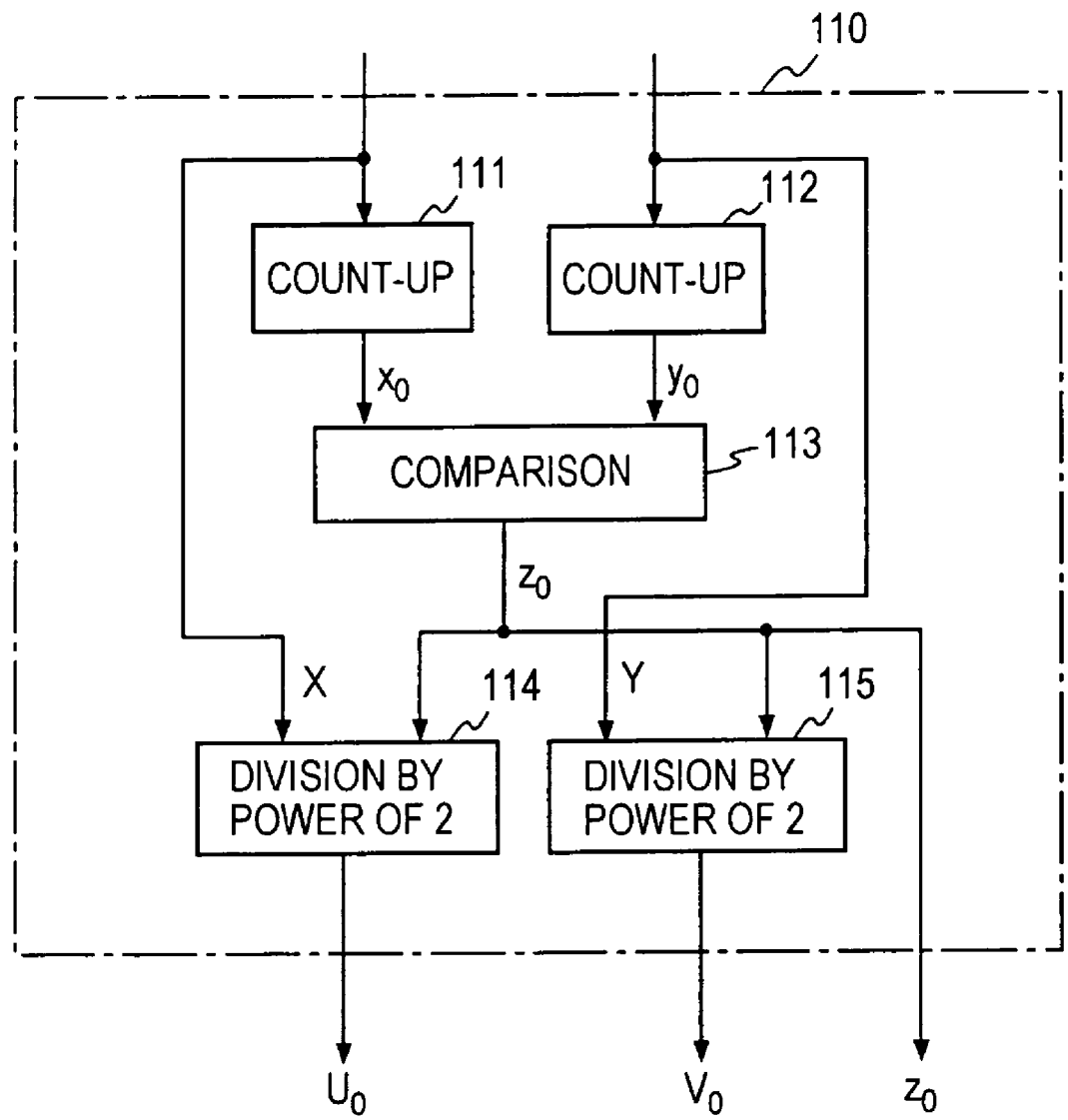
FIG. 13 is a functional block diagram depicting a GCD calculation initializing part 10 in FIG. 11.
Figure 14:
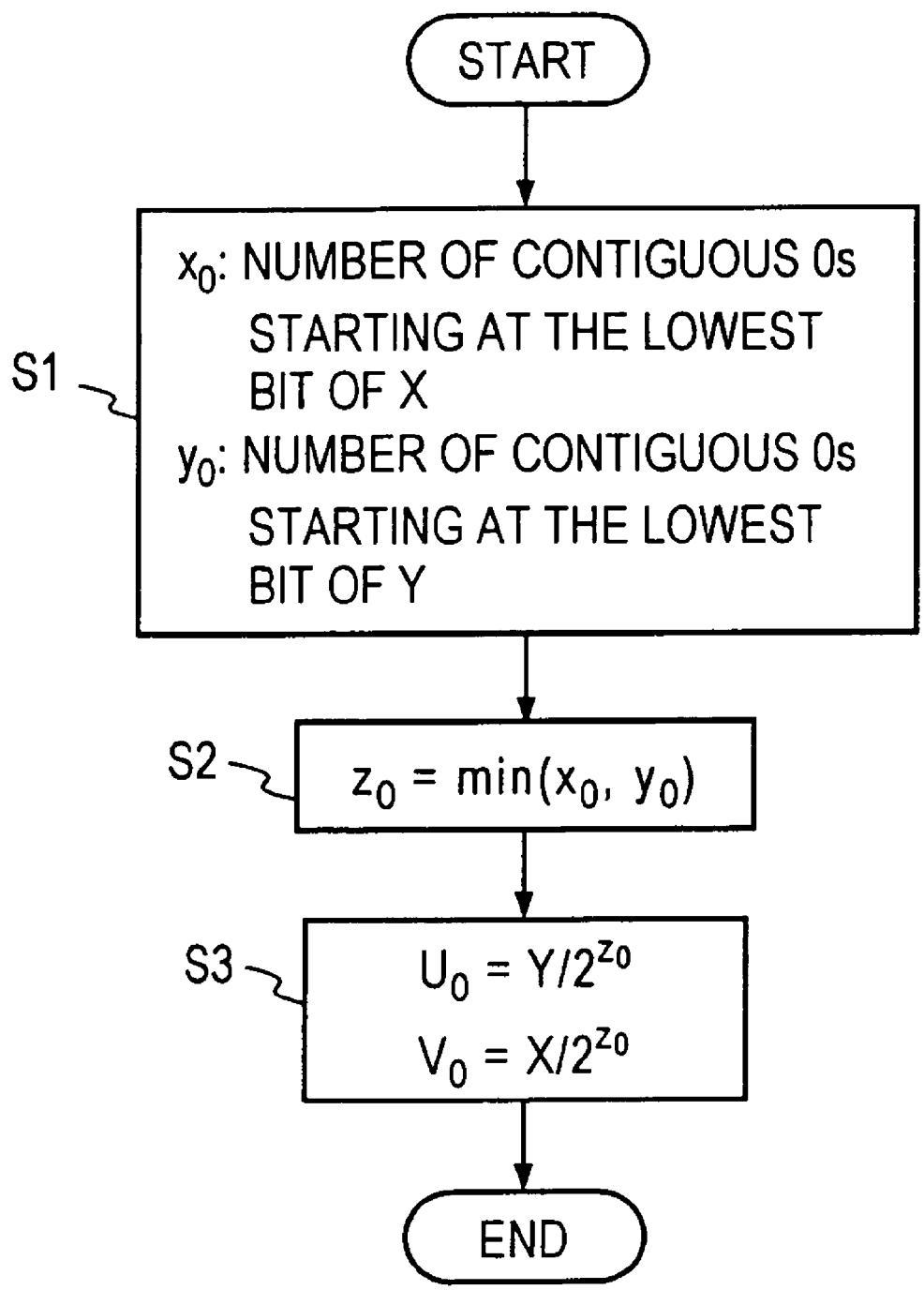
FIG. 14 is a flowchart showing the flow of operation of the initializing part 110 depicted in FIG. 13.

Referring to FIGS. 13 and 14, the operation of the GCD calculation initializing part 110 will be described below.

Step S1: Count-up parts 111 and 112 count the number of zeroes continuing from the least significant bits of the inputs X and Y, respectively, and outputs [the count values $x_0$ and $y_0$ to a comparison part 113. (For example, when the binary representation of the input is 101000, the output is 3.)

Step S2: The comparison part 113 compares the input values $x_0$ and $y_0$, and outputs the smaller one as $z_0$.

Step S3: Power-of-2 division parts 114 and 115 are supplied with the inputs X and Y and $z_0$, and divide the input values X and Y by $2^{z_0}$ and outputs the division results $U_0$ and $V_0$. The GCD calculation initializing part 110 outputs $U_0$, $V_0$ and $z_0$.

GCD Calculation Simulating Part 120

Figure 15:
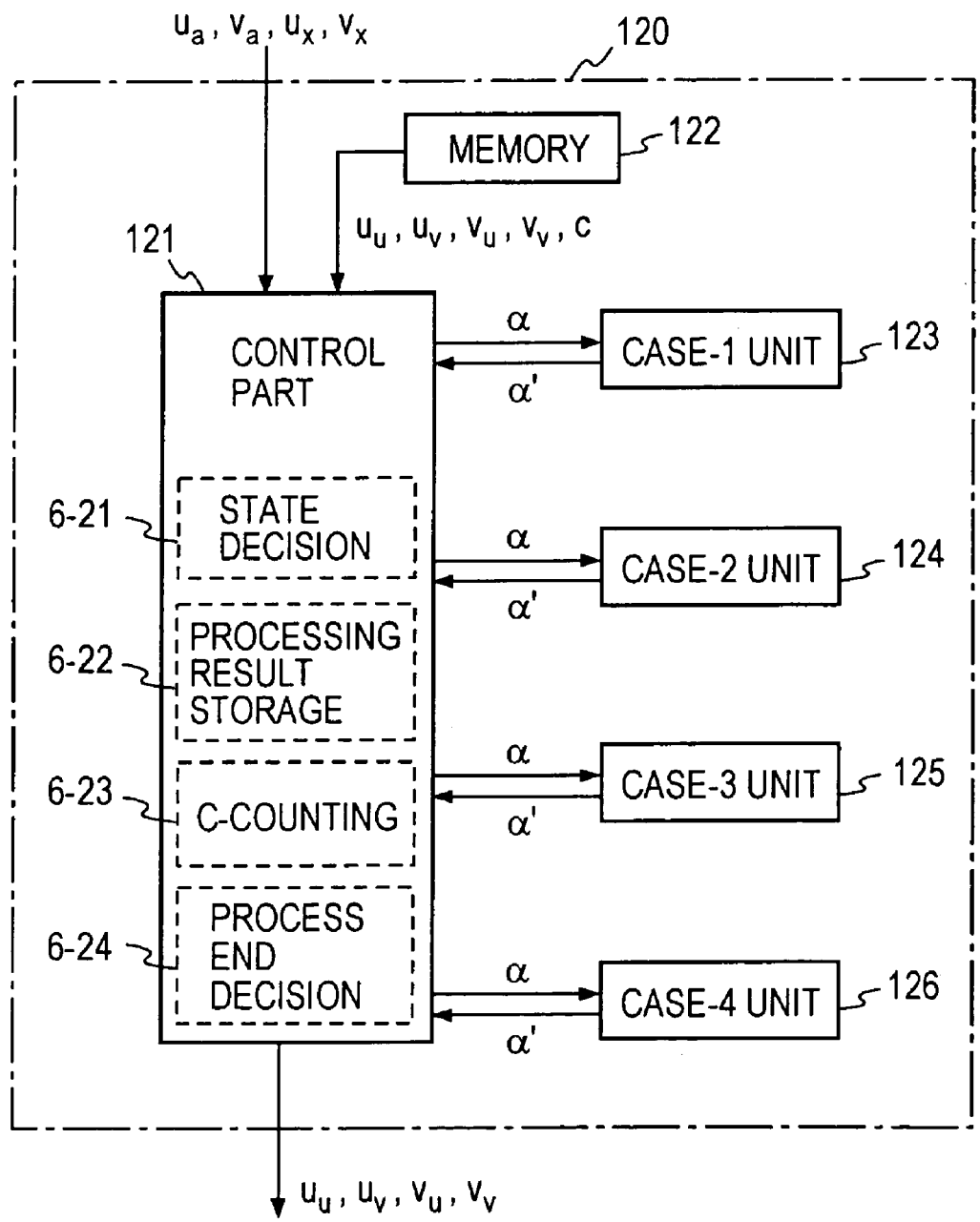
FIG. 15 is functional block diagram depicting a GCD calculation simulating part 120 in FIG. 11.
Figure 16:
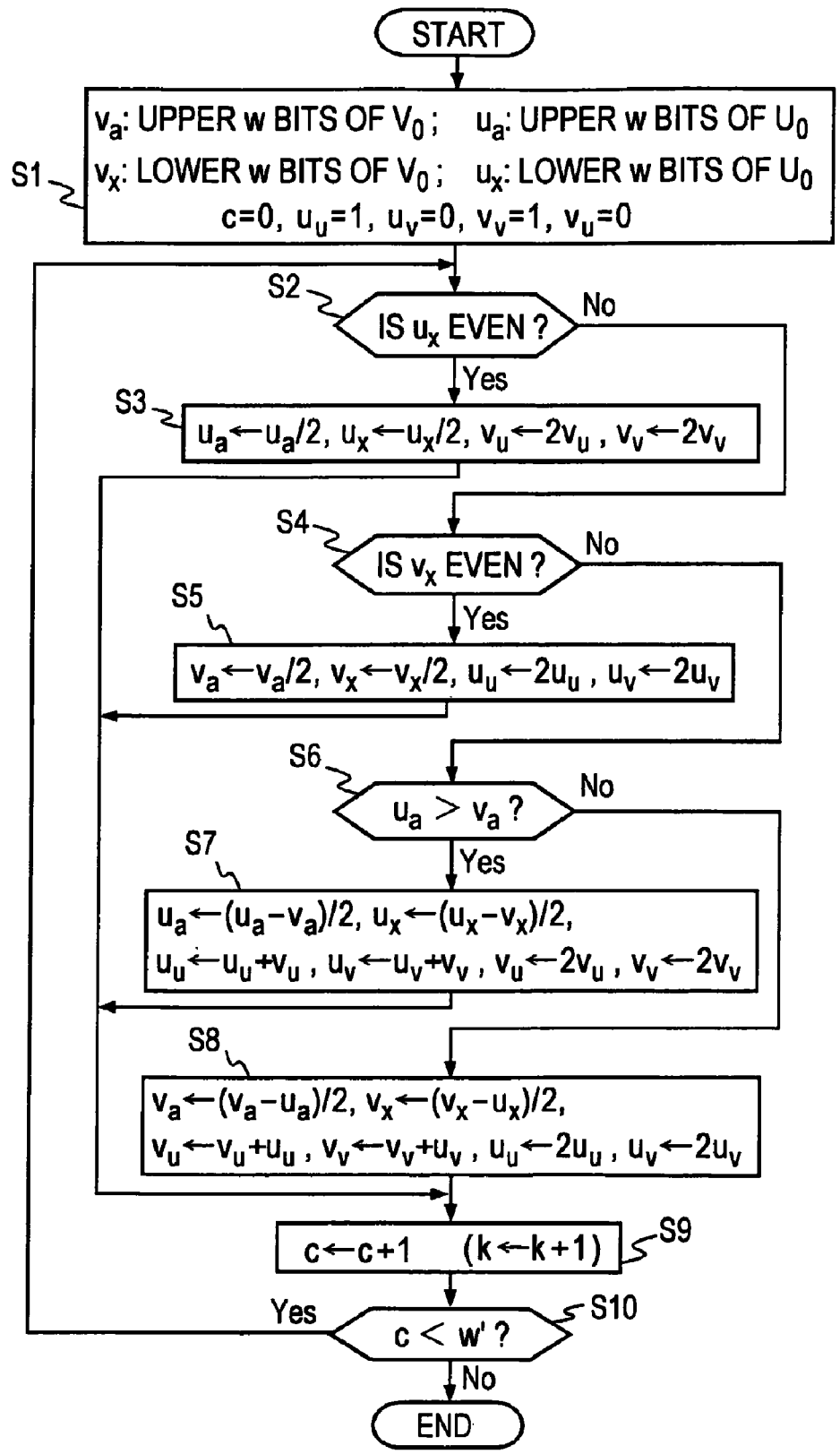
FIG. 16 is a flowchart showing the flow of operation of the calculation simulating part 120 depicted in FIG. 15.

Referring next to FIGS. 15 and 16, the operation of the GCD calculation simulating part 120 will be described below.

Step S1: Upon inputting of the values $v_a$, $u_a$, $v_x$ and $u_x$ into a control part 121 from the control device 150, a memory 122 sends predetermined initial values of $u_u$, $u_v$, $v_u$, $v_v$ and c to the control part 121.

Step S2: when supplied with data α={$v_a$, $u_a$, $v_x$, $u_x$, $u_u$, $u_v$, $v_u$, $v_v$, c}, the control part 121 makes a check to see if $u_x$ is even. If so, the control part 121 sends the data α={$v_a$, $u_a$, $v_x$, $u_x$, $u_u$, $u_v$, $v_u$, $v_v$, c} to a case-1 unit 123.

Step S3: When $u_x$ is even, the case-1 unit 123 performs the following calculations:

$$u_a \leftarrow [u_a/2]; u_x \leftarrow u_x/2$$

$$v_u \leftarrow 2v_u; v_v \leftarrow 2v_v$$

and sends data α'={$v_a$, $u_a$, $v_x$, $u_x$, $u_u$, $u_v$, $v_u$, $v_v$, c} to the control part 121.

Step S4: When $u_x$ is not even, the control part 121 makes a check to see if $v_x$ is even. If so, the control part 121 sends the data α={$v_a$, $u_a$, $v_x$, $u_x$, $u_u$, $u_v$, $v_u$, $v_v$, c} to a case-2 unit 124.

Step S5: When $u_x$ is odd and $v_x$ even, the case-2 unit 124 performs the following calculations:

$$v_a \leftarrow [v_a/2]; v_x \leftarrow v_x/2$$

$$u_u \leftarrow 2u_u; u_v \leftarrow 2u_v$$

and sends data $\alpha' = \{v_a, u_a, v_x, u_x, u_x, u_u, u_v, v_v, c\}$ to the control part 121.

Step S6: When $u_x$ and $v_x$ are both odd, the control part 121 compares $u_a$ and $v_a$. If $u_a > v_a$, then the control part 121 sends the data $\alpha = \{v_a, u_a, v_x, u_x, u_u, u_v, v_u, v_v, c\}$ to a case-3 unit 125. When $u_x$ and $v_x$ are both odd and $u_a \leq v_a$, the control part 121 sends the data $\alpha = \{v_a, u_a, v_x, u_x, v_u, v_v, c\}$ to a case-4 unit 126.

Step S7: When $u_x$ and $v_x$ are both odd and $u_a > v_a$, the case-3 unit 125 performs the following calculations:

$$u_a \leftarrow [(u_a-v_a)/2]; u_x \leftarrow (u_x-v_x)/2$$

$$u_u \leftarrow u_u + v_u; u_v \leftarrow u_v + v_v$$

$$v_u \leftarrow 2v_u; v_v \leftarrow 2v_v$$

and sends the data $\alpha' = \{v_a, u_a, v_x, u_x, u_u, u_v, v_u, v_v, c\}$ to the control part 121.

Step S8: When $u_x$ and $v_x$ are both odd and $u_a \leq v_a$, the case-4 unit 126 performs the following calculations:

$$u_a \leftarrow [(v_a-u_a)/2]; v_x \leftarrow (v_x-u_x)/2$$

$$v_u \leftarrow v_u + u_u; v_v \leftarrow v_v + u_v$$

$$u_u \leftarrow 2u_u; u_v \leftarrow 2v_v$$

and sends the data $\alpha' = \{v_a, u_a, v_x, u_x, u_u, u_v, v_u, v_v, c\}$ to the control part 121.

Step S9: When the data a is processed in any one of the case-1 to case-4 units 123 to 126 and returned as ax to the control part 121, which increments the value c by one.

Step S10: The control part 121 compares the values c and w, and if c<w', returns to step S2. If c=w', the GCD calculation simulating part 120 provides $\{u_u, u_v, v_u, v_v\}$ to the GCD multi-precision calculating part 130.

The control part 121 is provided with: state decision means 6-21 for deciding which of the case units 123 to 136 is to perform processing according to the states of the input values $u_x$, $v_x$, $u_a$ and $v_a$; processing result storage means 6-22 for storing the processing results by the case-1 to case-4 units 123 to 126; counting means 6-23 for counting the repeating number c of processing; and process end decision means 6-24 for deciding whether to finish the processing, that is, for deciding whether or not c=w'.

The GCD calculation simulating part 120 determines whether $U_0$ and $V_0$ are even or not based on the values $u_x$ and $v_x$ of their lower w bits, and compares $U_0$ and $V_0$ to determine which of them is larger based on the values $u_a$ and $v_a$ of their upper w bits. Based on such determination results, the GCD calculation simulating part 120 performs the same process as does the conventional binary GCD algorithm. This will readily be understood from a comparison between the procedure of FIG. 16 and the procedure of the conventional binary GCD algorithm depicted in FIG. 10. Further, the GCD calculation simulating part 120 is to calculate $u_u$, $u_v$, $v_u$ and $v_v$ which satisfy the following equation:

$$\gcd(U_0, V_0) = \gcd(|u_u U_0 - u_v V_0|/2^{w'}, |v_v V_0 - v_u U_0|/2^{w'}) \quad (37)$$

GCD Multi-Precision Calculating Part 130

Figure 17:
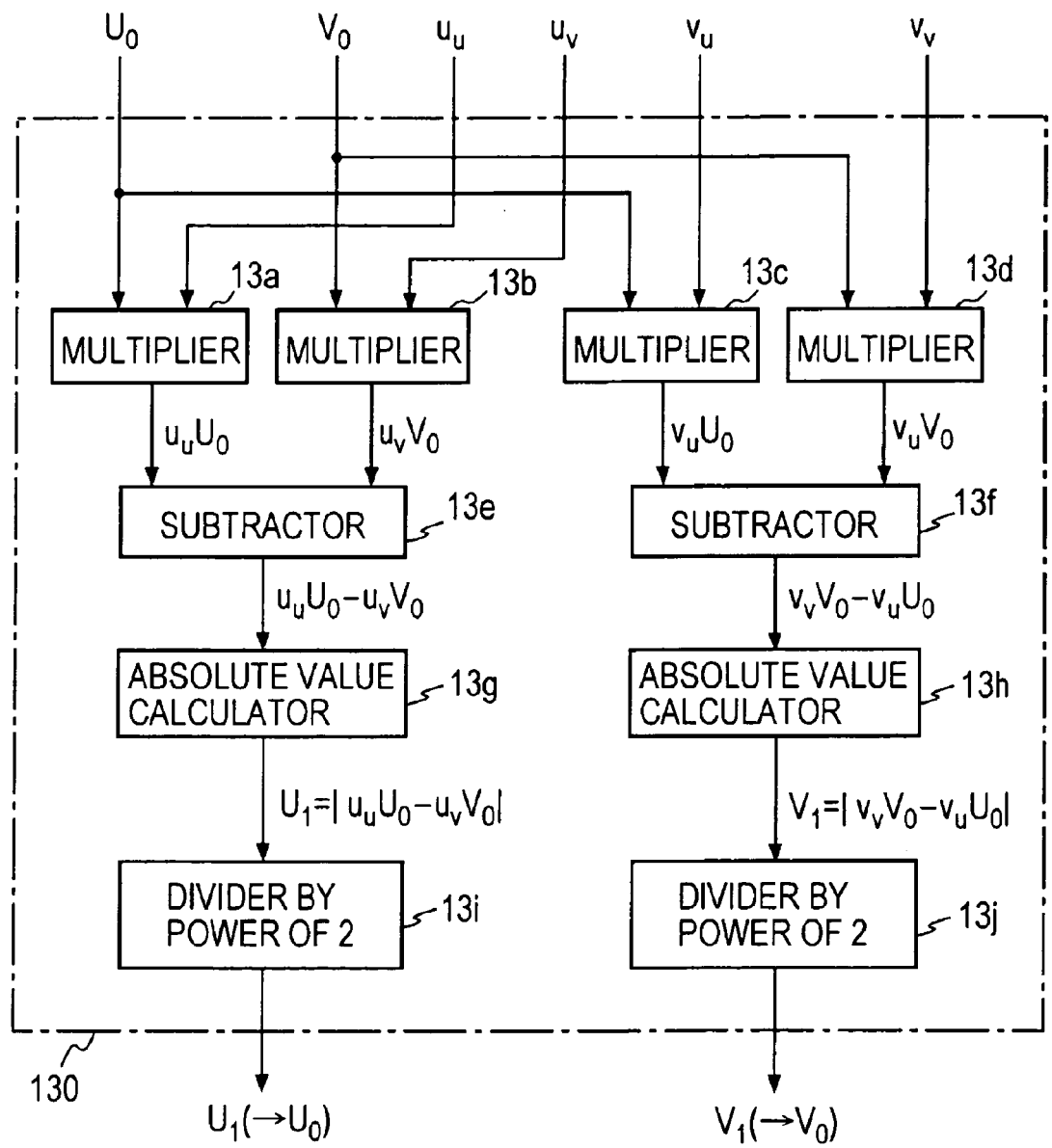
FIG. 17 is a functional block diagram depicting a multi-precision calculating part 130 in FIG. 11.

Turning next to FIG. 17, the operation of the GCD multi-precision calculating part 130 will be described below.

In FIG. 17, the GCD multi-precision calculating part 130 is supplied with $U_0$ and $V_0$ from the control device 150 and $u_u$, $u_v$, $v_u$ and $v_v$ from the GCD calculation simulating part 120. Multipliers 13*a* to 13*d* calculate and output products $u_u U_0$, $u_v V_v$, $v_u U_0$ and $v_v V_0$, respectively.

Subtractors 13*e* and 13*f* calculate and output differences $U_1 = u_u U_0 - u_v V_0$ and $V_1 = v_v V_0 - v_u U_0$ to absolute value calculators 13*g* and 13*h*, respectively.

The absolute value calculators 13*g* and 13*h* calculate absolute values of the inputs $U_1$ and $V_1$, and output them to power-of-2 dividers 13*i* and 13*j*, respectively.

The dividers 13*i* and 13*j* calculate divisions of the inputs $|U_1|$ and $|V_1|$ by power of $2^{w'}$, and provides the division results as outputs $U_0$ and $v_0$ from the multi-precision calculating part 130.

The processes of the GCD multi-precision calculating part 130 depicted in FIG. 17 are listed below.

Step S1: Calculate $$V_1 = (-v_u U_0 + v_v V_0)/2^{w'}$$

$$U_1 = (u_u U_0 - u_v V_0)/2^{w'}$$

Step S2: $V_1 \leftarrow |V_1|$; $U_1 \leftarrow |U_1|$

Step S3: $V_0 \leftarrow V_1$; $U_0 \leftarrow U_1$

In FIG. 17 the division by $2^{w'}$ is preceded by the calculation of the absolute value, but the former may also be followed by the latter as mentioned above in step S1. The outputs $U_0$ and $V_0$ from the GCD multi-precision calculating part 130 are input into the control device 150, in which a check is made to see if $V_0 = 0$ as described previously with reference FIG. 12.

GCD Calculation Final Processing Part 140

Figure 18:
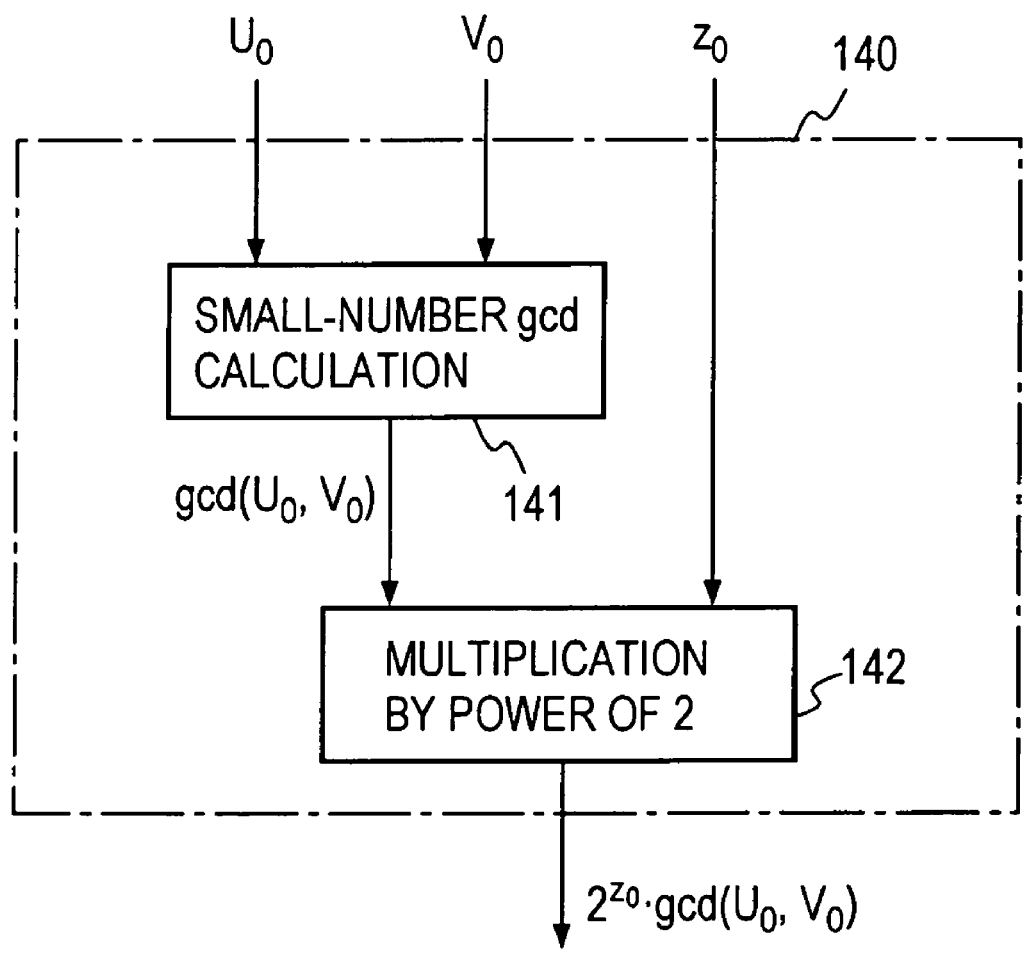
FIG. 18 is a functional block diagram depicting a final processing part 140 in FIG. 11.

Referring next to FIG. 18, the operation of the GCD calculation final processing part 140 will be described below.

The GCD calculation final processing part 140 is supplied with $U_0$ and $V_0$ from the control device 150 and $z_0$ from the initializing part 110. A small-number GCD calculation part 141 calculates the GCD of the inputs $U_0$ and $V_0$ and provides it to a power-of-2 multiplication part 142. The multiplication part 142 uses the inputs $\gcd(U_0, V_0)$ and $z_0$ to calculate $2^{z_0} \gcd(U_0, V_0)$ and provides it as the output from the final processing part 140, that is, the output from the GCD calculating apparatus 1000.

Figure 19:
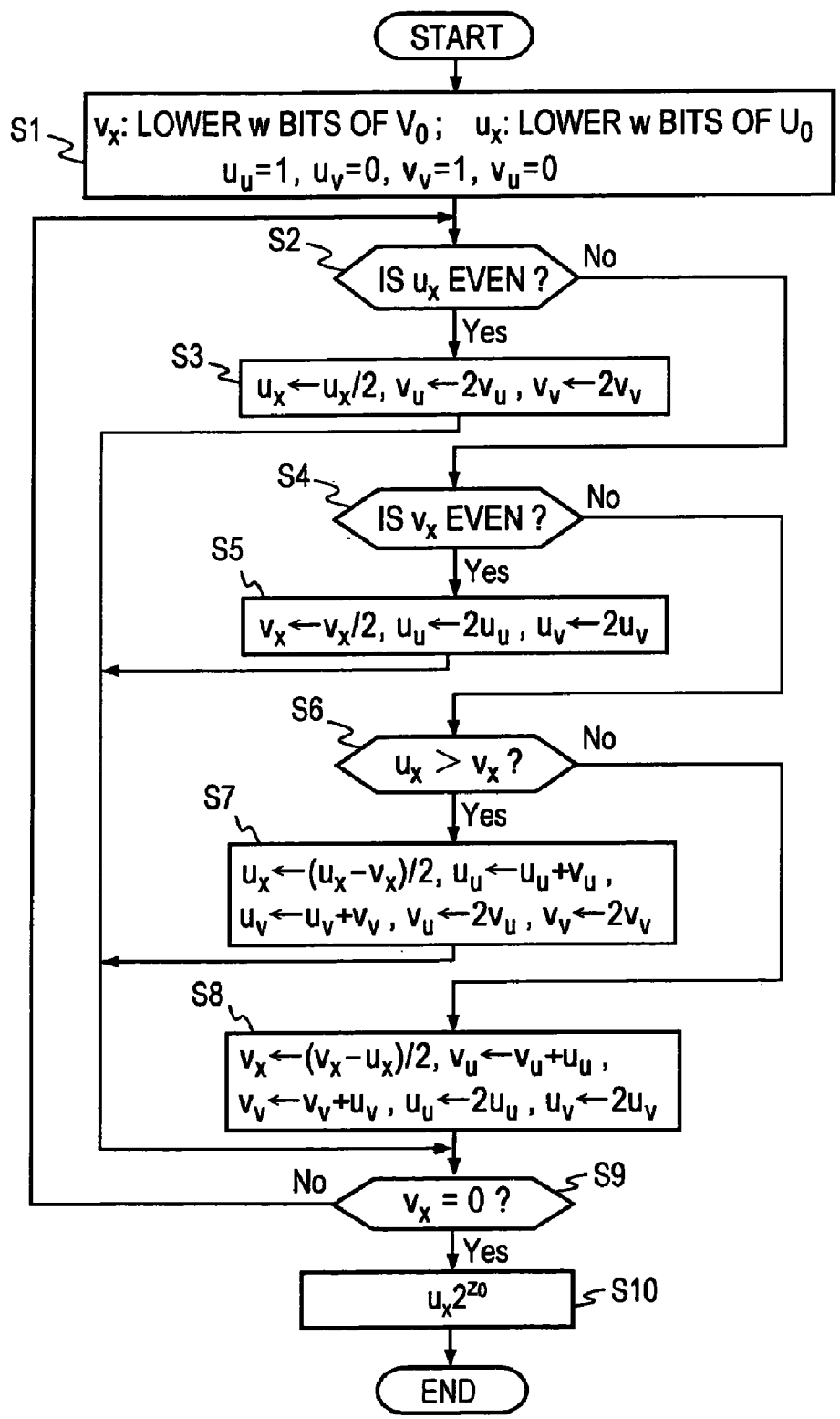
FIG. 19 is a flowchart showing the flow of operation of the final processing part 140 depicted in FIG. 18.

The calculation procedure of the GCD calculation final processing part 140 is basically identical with that of the conventional binary GCD calculation method of FIG. 10 except the correction with multiplication by $2^{z_0}$ in the last step S10 as depicted in FIG. 19. In more detail, steps S1 to S9 in FIG. 19 are the same as the processes for $u_x$, $u_u$, $v_x$, $v_u$ and $v_v$ in steps S1 to S9 in FIG. 16.

In the manner described above, the greatest common divisor for the inputs X and Y can be obtained. In addition, all the calculations except in the GCD calculation final processing part 140 are carried out in units of w or w' bits; hence, the greatest common divisor can be calculated with a small number of processes as a whole. As will be understood from the description given previously with reference to FIGS. 11 and 12, the respective parts in FIG. 11 are sequentially processed, and accordingly, the GCD calculation simulating part 120 in FIG. 15 is shown to be provided with the control part 121 merely for convenience description. The control part 121 need not be provided in practice. The control device 150 in FIG. 11 can be used to perform the control function of the control part 121 and control other parts as well. The memories in the respective parts need not necessarily be provided, either; the storage part 160 in FIG. 11 can be used as a substitute for them to store data necessary for processing in the respective parts.

Extended Binary GCD Calculating Apparatus 2000

Figure 20:
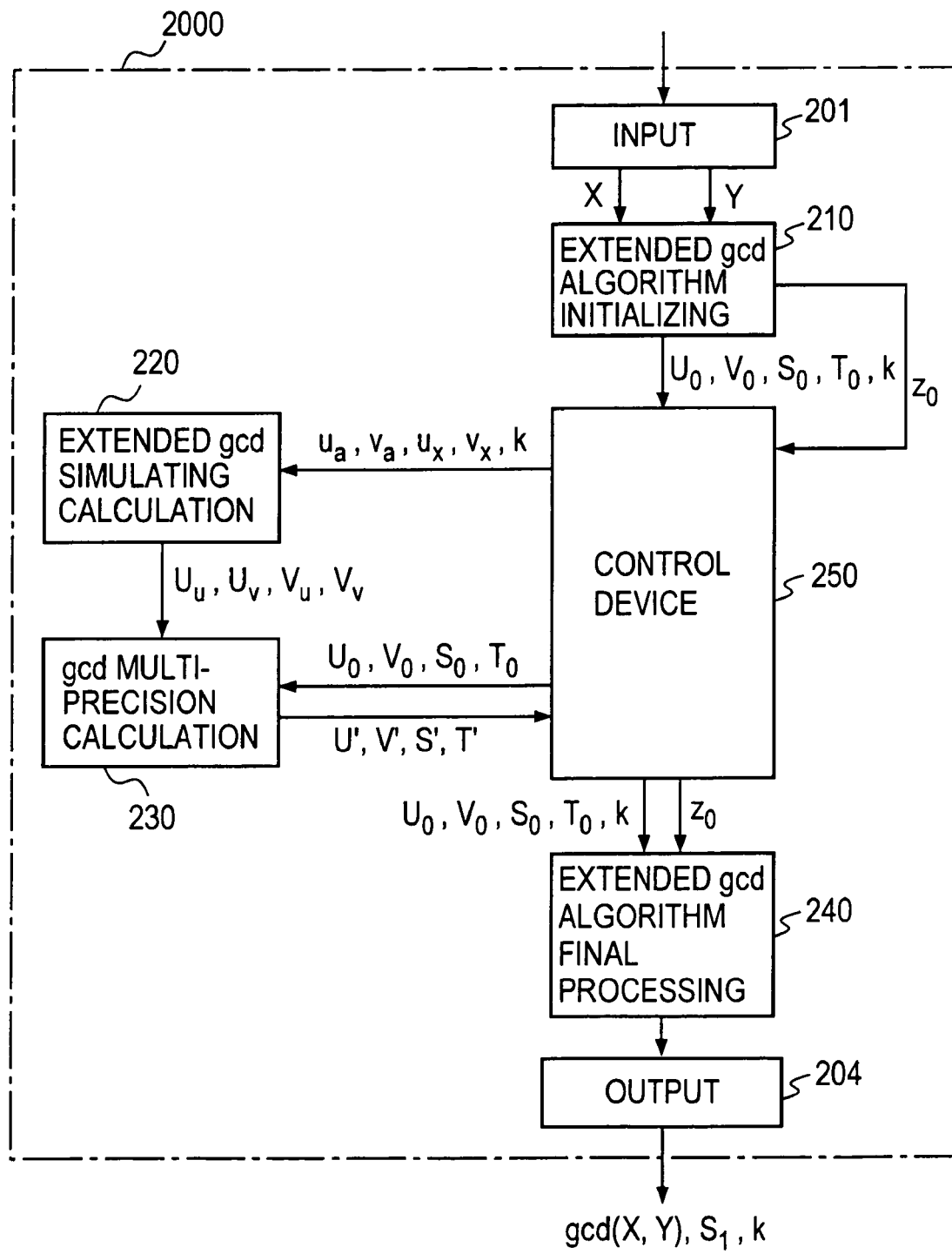
FIG. 20 is a functional block diagram depicting an extended binary GCD calculating apparatus which is a modified form of the third embodiment.

Turning next to FIG. 20, an extended binary GCD calculating apparatus 2000 will be described below. The apparatus 2000 is supplied with inputs X and Y, and outputs gcd(X, Y), $S=2^k X^{-1}$ mod Y, and k.

Figure 21:
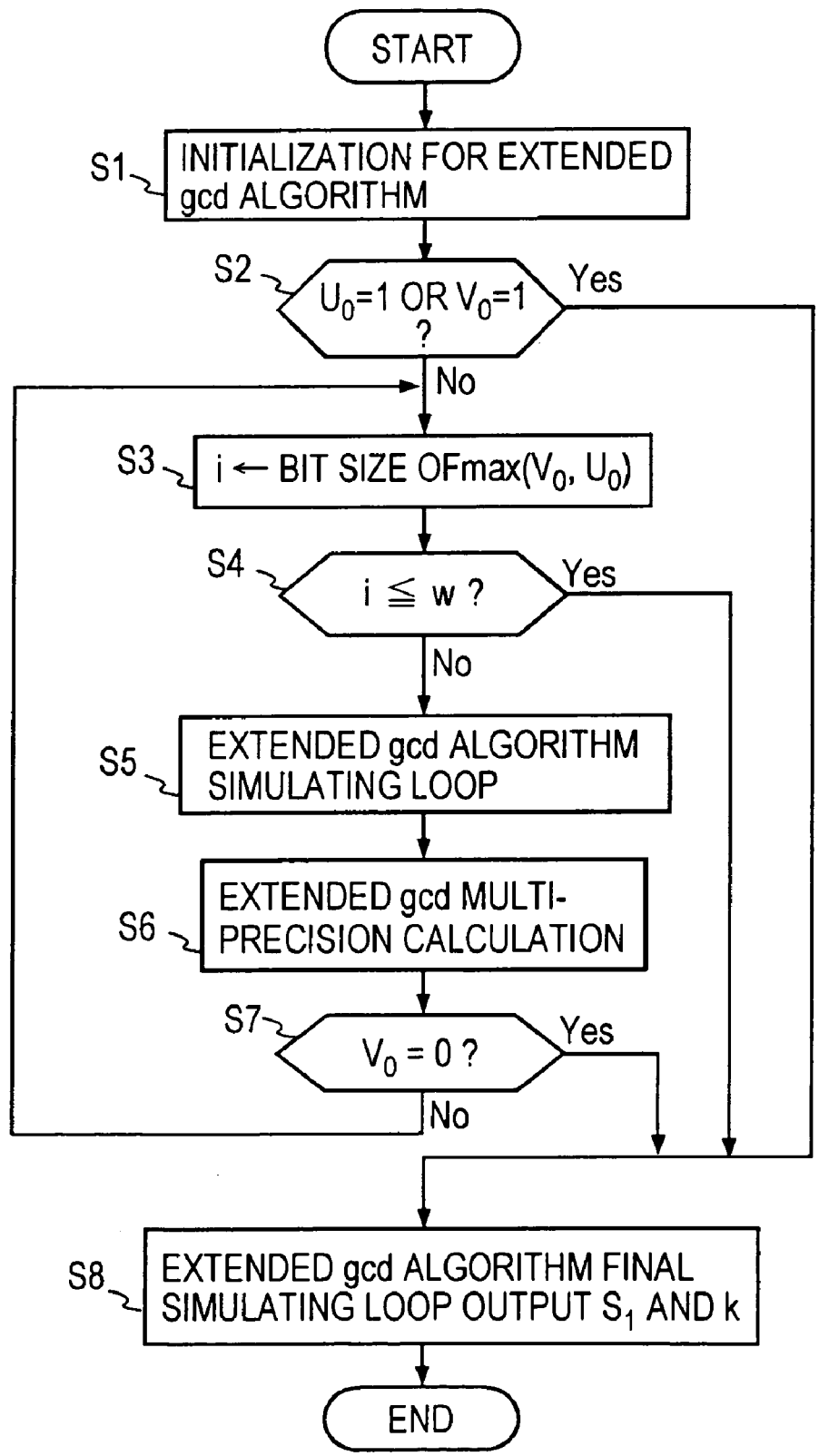
FIG. 21 is a flowchart showing the flow of operation of the extended binary GCD calculating apparatus depicted in FIG. 20.

The apparatus 2000 comprises an extended binary GCD calculation initializing part 210, an extended GCD calculation simulating part 220, an extended GCD multi-precision calculation part 230, an extended GCD calculation final processing part 240, and a control device 250. The calculating apparatus 2000 performs the following calculations as depicted in FIG. 21.

Step S1: The extended GCD calculation initializing part 210 performs, for inputs X and Y, the following calculation $$\gcd(X,Y)=2^{z_0}\gcd(U_0,V_0) \quad (38)$$

to find $U_0$ and $V_0$ which maximize z0. The extended GCD calculation initializing part 210 provides the thus obtained $U_0$ and $V_0$, to the control device 250, together with initial values $S_0=0$, $T_0=1$ and k=0 of S, T and k and provides $z_0$ to the extended GCD calculation final processing part 240 through the control device 250.

Step S2: The control device 250 checks the inputs $U_0$, $V_0$, $S_0$, $T_0$ and k to see if $U_0=1$ or $V_0=1$. If $U_0=1$ or $V_0=1$, then the control device 250 provides $U_0$, $V_0$, $S_0$, $T_0$ and k to the extended GCD calculation final processing part 240.

Step S3: If not so, then the control device 250 calculates, for the inputs $U_0$, $v_0$, $S_0$, $T_0$ and k, the bit size value i of that one of the inputs $U_0$ and $V_0$ which has a larger bit size.

Step S4: The control device 250 makes a check to see if the bit size i is smaller than the w-bit size. If so, the control device 250 provides $U_0$, $V_0$, $S_0$, $T_0$ and k to the extended GCD calculation final processing part 240. If the bit size i is not smaller than the w-bit size, the following values are provided to the extended GCD calculation simulating part 220:

$v_a$=Upper w bits (i-th to (i−w+1)th bits) of $V_0$ $u_a$=Upper w bits (i-th to (i−w+1)th bit) of $U_0$ $v_x$=Lower w bits of $V_0$ $u_x$=Lower w bits of $U_0$ And $U_0$, $V_0$, $S_0$, $T_0$ and k are provided to the extended GCD multi-precision calculating part 230.

Step S5: The extended GCD calculation simulating part 220 simulates an extended GCD calculation, using the values $v_a$, $u_a$, $v_x$ and $u_x$ which correspond to the upper and lower w bits of the inputs $U_0$ and $V_0$. The resulting values $u_u$, $u_v$, $v_u$ and $v_v$ are provided to the extended GCD multi-precision calculating part 230.

Step S6: The extended GCD multi-precision calculating part 230 performs the following operations as described later on with reference to FIG. 22.

$U'=(u_u U_0 - u_v V_0)/2^{w'}$ $V'=(v_v V_0 - v_u U_0)/2^{w'}$ $S'=u_u S_0 + u_v T_0$ $T'=v_v T_0 + v_u S_0$

If V' is negative, then the signs of V' and T' are inverted, and if U' is negative, then the signs of U' and S' are inverted. The values U', V', S' and T' obtained by the above operations are provided as $U_0$, $V_0$, $S_0$ and $T_0$ to the control device 250.

Step S7: The control device 250 makes a check to see if $V_0=0$ and, if not, returns to step S3. If $V_0=0$, the control device 250 goes to the processing of the extended GCD calculation final processing part 240.

Step S8: If $V_0\neq0$, the extended GCD calculation final processing part 240 calculates $2^{z_0}\gcd(U_0,V_0)$ from the inputs $U_0$, $V_0$ and $z_0$ and outputs it. If $V_0=0$, the extended GCD calculation final processing part 240 calculates S and k which satisfy $S=2^k X^{-1}$ mod Y, and output them.

Though not shown in particular in FIG. 20, this extended GCD calculating apparatus 2000 is also provided with means corresponding to the initial decision means 1-20, the bit size detecting means 1-30, the bit size checking means 1-40, the bit extracting means 1-41, the final decision means 1-70, and the storage part 160 all of which are depicted in FIG. 11.

The extended GCD calculation initializing part 210 has the functional configuration of FIG. 13 and performs the processes depicted in FIG. 14 as is the case with the GCD calculation initializing part 110 in FIG. 11; but the initializing part 210 differs in that it provides to the control device 250 the initial values $S_0=0$, $T_0=1$ and k=0 of S, T and k stored in the memory.

The extended GCD calculation simulating part 220 has the substantially the same functional configuration as that of the GCD calculation simulating part 120 depicted in FIG. 15 and performs substantially the same processes as shown in FIG. 16, but differs in the process of incrementing the value k by one as parenthesized in step S9 in FIG. 16. That is, the simulating part 220 outputs the value k+w, together with its calculated values $u_u$, $u_v$, $v_u$ and $v_v$. Accordingly, the control part of the extended GCD calculation simulating part 220 is provided with means for counting k. It is also possible to provide k+w=k when c=w in step S10 instead of incrementing k by one in step S9.

Extended GCD Multi-Precision Calculating Part 230

Figure 22:
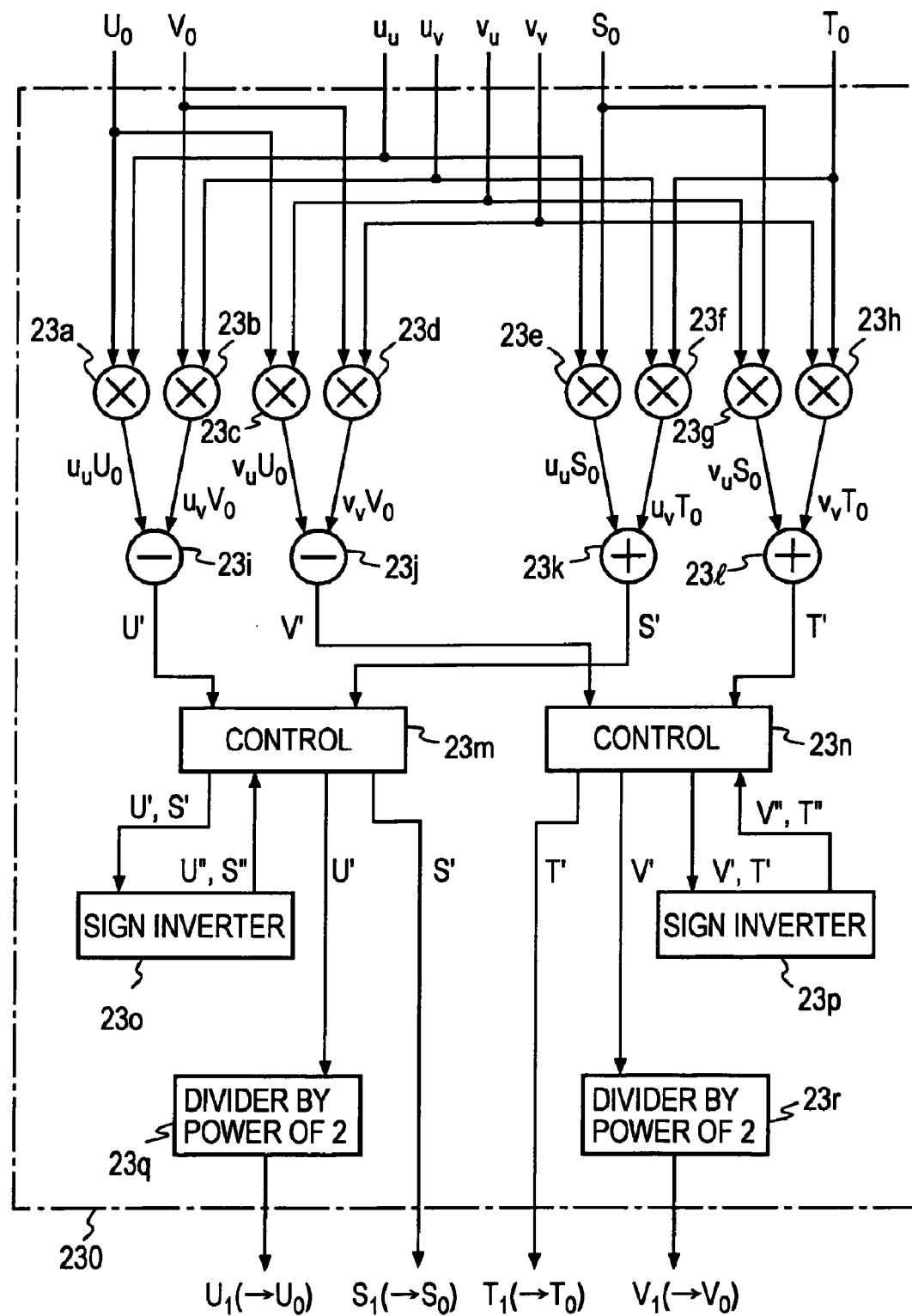
FIG. 22 is a functional block diagram depicting a multi-precision calculating part 230 in FIG. 20.
Figure 23:
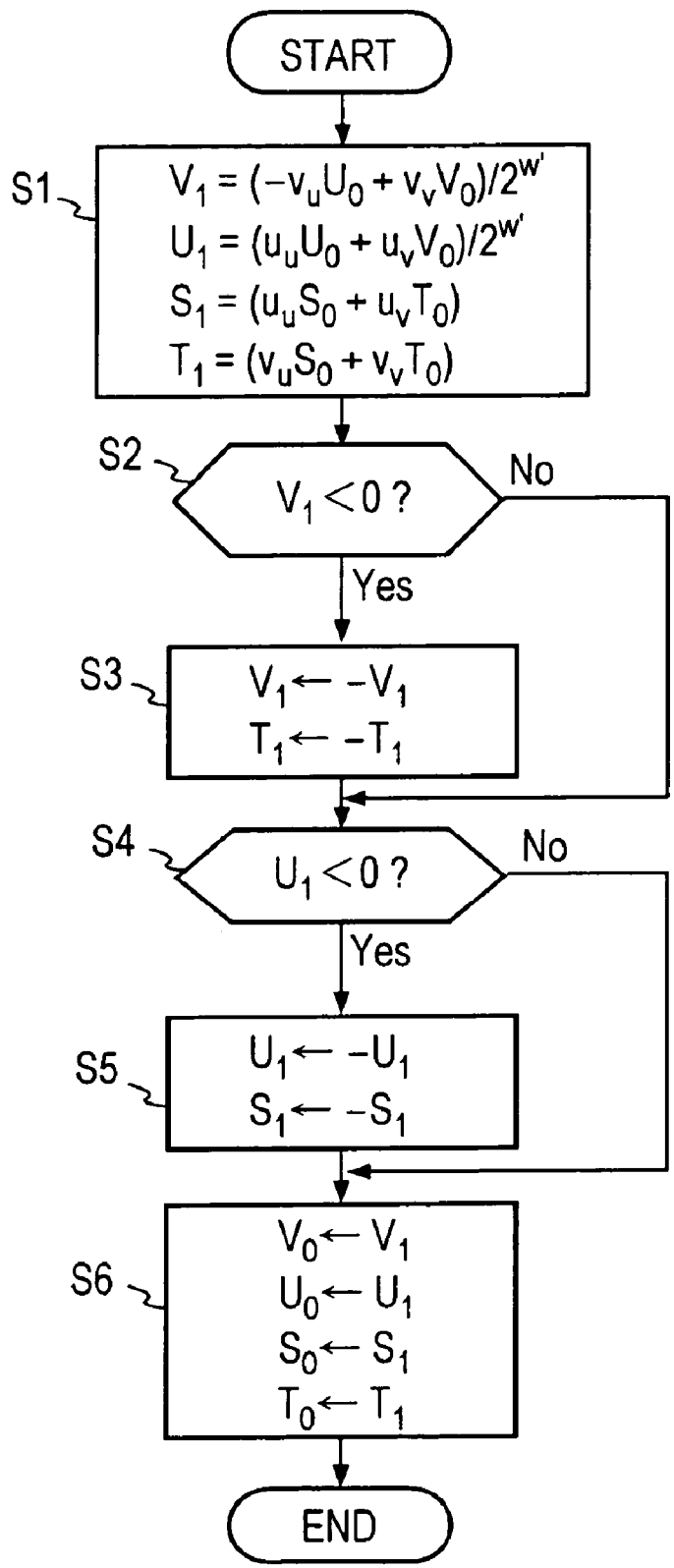
FIG. 23 is a flowchart showing the flow of operation of the multi-precision calculating part 230 in FIG. 22.

Turning now to FIGS. 22 and 23, the operation of the extended GCD multi-precision calculating part 230 will be described below.

The calculating part 230 is supplied with $U_0$, $V_0$, $S_0$ and $T_0$ from the control device 250 and $u_u$, $u_v$, $v_u$ and $v_v$ from the extended GCD calculation simulating part 220 in FIG. 20.

Multipliers 23a to 23h calculate and output products $u_u U_0$, $u_v U_0$, $v_v V_0$, $u_u S_0$, $u_v T_0$, $v_v S_0$ and $v_v T_0$, respectively.

Subtractors 23i and 23j calculate and output differences $U'=u_u U_0 - u_v V_0$ and $V'=v_v V_0 - u_v U_0$, respectively.

Adders 23k and 23l calculate and output sums $S'=u_u S_0 + u_v T_0$ and $T'=v_v T_0 + v_u S_0$, respectively.

A control part 23m is supplied with the difference U' and the sum S' and if U'<0, outputs U' and S' to a sign inverter 23o and receives therefrom −U' and −S' as new inputs U" and S". If U'≧0 then the control part 23m outputs U' to a power-of-2 divider 23q, and outputs S' as $S_0$ from the calculating part 230.

A control part 23n is supplied with the difference V and the sum T', and if V'<0, outputs U' and S' to a sign inverter 23p and receives therefrom −V' and −T' as new inputs V" and T". If V'≧0, then the control part 23n outputs V' to a power-of-2 divider 23r, and outputs T' as $T_0$ from the calculating part 230.

The divider 23q calculates a quotient $U_1$ by $2^{w'}$ of the input U' and provides it as an output $U_0$ from the calculating part 230. The divider 23r similarly calculates a quotient $V_1$ by $2^{w'}$ of the input V' and provides it as an output $V_0$ from the calculating part 230.

Listed below is the processes of the extended GCD multi-precision calculating part 230 described above.

Step S1: Calculate $$V_1 = (-v_u U_0 + u_v V_0)/2^{w'}$$

$$U_1 = (-u_u U_0 + u_v V_0)/2^{w'}$$

$$S_1 = (u_u S_0 + u_v T_0)$$

$$T_1 = (v_u S_0 + v_v T_0)$$

Step S2: Determine whether $V_1$ is smaller than 0, and if not, go to step S4.

Step S3: If $V_1$ is smaller than 0, change the sign S of $V_1$ and $T_1$ by $V_1 \leftarrow -V_1$ and $T_1 \leftarrow -T_1$.

Step S4: Determine whether U1 is smaller than 0, and if not, go to step S6.

Step S5: If $U_1$ is smaller than 0, change the signs of $U_1$ and $S_1$ by $U_1 \leftarrow -U_1$ and $S_1 \leftarrow -S_1$.

Step S6: Output the thus obtained values $V_1$, $U_1$, $S_1$ and $T_1$ as updated $V_0$, $U_0$, $S_0$ and $T_0$.

The output from the extended GCD multi-precision calculating part 230 is input into the control device 250.

Extended GCD Calculation Final Processing Part 240

Figure 24:
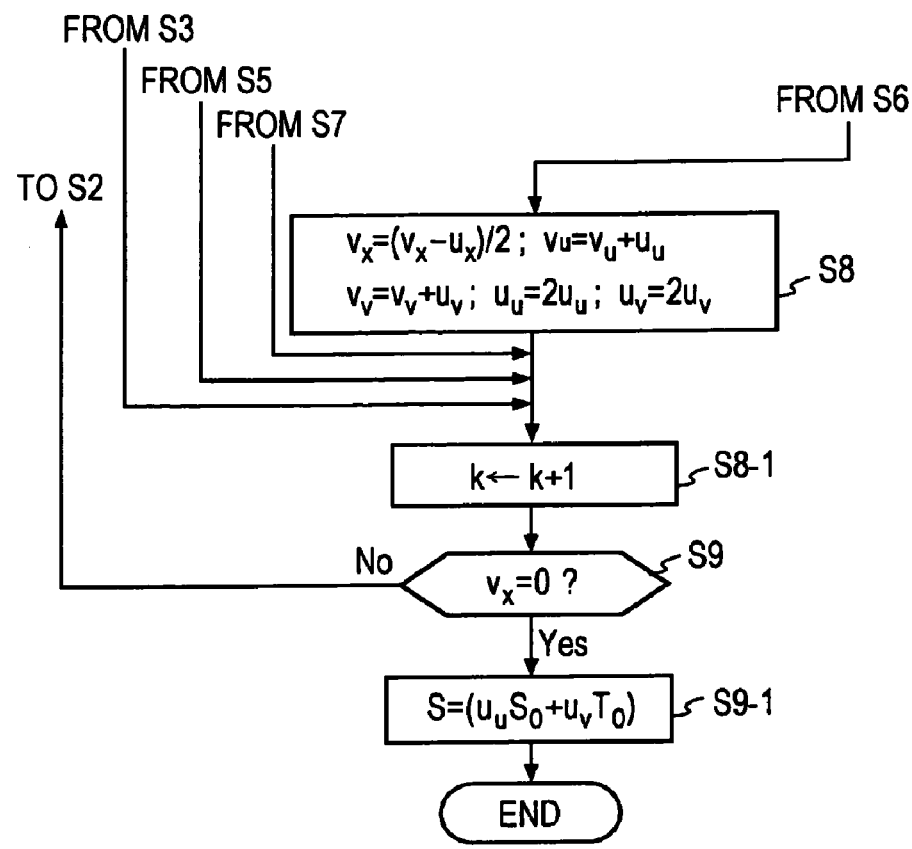
FIG. 24 is a flowchart showing part of the flow of operation of the final processing part 240 in FIG. 20.

The extended GCD calculation final processing part 240 has substantially the same functional configuration as that of the final processing part 140 depicted in FIG. 18. As is the case with the processing part 140, the processing part 240 calculates gcd(U, V) using the inputs $U_0$ and $V_0$ as initial values, then calculates $2^{z_0}$gcd(U, V) using calculation result gcd(U, V) and z0, and outputs it. The processing part 240 differs from the processing part 140 in the processes mentioned below. The final processing part 240 is supplied with $S_0$, $T_0$ and k as well, and as FIG. 24 shows part of the GCD calculation procedure of FIG. 19, it performs a step S8-1 of incrementing the value k by one after steps S3, S5, S7 and S8, and goes to step S9. If $v_x=0$ in step S9, $S=(u_u S_0 + u_v T_0)$ is calculated in step S9-1, and the calculation result S and k are output. The calculation result S' agrees with that of $S=2^k X^{-1}$ mod Y.

As is the case with the GCD calculating apparatus 1000, the extended GCD calculating apparatus 2000 permits execution of the calculation processes of its respective parts under the control of one control device 250. These calculation processes may also be carried out under program control. This performs, for each process, the steps of reading out necessary data from storage means, fetching temporarily stored data from a buffer, writing calculation results in storage means, temporarily storing them in a buffer, and so forth. This embodiment is adapted to output gcd(X, Y) $2^{z_0} u_x$ when the inputs X and Y are both even, and S' and k when either X or Y is odd and gcd(X, Y)=1. Hence, the extended GCD calculation initializing part 210 may be modified such that it first determines which of the inputs X and Y is odd and, if odd, does not calculate z0 but instead outputs w, $S_0=0$, $T_0=1$ and k=0, using X as $U_0$ and Y as $V_0$. However, a modular inverse cannot be obtained unless either one of the inputs X and Y is odd. That is, when it is preknown that either one of the input values is odd, the extended GCD calculation initializing part 210 needs only to initialize $U_0=X$, $V_0=Y$, $S_0=0$, $T_0=1$ and k=0; namely, it needs only to use X as $U_0$ and Y as $V_0$ and read out $S_0=0$, $T_0=1$ and k=0 from a memory and output them.

While in the above the number of bits that can be calculated at a time has been described to be w and w', the amount w' of simultaneous operation in the simulating part (120, 220) and that w in the multi-precision calculating part (130, 230) may be chosen equal.

Figure 25:
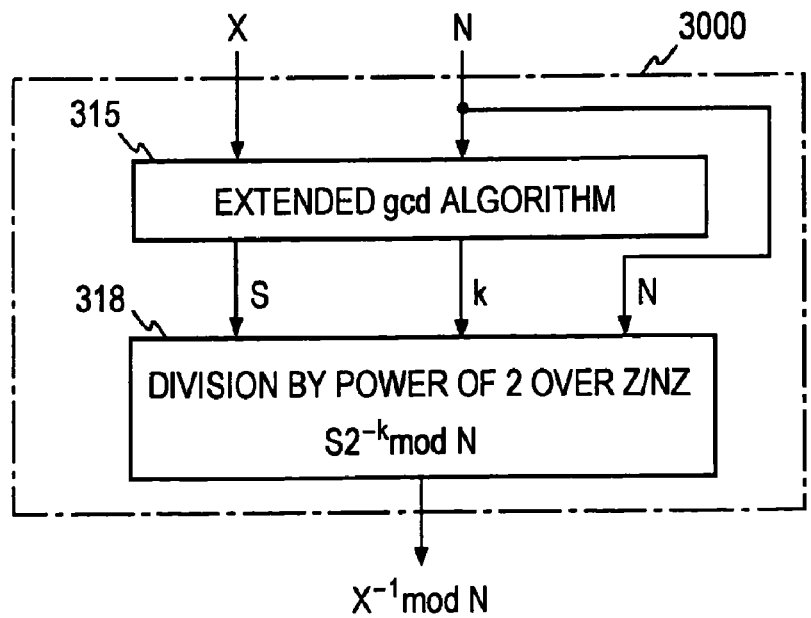
FIG. 25 is a functional block diagram depicting a normal inverse calculating apparatus employing the extended binary GCD.

As referred previously, the extended binary GCD calculating apparatus can be combined with a power-of-2 division device into an apparatus for inversion over the Z/NZ. FIG. 25 illustrates in block form an ordinary inversion apparatus using the extended binary GCD calculating apparatus of the third embodiment of the present invention. As depicted in FIG. 25, integers X and N are input into the apparatus, denoted generally by 3000, in which the extended binary GCD calculating apparatus 315, described previously with reference to FIG. 20, performs an extended binary GCD calculation and outputs $S=X^{-1} 2^k$ mod N and k. The outputs S and k are input into a division device 318 by power of 2 over the ring Z/NZ, which calculates $S 2^{-k}$ mod N, and from which $X^{-1}$ mod N, that is, the result of inversion of X over the ring Z/NZ is obtained.

Figure 26:
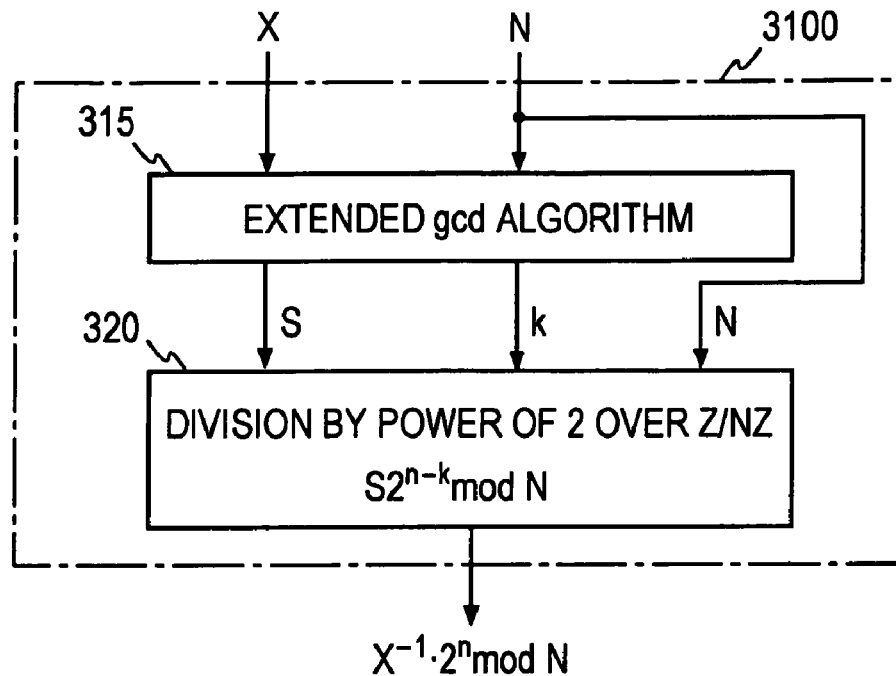
FIG. 26 is a functional block diagram depicting a Kaliski inverse calculating apparatus employing the extended binary GCD.

In FIG. 26 there is depicted an inversion apparatus 3100 which applies the extended GCD calculation method of the third embodiment of the invention to the Kalishi inversion. The integers X and N are input into the apparatus 3100, in which the extended GCD calculating apparatus 315 described previously in respect of FIG. 20 performs a calculation for the inputs X and N and outputs $S=X^{-1} 2k$ mod N and k. The calculation results S and k and the input N are provided to a division device 320 by the power of 2 over the ring Z/NZ, which calculates $S 2^{-(k-n)}$ mod N (where n is the number of bits of the input N) and from which $X^{-1} 2^n$ mod N is provided as the calculation result.

Figure 27:
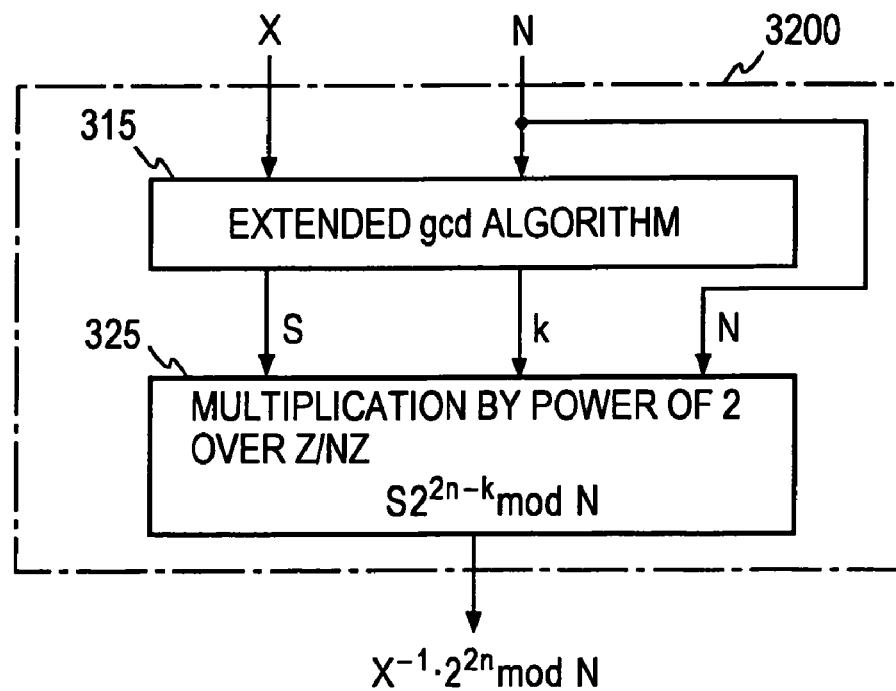
FIG. 27 is a functional block diagram depicting a Montgomery inverse calculating apparatus employing the extended binary GCD.

In FIG. 27 there is illustrated in block form an inversion apparatus 3200 which applies the extended binary GCD calculation method of the third embodiment to the Montgomery inversion over the Z/NZ. As depicted, the extended GCD calculating apparatus 315 calculates $S=X^{-1} 2^k$ mod N and k for the input integers X and N, and a multiplication device 325 by power of 2 over the Z/NZ calculates $S 2^{2n-k}$ mod N using the calculation results S and k, providing $X^{-1} 2^{2n}$ mod N.

Figure 28:
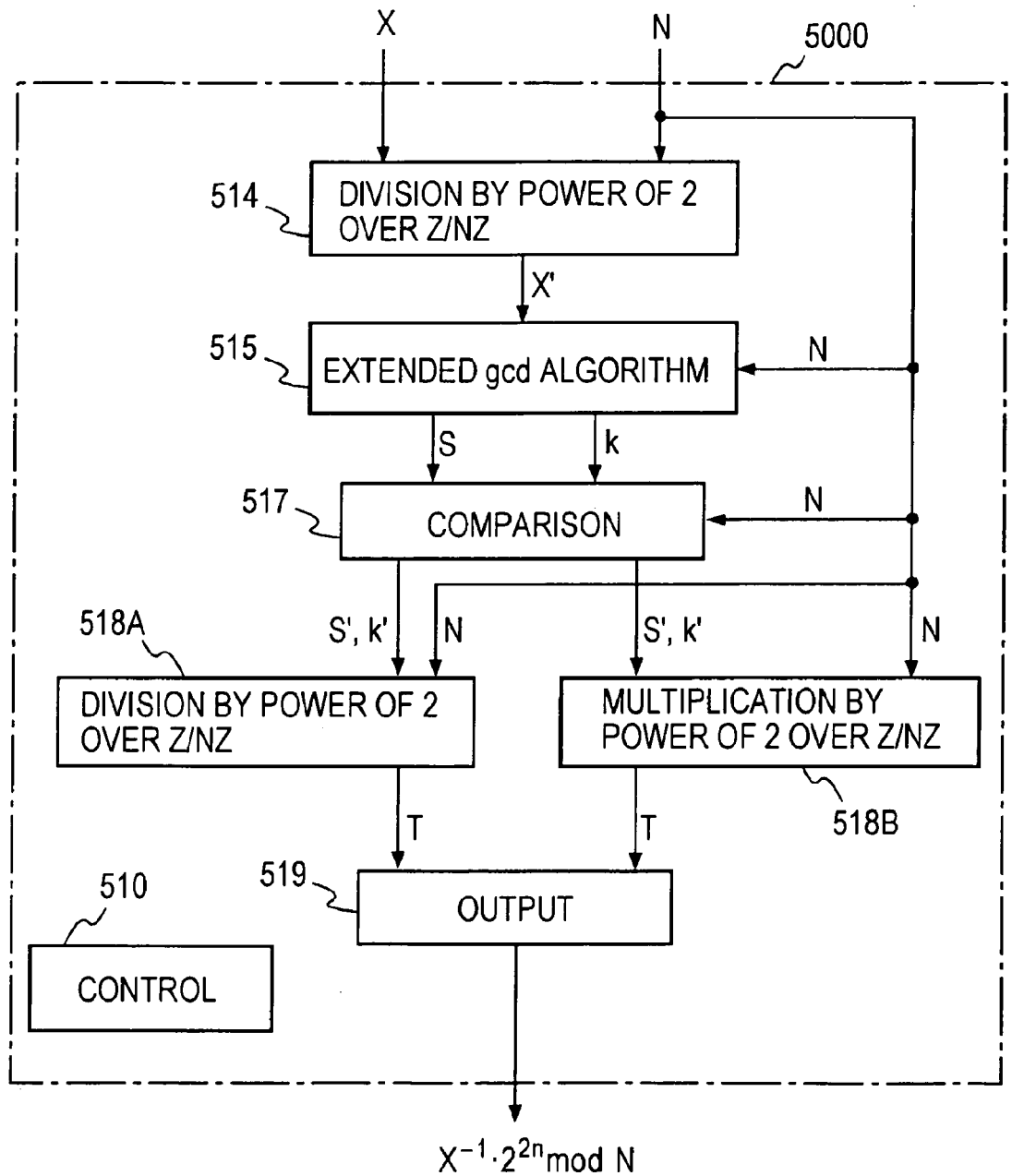
FIG. 28 is a functional block diagram depicting an inverse calculating apparatus applying the extended binary GCD to the first embodiment of the invention.

In FIG. 28 there is illustrated in block form a modular inversion apparatus 5000 which applied the extended GCD calculation method of the third embodiment to the Montgomery inversion method on the Z/NZ according to the first embodiment of the invention. As depicted in FIG. 28, under the control of a control part 510 a division device 515 by power of 2 over the ring Z/NZ calculates $X'=X 2^{-1}$ mod N, and for its calculation result X' and the input N, an extended GCD calculating device 515 calculates $S=X^{-1} 2^k$ mod N and k. The calculation result X corresponds to Y in FIGS. 1 and 2. These values S and k are input into a comparison device 517, which uses the bit length n of the input N, k and t to determine whether 2n-k-t is positive or negative. If it is negative, then k'=2n+k+t and S'=S are input into a division device 518A by power of 2 over the ring Z/NZ to calculate $T=S' 2^{k'}$ mod N. If 2n-k-t is positive, then k'=-2n-k-t and S=S' are input into a multiplication device 518B by power of 2 over the ring Z/NZ to calculate $T=S 2^{k'}$ mod N. An output part 519 outputs T from either one of the division device 518A and the multiplication device 518B as the calculation result of $X^{-1} 2^{2n}$ mod N.

Figure 29:
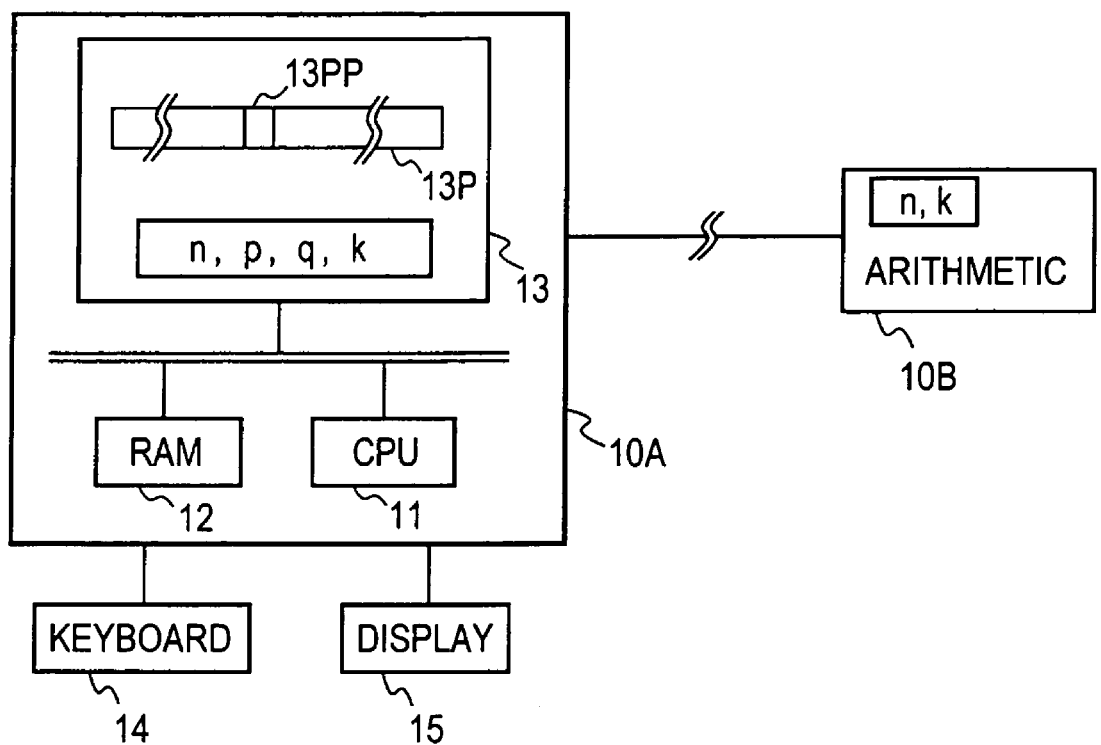
FIG. 29 is a block diagram illustrating, by way of example, the actual of a program for performing the modular inversion according to the present invention which is stored on a recording medium.

Next, a description will be given, with reference to FIG. 29, of the actual use of a program for the modular inversion according to the present inversion described above. The program is stored, for example, on a main storage 13 in an arithmetic unit 10A. The arithmetic unit 10A is implemented, for example, by a computer, and is composed of a CPU 11, a RAM 12 and the main storage 13. A keyboard 14 and a display unit 15 are connected to the arithmetic unit 10A. For example, in the case for using, as the CPU 11, a 16-bit chip set which performs an operation in an units of 16 bits at a time, it is preferable that multiplication and division by power of 2 be carried out in unit of 16 bit s as described above in respect of the embodiments of the present invention.

The CPU 11 performs the modular inversion following the operation program stored on the main storage 13. The RAM 12 stores various parameters and variables necessary for the modular inversion and intermediate and final results of operation. A user A enters a program executing instruction from the keyboard 14, and the progress of operation is displayed on the display unit 15.

Now the modular inversion method according to the present invention will be described as being applied to the digital signature scheme which is one of information security techniques. The arithmetic unit 10A of the user A is connected to an arithmetic unit 10B of a user B, for example, via a network NW. The user A sends a message m affixed with a digital signature S to the arithmetic unit 10B of the user B, who verifies the validity of the signature S' attached to the received message m. This example will be described on the assumption of using the aforementioned digital signature system ESGN. In this instance, the users A and B share a public key n and a system parameter k, and the user A at the sending side secretly holds secret keys p and q that are primes, where n=pq.

A program 13P for executing the digital signature system ESGN is stored in the main storage 13. The program 13P contains a subprogram 13PP which is used to calculate, by the method of the present invention, Eq. (b-1) containing the modular inversion which is used in one process of the digital signature generation.

To begin with, the arithmetic unit 10A of the user A generates random number x, then puts the message m in a hash function to generate h(m), and performs the following calculation:

$$W = \lfloor \{h(m) - x^k \bmod n\}/pg \rfloor \quad (39)$$

After this, the following calculation is performed:

$$S = x + \{w/(kx^{k-1}) \bmod p\} pq \quad (40)$$

$w/(kx^{k-1}) \bmod p$ in Eq. (40) is the same as the modular inversion described previously in respect of Eq. (b-1). Hence, expressing $$y = w/(kx^{k-1}) \bmod p = wX^{-1} \bmod p \quad (41)$$

as described previously, the value y can be obtained by the modular inversion procedure depicted in FIG. 1. The value y thus obtained is used to calculate $$S = x + ypq \quad (42)$$

And (S,m) is sent to the arithmetic unit 10B of the user B.

The arithmetic unit 10B of the user B uses the received signature S and message m to verify whether the following equation holds true:

$$S^k - 2^a \leq h(m) \leq S^k, \text{ where } a = [(2/3)\log_2 n] \quad (43)$$

If the above equation holds true, then it is recognized that the signature S attached to the message m is true or valid.

While in the above the program for executing the modular inversion according to the present invention has been described to be stored in the main storage 13 of the arithmetic unit which is used as a recording medium, it is evident that the program may be stored in any other types of recording media.

Effects of the Invention

As described above, the conventional methods for calculating the Montgomery inverse through utilization of the extended binary GCD algorithm are Method 1 which requires time-consuming multiplication by power of 2 and Method 2 which involves only division by power of 2 but possesses a shortcoming that the number of repetitions of elementary operation is 2.3 times larger than that in Method 1 on average.

The present invention realizes the calculation method that has the advantages of both Methods 1 and 2, by predicting the repeating number of the loop for the extended binary GCD calculation.

With the method according to the present invention, it is possible to make, for example, a 256-bit Montgomery inversion about 40% faster than by the conventional Method 2 (except the binary GCD calculation).

According to the second embodiment, in the multiplication and division for modular inversion, combining w-bit (where w is the number of bits that the computer can handle at a time, for example, 8, 16, 32, etc.) calculations permits reduction of large integer calculations in a rate proportional to 1/w, permitting speedup of the multiplication and division by $2^k$ on the Z/NZ.

This brings about such effects as mentioned below. The conventional methods perform, for n-bit inputs S and N, a multi-precision bit shift operation k times and a multi-precision addition (subtraction) k/2 times on average. In contrast thereto, the apparatus of FIG. 3, which is an example of the second embodiment, performs, for the n-bit inputs S and N, the multi-precision bit shift operation k/w times, a single- and multi-precision multiplication k/w times, an addition k/w times, and a single-precision multiplication k/w times. The single-precision calculation causes an error if w is smaller than N. Assuming that single-precision calculations (bit-shift operation, addition and multiplication) takes exactly the same amount of time, the computing time will become 2/w. That is, in a 16-bit computer the computing speed increases around eight-fold if the value N is sufficiently large.

In the extended binary GCD algorithm according to the third embodiment which is applicable to the modular inversion, the simulation of the binary GCD by the small integer calculation reduces the large integer calculation in a rate proportional to 1/w, making the binary GCD calculation faster.

Moreover, the simulation efficiency is improved by the introduction of the method which "performs simulation a predetermined number of times even with no assurances of correct simulation of the actual GCD algorithm."

For example, the conventional algorithm L performs simulation of about 12 loops by a simulation method using a 32-bit single-precision integer. With such a method of the present invention as mentioned above, however, it is possible to perform 32-loop simulation by the simulation method using the 32-bit single-precision integer. In this instance, the repeating number of the large integer operation for the GCD calculation can be reduced more than one-half that in the case of the algorithm L.

It will be apparent that many modifications and variations may be effected without departing from the scope of the novel concepts of the present invention.

What is claimed is:

1. A GCD calculation apparatus for a modular inversion in information security service, where GCD stands for greatest common divisor, comprising:

input means for inputting input values X and Y;

storage means for storing said input values X and Y, respectively;

GCD simulation initializing means for finding values $U_0$ and $V_0$ which maximize a value $z_0$ in an expression gcd(X,Y)=gcd($U_0$,$V_0$)$2^{z0}$ for said input values X and Y, said gcd(A,B) representing the greatest common divisor for A and B;

GCD calculation simulating means for finding values $u_u$, $u_v$, $v_v$ and $v_u$ which satisfy the following expression, $$gcd(U_0,V_0)=gcd(|u_uU_0-u_vV_0|/2^{w'}, |v_vV_0-v_uU_0|/2^{w'})$$

for a predetermined integer w'≧4, from said $U_0$ and $V_0$;

a multi-precision calculating processor for performing the following calculation for said values $U_0$, $V_0$, $u_u$, $u_v$, $v_v$ and $v_u$ $$U'=|u_uU_0-u_vV_0|/2^{w'},$$

$$V'=|v_vV_0-v_uU_0|/2^{w'}$$

and outputting said values $U_0$ and $V_0$;

control means for controlling read and write of said storage means and for repeating operations of said GCD calculation simulating means and said multi-precision calculating processor until $V_0$=0 is reached or a bit size of a larger one of the $U_0$ and $V_0$ becomes w' or smaller;

GCD calculation final processing means for calculating gcd($U_0$,$V_0$)$2^{z0}$ for said $U_0$ and $V_0$; and output means for outputting said calculation result gcd(X,Y) to be used for calculation of an encrypted message, a decrypted message or a digital signature in the information security service.

2. The GCD calculation apparatus of claim 1, wherein said control means comprises:

bit size detecting means for detecting the bit size value i of that one of said values $U_0$ and $V_0$ which has a larger bit size;

bit size checking means for determining whether said value i is less than a value w, and for causing said GCD calculation simulating means to perform its calculation if said value i is not less than said value w, or GCD calculation final processing means to perform its calculation if said value i is less than said value w, said w being a predetermined integer equal to or greater than 4;

final decision means for determining whether said $V_0$ in the output from said GCD multi-precision calculating means is zero or not; and means which, if the decision by said final decision means is not $V_0$=0, inputs the outputs $U_0$ and $V_0$ from said GCD multi-precision calculating means into said bit size detecting means to perform its operation, and if $V_0$=0, then causes said GCD calculation final processing means to perform its calculation.

3. The GCD calculation apparatus of claim 2, wherein said control means has initial decision means which determines whether the input from said GCD calculation initializing means is $V_0$=1 or $U_0$=1, and if so, inputs said input value $U_0$ or $V_0$ directly into said GCD calculation final processing means without inputting it into said GCD calculation simulating means.

4. The GCD calculation apparatus of claim 3, 1 or 2, wherein said control means further comprises:

bit extracting means for extracting from said values $U_0$ and $V_0$ their upper and lower bits $u_a$, $v_a$ and $u_x$, $v_x$, and said GCD calculation simulating means comprises:

state decision means supplied with said values $u_a$, $v_a$ and $u_x$, $v_x$ and initial values $u_u$=1, $u_v$=0, $v_u$=1, $v_v$=0, for determining whether $u_x$ is even or not, whether $v_x$ is even or not, or whether $u_a$>$v_a$ or not;

updating means for updating said values $u_u$, $v_v$, $u_u$ and $v_u$ by performing the following calculations:

when $u_x$ is even: $u_a$=$[u_a/2]$, $u_x$=$u_x/2$, $v_u$=$2v_u$ and $v_v$=$2v_v$;

when $v_x$ is even: $v_a$=$[v_a/2]$, $v_x$=$v_x/2$, $u_u$=$2u_u$ and $u_v$=$2u_v$ when $u_a$>$v_a$: $u_a$=$[(u_a-v_a)/2]$, $u_x$=$(u_x-v_x)/2$ and $u_u$=$u_u$+$v_u$, $u_v$=$u_v$+$v_v$, $v_u$=$2v_u$, $v_v$=$2v_v$;

in other cases: $v_a$=$[(v_a-u_a)/2]$, $v_x$=$(v_x-u_x)/2$ and $v_u$=$v_u$+$u_u$, $v_v$=$v_v$+$u_v$, $u_u$=$2u_u$, $u_v$=$2u_v$;

counting means for counting the number of times c said updating means has performed said calculations; and means for causing said state decision means, said updating means and said counting means to repeatedly perform their operations until said number of times c reaches said value w'.

5. An extended binary GCD calculation apparatus for a modular inversion in information security service, where GCD stands for greatest common divisor, comprising:

input means for inputting input values X and N either one of which is odd;

storage means for storing said input values X and N, respectively;

extended GCD simulation initializing means for initializing values $U_0$=X, $V_0$=N, $S_0$=0, $T_0$=1 and k=0;

extended GCD simulating means for finding values $u_u$, $u_v$, $v_v$ and $v_u$ which satisfy the following expression, $$gcd(U_0,V_0)=gcd(|u_uU_0-u_vV_0|/2^{w'}, |v_vV_0-v_uU_0|/2^{w'})$$

for a predetermined integer w', from said $U_0$ and $V_0$, and for adding said w' to said k;

extended binary GCD multi-precision calculating processor for performing the following calculation for said values $U_0$, $V_0$, $u_u$, $u_v$, $v_v$ and $v_u$ $$U'=(u_uU_0-u_vV_0)/2^{w'}, S'=u_uS_0+u_vT_o$$

or $$U'=-(u_uU_0-u_vV_0)/2^{w'}, S'=-(u_uS_0+u_vT_o)$$

and $$V'=(v_vV_0-v_uU_0)/2^{w'}, T'=v_vT_0+v_uS_o$$

or $$V'=-(v_vV_0-v_uU_0)/2^{w'}, T'=-(v_vT_0+v_uS_o)$$

and for outputting said values U', V', S' and T' as said $U_0$, $V_0$, $S_0$ and $T_0$, respectively;

control means for controlling read and write of said storage means and for repeating operations of said extended GCD simulating means and said extended binary GCD multi-precision calculating processor until $V_0$=0 is reached or a bit size of a larger one of the $U_0$ and $V_0$ becomes w' or smaller;

extended GCD calculation final processing means for finding values $u_u$, $u_v$, $v_u$, $v_v$ and c which satisfy the following expressions for said $U_0$, $V_0$, $T_0$ and $S_0$ input thereto, $$|u_uU_0-u_vV_0|/2^c=gcd(U_0,V_0),$$

$$|v_vV_0-v_uU_0|/2^c=0$$

calculating S'=$u_uS_0$+$u_vT_0$, and adding said c to said k; and output means for outputting the calculation result by said extended GCD calculation final processing means as the result of calculation S=$X^{-1}2^k$(mod N) and said k to be used for calculation of an encrypted message, a decrypted message or a digital signature in the information security service.

6. The extended binary GCD calculation apparatus of claim 5, wherein said control means comprises:
   bit size detecting means for detecting the bit size value i of that one of said values $U_0$ and $V_0$ which has a larger bit size;
   bit size checking means for determining whether said i is less than a value w, and for causing said extended GCD calculation simulating means to perform its calculation if said i is not less than said w, or said extended GCD calculation final processing means to perform its calculation if said i is less than said w;
   final decision means for determining whether said $V_0$ in the output from said extended GCD multi-precision calculating means is zero or not; and
   means which, if the decision by said final decision means is not $V_0=0$, inputs the outputs $U_0$ and $V_0$ from said extended GCD multi-precision calculating means into said bit size detecting means to perform its operation, and if $V_0=0$, then causes said extended GCD calculation final processing means to perform its calculation.

7. The extended binary GCD calculation apparatus of claim 6 or 5, wherein said control means further comprises bit extracting means for extracting from said values $U_0$ and $V_0$ their upper and lower bits $u_a$, $v_a$ and $u_x$, $v_x$, and
   said extended GCD calculation simulating means comprises:
   state decision means supplied with said values $u_a$, $v_a$ and $u_x$, $v_x$ and initial values $u_u=1$, $u_v=0$, $v_u=1$, $v_v=0$, for determining whether said $u_x$ is even or not, whether said $v_x$ is even or not, or whether $u_a>v_a$ or not;
   updating means for updating said values $u_u$, $v_v$, $u_v$ and $v_u$ by performing the following calculations:

when $u_x$ is even: $u_a[u_a/2], u_x=u_x/2, v_u=2v_u$ and $v_v=2v_v$;

when $v_x$ is even: $v_a[v_a/2], v_x=v_x/2, u_u=2u_u$ and $u_v=2u_v$ when $u_a>v_a$: $u_a=[(u_a-v_a)/2], u_x=(u_x-v_x)/2$ and $u_u u_u + v_u u_v = u_v + v_v, v_u = 2v_u, v_v = 2v_v$;

in other cases: $v_a=[(v_a-u_a)/2], v_x=(v_x-u_x)/2$ and $v_u=v_u+u_u, v_v=v_v+u_v, u_u=2u_u, u_v=2u_v$;

counting means for counting the number of times c said updating means has performed said calculations; and
   means for causing said state decision means, said updating means and said counting means to repeatedly perform their operations until said number of times c reaches said w'.

8. An apparatus for an inversion on Z/NZ which outputs $X^{-1}$ mod N for inputs X and N to be used for calculation of an encrypted message, a decrypted message or a digital signature in information security service, said apparatus having said extended binary GCD calculation apparatus of claim 7 and a division apparatus by power of 2 on said Z/NZ.

9. An apparatus for a Montgomery inversion on Z/NZ which outputs $X^{-1}2^{2n}$ mod N for n-bit inputs X and N to be used for calculation of an encrypted message, a decrypted message or a digital signature in information security service, said apparatus having said extended binary GCD calculation apparatus of claim 7, a multiplication apparatus by power of 2 on said Z/NZ and a division apparatus by power of 2 on said Z/NZ.

10. An apparatus for a Kaliski inversion on a Z/NZ which outputs $X^{-1}2^{2n}$ mod N for n-bit inputs X and N to be used for calculation of an encrypted message, a decrypted message or a digital signature in information security service, said apparatus having said extended binary GCD calculation apparatus of claim 7, and a division apparatus by power of 2 on said Z/NZ.

11. An apparatus for an inversion on Z/NZ which outputs $X^{-1}$ mod N for inputs X and N to be used for calculation of an encrypted message, a decrypted message or a digital signature in information security service, said apparatus having said extended binary GCD calculation apparatus of claim 6 or 5 and a division apparatus by power of 2 on said Z/NZ.

12. An apparatus for a Montgomery inversion on Z/NZ which outputs $X^{-1}2^{2n}$ for n-bit inputs X and N to be used for calculation of an encrypted message, a decrypted message or a digital signature in information security service, said apparatus having said extended binary GCD calculation apparatus of claim 6 or 5, a multiplication apparatus by power of 2 on said Z/NZ and a division apparatus by power of 2 on said Z/NZ.

13. An apparatus for a Kaliski inversion on a Z/NZ which outputs $X^{-1}2^{2n}$ mod N for n-bit inputs X and N to be used for calculation of an encrypted message, a decrypted message or a digital signature in information security service, said apparatus having said extended binary GCD calculation apparatus of claim 6 or 5 and a division apparatus by power of 2 on said Z/NZ.

14. A computer implemented GCD calculation method in information security service, where GCD stands for greatest common divisor, comprising:
   (a) a GCD initializing step of finding values $U_0$ and $V_0$ which maximize a value $z_0$ in an expression $\gcd(X, Y)=\gcd(U_0, V_0)2^{z_0}$ for input values X and Y, and storing said values $U_0$, $V_0$ and $z_0$ in a storage component of said computer, $\gcd(A, B)$ representing the greatest common divisor for A and B;
   (b) a GCD simulating step of finding values $u_u$, $u_v$, $v_v$ and $v_u$ which satisfy the following expression $\gcd(U_0, V_0)=\gcd(|u_u U_0 - u_v V_0|/2^{w'}, |v_v V_0 - v_u U_0|/2^{w'})$ for a predetermined value w', and said $U_0$ and $V_0$, and storing said values $u_u$, $u_v$, $v_v$ and $v_u$ in said storage component;
   (c) a multi-precision calculating step of performing the following calculation by a processor of said computer using said values $U_0$ and $V_0$ and said values $u_u$, $u_v$, $v_v$ and $v_v$ stored in said storage component, $U'=|u_u U_0 - u_v V_0|/2^{w'}$, $V'=|v_v V_0 - v_u U_0|/2^{w'}$ and updating said values $U_0$ and $V_0$ stored in said storage component with said U' and V', respectively;
   (d) a step of repeating a sequence of said steps (b) and (c) until either $V_0=0$ is reached or a bit size of a larger one of the values $U_0$ and $V_0$ becomes w' or smaller;
   (e) a final processing step of calculating $\gcd(U_0, V_0)2^{z_0}$ for said $U_0$ and $V_0$ stored in said storage component; and
   (f) a step of outputting the result of said calculation $\gcd(U_0, V_0)2^{z_0}$ to be used for calculation of an encrypted message, a decrypted message or a digital signature in the information security service.

15. A computer implemented extended binary GCD calculation method for a modular inversion in information security service, where GCD stands for greatest common divisor, comprising:

(a) an initializing step of finding values $U_0$ and $V_0$ which maximize a value $z_0$ in an expression $\gcd(X, N) = \gcd(U_0, V_0)2^{z_0}$ for input values X and N, initializing values $S_0=0$, $T_0=1$ and $k=0$, and storing said values $U_0, V_0, S_0, T_0$ and k in a storage component of said computer;

(b) an extended GCD calculation simulating step of finding values $u_u$, $u_v$, $v_v$ and $v_u$ which satisfy the following expression, $$\gcd(U_0, V_0) = \gcd(|u_u U_0 - u_v V_0|/2^{w'}, |v_v V_0 - v_u U_0|/2^{w'})$$

for a predetermined value w', and said values $U_0$ and $V_0$ stored in said storage component, and adding said w' to said k stored in said storage component to update it, and storing said values $u_u$, $u_v$, $v_v$ and $v_u$ and said updated value k in said storage component;

(c) an extended GCD multi-precision calculating step of calculating values:

$$U_1 = |u_u U_0 - v_v V_0|/2^{w'},$$

$$V_1 = |v_v V_0 - v_u U_0|/2^{w'},$$

$$S_1 = u_u S_0 + v_u T_0,$$

$$T_1 = v_u S_0 + v_v T_0$$

using a processor of said computer for said values $U_0, V_0, T_0, u_u, u_v, v_v$ and $v_u$ stored in said storage component;

temporarily storing said $V_1, U_1, S_1$ and $T_1$;

determining whether said $V_1$ is negative or positive, and if negative, inverting signs of said temporarily stored values $V_1$ and $S_1$;

determining whether said $U_1$ is negative or positive, and if negative, inverting signs of said temporarily stored values $U_1$ and $S_1$; and updating said $U_0$ and $V_0$, $T_0$ and $S_0$ stored in said storage component with said temporarily stored values $U_1, V_1, S_1$ and $T_1$, respectively, w' being an integer equal to or greater than 4;

(d) a step of repeating a sequence of steps (b) and (c) until either $V_0=0$ is reached or a bit size of a larger one of the values $U_0$ and $V_0$ becomes w' or smaller;

(e) a final processing step of finding values $u_u, u_v, v_u, v_v$ and c which satisfy the following expressions for said $U_0, V_0, T_0$ and $S_0$ stored in said storage component, $$|u_u U_0 - u_v V_0|/2^c = \gcd(U_0, V_0)$$

$$|v_v V_0 - v_u U_0|/2^c = 0$$

calculating $S' = u_u S_0 + u_v T_0$, and adding said value c to said k stored in said storage component to update it; and (f) an output step of outputting said S' and k obtained in said final processing step as calculation results $S = 2^k X^{-1}$ mod N and k, respectively, to be used for calculation of an encrypted message, a decrypted message or a digital signature in the information security service.

16. A recording medium having recorded thereon a program which when executed implements a procedure for calculating the greatest common divisor (GCD) by a calculation apparatus for input values X and Y in a modular inversion for information security service, said procedure comprising:

(a) a step of storing said input values X and Y in storage device;

(b) a GCD simulation initializing step of finding values $U_0$ and $V_0$ which maximize a value $z_0$ in an expression $\gcd(X, Y) = \gcd(U_0, V_0)2^{z_0}$ for said input values X and Y, and storing said $U_0, V_0$ and $z_0$ in a storage device, $\gcd(A, B)$ representing the greatest common divisor for A and B, where GCD stands for greatest common divisor;

(c) a GCD calculation simulating step of finding values $u_u, u_v, v_v$ and $v_u$ which satisfy the following expression, $$\gcd(U_0, V_0) = \gcd(|u_u U_0 - u_v V_0|/2^{w'}, |v_v V_0 - v_u U_0|/2^{w'})$$

for a predetermined value w', from said $U_0$ and $V_0$ and storing said values $u_u, u_v, v_v$ and $v_u$ in a storage device;

(d) a multi-precision calculating step of performing the following calculation for said $U_0, V_0, u_u, u_v$ and $v_v$ $$U' = |u_u U_0 - u_v V_0|/2^{w'}, V' = |v_v V_0 - v_u U_0|/2^{w'}$$

and updating said $U_0$ and $V_0$ with said U' and V', respectively;

(e) a step for repeating a sequence of said steps (c) and (d) until either $V_0=0$ is reached or a bit size of a larger one of the $U_0$ and $V_0$ becomes w' or smaller;

(f) final processing step of calculating $\gcd(U_0, V_0)2^{z_0}$ for said updated values $U_0$ and $V_0$; and (g) an output step of outputting the result of said calculation $\gcd(U_0, V_0)2^{z_0}$ to be used for calculation of an encrypted message, a decrypted message or a digital signature in the information security service.

17. The recording medium of claim 16, wherein said step (e) of said program comprises the steps of:

(e-1) a bit size detecting step of detecting the bit size value i of that one of said input values $U_0$ and $V_0$ which has a larger bit size;

(e-2) a bit size checking step of determining whether said i is less than a value w, and if so, causing said final processing step (f) to be performed, and if not, causing said GCD calculation simulating step (c) to be performed;

(e-3) a final decision step of determining whether said $V_0$ updated in said multi-precision calculating step (d) is zero or not, and if not zero, causing said bit size detecting step (e-1) to be performed, and if zero, causing said final processing step (f) to be performed.

18. The recording medium of claim 16 or 17, wherein said program further comprises a bit extracting step of extracting from said $U_0$ and $V_0$ their upper and lower bits $u_a, v_a$ and $u_x, v_x$, and storing them in storage means, and said GCD calculation simulating step (c) comprises:

a step of reading out said values $u_a, v_a$ and $u_x, v_x$ and said initial values $u_u=1, u_v=0, v_u=1, v_v=0$ from said storage means;

a state decision step of determining whether said $u_x$ is even or not, whether said $v_x$ is even or not, or whether $u_a > v_a$ or not;

an updating step of updating said $u_u, v_v, u_v$ and $v_u$ by performing any one of the following calculations:

when $u_x$ is even: $u_a = [u_a/2], u_x = u_x/2, v_u = 2v_u$ and $v_v = 2v_v$;

when $v_x$ is even: $v_a = [v_a/2], v_x = v_x/2, u_u = 2u_u$ and $u_v = 2u_v$ when $u_a > v_a$: $u_a = [(u_a - v_a)/2], u_x = (u_x - v_x)/2$ and $u_u = u_u + v_u, u_v = u_v + v_v, v_u 2v_u, v_v 2v_v$;

in other cases: $v_a = [(v_a - u_a)/2], v_x = (v_x - u_x)/2$ and $v_u = v_u + u_u, v_v = v_v + u_v, u_u = 2u_u, u_v = 2u_v$;

a counting step of counting the number of times c said updating step has been performed, and storing said value c in storage means; and a decision step of determining whether said number of times c has reached said value w', and if not, repeating said state decision step, said updating step and said counting step, and if said value w' is reached, stopping said GCD calculation simulating step.

19. A recording medium having recorded thereon a program which when executed implements an extended binary GCD calculation procedure for calculating S and k by $S = X^{-1} 2^k \mod N$ for input values X and N in a modular inversion for information security service, either one of said input values being odd, where GCD stands for common divisor, said procedure comprising:

(a) a step of storing said input values X and N in a storage device;

(b) a calculation initializing step of initializing $U_0=X$, $V_0=N$, $S_0=0$, $T_0=1$ and $k=0$, and storing said $U_0$, $V_0$, $S_0$, $T_0$ and k in a storage device;

(c) an extended GCD calculation simulating step of finding values $u_u$, $u_v$, $v_v$ and $v_u$ which satisfy the following expression, $$\gcd(U_0, V_0) = \gcd(|u_u U_0 - u_v V_0|/2^{w'}, |v_v V_0 - v_u U_0|2^{w'})$$

for a predetermined value w', from said $U_0$ and $V_0$ stored in said storage device, adding said w' to said k stored in said storage device to update it, and storing said $u_u$, $u_v$, $v_v$ and $v_u$ and said updated value k in a storage device;

(d) an extended GCD multi-precision calculating step of: calculating values $$V_1 = (v_v V_0 - u_u U_0)/2^{w'},$$

$$U_1 = (u_u U_0 - u_v V_0)/2^{w'},$$

$$S_1 = u_v S_0 + u_u T_0,$$

$$T_1 = v_v S_0 + v_v T_0$$

for said values $U_0$, $V_0$, $T_0$, $u_u$, $u_v$, $v_v$ and $v_u$ stored in said storage device; temporarily storing said $V_1$, $U_1$, $S_1$ and $T_1$; determining whether said $V_1$ is negative or positive, and if negative, inverting signs of said temporarily stored values $V_1$ and $S_1$; determining whether said $U_1$ is negative or positive, and if negative, inverting signals of said temporarily stored values $U_1$ and $S_1$; and then updating said $U_0$, $V_0$, $T_0$ and $S_0$ stored in said storage device with said temporarily stored values $U_1$, $V_1$, $S_1$ and $T_1$, respectively, w' being an integer equal to or greater than 4;

(e) a step for repeating a sequence of said steps (c) and (d) until either $V_0=0$ is reached or a bit size of a larger one of the $U_0$ and $V_0$ becomes w' or smaller;

(f) a final processing step of finding values $u_u$, $u_v$, $v_u$, $v_v$ and c which satisfy the following expressions, $$|u_u U_0 - u_v V_0|/2^c = \gcd(U_0, V_0),$$

$$|v_v V_0 - v_u U_0|/2^c = 0$$

for said $U_0$, $V_0$, $T_0$ and $S_0$ stored in said storage device, calculating $S' = u_v S_0 + u_u T_0$, and adding said c to said k stored in said storage device to update it; and (g) an output step of outputting said S' and k obtained in said final processing step as calculation results $S = 2^k X^{-1}$ mod N and k, respectively, to be used for calculation of an encrypted message, a decrypted message or a digital signature in the information security service.

20. The recording medium of claim 19, wherein said step (e) of said program comprises:

(e-1) a bit size detecting step of detecting the bit size value i of that one of said values $U_0$ and $V_0$ which has a larger bit size;

(e-2) a bit size checking step of determining whether said i is less than a value w, and if so, causing said final processing step (f) to be performed, and if not, causing said extended GCD calculation simulating step (c) to be performed; and (e-3) a final decision step of determining whether said $V_0$ updated in said extended GCD multi-precision calculating step (d) is zero or not, and if not zero, causing said bit size detecting step (e-1) to be performed, and if zero, causing said final processing step (f) to be performed.

21. The recording medium of claim 19 or 20, wherein said program further comprises a bit extracting step of extracting from said values $U_0$ and $V_0$ their upper and lower bits $u_a$, $v_a$ and $u_x$, $v_x$, and storing them in storage means, and said extended GCD calculation simulating step (c) comprises:

a step of reading out said values $u_a$, $v_a$ and $u_x$, $v_x$ and said initial values $u_u=1$, $u_v=0$, $v_u=1$, $v_v=0$ from said storage means;

a state decision step of determining whether said $u_x$ is even or not, whether said $v_x$ is even or not, or whether $u_a > v_a$ or not;

an updating step of updating said values $u_u$, $v_v$, $u_v$ and $v_u$ by performing any one of the following calculations:

when $u_x$ is even: $u_a = \lfloor u_a/2 \rfloor, u_x = u_x/2, v_u = 2v_u$ and $v_v = 2v_v$;

when $v_x$ is even: $v_a = \lfloor v_a/2 \rfloor, v_x = v_x/2, u_u = 2u_u$ and $u_v - 2u_v$ when $u_a > v_a$: $u_a = \lfloor (u_a - v_a)/2 \rfloor, u_x = (u_x - v_x)/2$ and $$u_u = u_u + v_u, u_v = u_v + v_v, v_u 2 v_u, v_v 2 v_v;$$

in other cases: $v_a = \lfloor (v_a - u_a)/2 \rfloor, v_x = (v_x - u_x)/2$ and $$v_u = v_u + u_u, v_v = v_v + u_v, u_u = 2u_u, u_v = 2u_v;$$

a counting step of counting the number of times c said updating step has been performed, and storing said c in storage means;

a step of incrementing said k by one upon each updating by said updating step; and a decision step of determining whether said number of times c has reached said w', and if not, returning to said state decision step, and if said w' is reached, stopping said extended GCD calculation simulating step (c).

* * * * *